US012752549B2

(12) United States Patent
Wang et al.

(10) Patent No.: US 12,752,549 B2
(45) Date of Patent: Oct. 6, 2026

(54) INKJET PRINTING DEVICE

(71) Applicant: Makeblock Co., Ltd., Shenzhen (CN)

(72) Inventors: Wenhua Wang, Shenzhen (CN); Guangliang Hou, Shenzhen (CN); Yingyun Shan, Shenzhen (CN)

(73) Assignee: MAKEBLOCK CO., LTD., Shenzhen (CN)

( * ) Notice: Subject to any disclaimer, the term of this patent is extended or adjusted under 35 U.S.C. 154(b) by 0 days.

(21) Appl. No.: 19/420,246

(22) Filed: Dec. 15, 2025

(65) Prior Publication Data

US 2026/0116088 A1 Apr. 30, 2026

Related U.S. Application Data

(63) Continuation of application No. PCT/CN2025/120451, filed on Sep. 10, 2025.

(30) Foreign Application Priority Data

Oct. 30, 2024 (CN) ......................... 202411531496.5

(51) Int. Cl.
*B41J 3/407* (2006.01)
*B01F 23/43* (2022.01)
(Continued)

(52) U.S. Cl.
CPC ............. *B41J 3/4078* (2013.01); *B01F 23/43* (2022.01); *B01F 27/112* (2022.01);
(Continued)

(58) Field of Classification Search
CPC .... B41J 3/4078; B41J 2/16552; B41J 2/1721; B41J 2/17503; B41J 2/18; B41J 2/20;
(Continued)

(56) References Cited

U.S. PATENT DOCUMENTS

2014/0292855 A1* 10/2014 Chang ........................ B41J 2/21 347/9
2024/0408869 A1* 12/2024 Ohara .................. C09D 11/102

FOREIGN PATENT DOCUMENTS

CN 103287112 A 9/2013
CN 206690697 U 12/2017
(Continued)

OTHER PUBLICATIONS

International Search Report and Written Opinion dated Dec. 31, 2025 received in International Application No. PCT/CN2025/120451.

(Continued)

*Primary Examiner* — Jannelle M Lebron
(74) *Attorney, Agent, or Firm* — Scully, Scott, Murphy & Presser, P.C.

(57) ABSTRACT

An inkjet printing device. The inkjet printing device includes a printing table, a printhead, an ink supply module, and a cutter module. The printhead can print on a printing material disposed on the printing table. The ink supply module can supply ink to the printhead. The cutter module is configured to cut the printing material disposed on the printing table. The printhead includes a shell, a color ink printing module, and a white ink printing module. The shell defines a first through-opening on a surface of the shell facing the printing table. The color ink printing module and the white ink printing module are disposed opposite to the first through-opening, and are arranged in sequence in a conveying direction of the printing material. The inkjet printing device further includes a pressing mechanism. The pressing mechanism includes a second driving mechanism and a pressing roller.

17 Claims, 34 Drawing Sheets

(51) Int. Cl.

| | |
|---|---|
| ***B01F 27/112*** | (2022.01) |
| ***B01F 35/32*** | (2022.01) |
| ***B01F 101/35*** | (2022.01) |
| ***B41J 2/165*** | (2006.01) |
| ***B41J 2/17*** | (2006.01) |
| ***B41J 2/175*** | (2006.01) |
| ***B41J 2/18*** | (2006.01) |
| ***B41J 2/20*** | (2006.01) |
| ***B41J 2/21*** | (2006.01) |
| ***B41J 3/44*** | (2006.01) |
| ***B41J 11/06*** | (2006.01) |
| ***B41J 11/70*** | (2006.01) |
| ***B41J 15/04*** | (2006.01) |
| ***B41J 29/13*** | (2006.01) |

(52) U.S. Cl.
CPC ....... *B01F 35/3204* (2022.01); *B41J 2/16552* (2013.01); *B41J 2/1721* (2013.01); *B41J 2/17503* (2013.01); *B41J 2/18* (2013.01); *B41J 2/20* (2013.01); *B41J 2/2117* (2013.01); *B41J 3/44* (2013.01); *B41J 11/06* (2013.01); *B41J 11/706* (2013.01); *B41J 15/04* (2013.01); *B41J 29/13* (2013.01); *B01F 2101/35* (2022.01); *B41P 2235/21* (2013.01); *B41P 2235/27* (2013.01)

(58) Field of Classification Search
CPC ... B41J 2/2117; B41J 3/44; B41J 11/06; B41J 11/706; B41J 15/04; B41J 29/13; B01F 23/43; B01F 27/112; B01F 35/3204; B01F 2101/35; B41P 2235/21; B41P 2235/27
See application file for complete search history.

(56) References Cited

FOREIGN PATENT DOCUMENTS

| | | | |
|---|---|---|---|
| CN | 110103589 | A | 8/2019 |
| CN | 210415538 | U | 4/2020 |
| CN | 211895287 | U | 11/2020 |
| CN | 212796260 | U | 3/2021 |
| CN | 214606632 | U | 11/2021 |
| CN | 215243811 | U | 12/2021 |
| CN | 217396022 | U | 9/2022 |
| CN | 217944672 | U | 12/2022 |
| CN | 223466896 | U | 10/2025 |
| JP | 2009-073031 | A | 4/2009 |
| JP | 2019-181781 | A | 10/2019 |
| JP | 2020-172053 | A | 10/2020 |

OTHER PUBLICATIONS

Chinese Notice of Registration dated Sep. 8, 2025 received in Chinese Application No. 202411531496.5.

* cited by examiner

INKJET PRINTING DEVICE

CROSS-REFERENCE TO RELATED APPLICATION(S)

This application is a continuation of International Application No. PCT/CN2025/120451, filed Sep. 10, 2025, which claims priority to Chinese Patent Application No. 202411531496.5, filed Oct. 30, 2024, the entire disclosure of each of which are incorporated herein by reference for all purposes.

TECHNICAL FIELD

This disclosure relates to the field of printing equipment technology, and in particular, to an inkjet printing device.

BACKGROUND

In the related art, an inkjet printing device can eject ink on printing material such as paper, film, and fabric, so as to accurately form desired images or text on the printing material. Therefore, the inkjet printing device enables high-resolution printing operations and is widely used in various industries.

SUMMARY

In a first aspect, the present disclosure provides an inkjet printing device. The inkjet printing device includes a printing table, a printhead, an ink supply module, and a cutter module. The printhead is movably disposed above the printing table, and is configured to print on a printing material disposed on the printing table. The ink supply module is connected to the printhead, and is configured to supply ink to the printhead. The cutter module is movably disposed above the printing table, and is configured to cut the printing material disposed on the printing table.

In a second aspect, the present disclosure provides an inkjet printing device. The inkjet printing device includes a printing table, a printhead, and an ink supply module. The printhead is movably disposed above the printing table and is configured to print on a printing material disposed on the printing table. The printhead includes a shell, a color ink printing module, and a white ink printing module. The shell defines an accommodating cavity therein. The shell defines a first through-opening on a surface of the shell facing towards the printing table. The color ink printing module and the white ink printing module are disposed in the accommodating cavity. The color ink printing module and the white ink printing module are disposed opposite to the first through-opening, and arranged in sequence in a conveying direction of the printing material. The ink supply module is connected to the printhead, and is configured to supply ink to the printhead.

In a third aspect, the present disclosure provides an inkjet printing device. The inkjet printing device includes a printing table, a printhead, an ink supply module, and a pressing mechanism. The printhead is movably disposed above the printing table, and is configured to print on a printing material disposed on the printing table. The ink supply module is connected to the printhead, and is configured to supply ink to the printhead. The pressing mechanism includes a second driving mechanism and a pressing roller. The second driving mechanism includes a first support frame, a driving rod, and a handle. The driving rod is rotatably connected to the first support frame. The handle is connected to one end of the driving rod. The pressing roller is connected to the driving rod. The driving rod abuts against the pressing roller to drive the pressing roller to move towards the printing table. The second driving mechanism is configured to drive the pressing roller to move downward and to enable the pressing roller to be in an elastic deformation state.

BRIEF DESCRIPTION OF THE DRAWINGS

To more clearly illustrate technical solutions in embodiments of the present disclosure or the related art, the following briefly introduces accompanying drawings that need to be used in the description of the embodiments or the related art. Obviously, the accompanying drawings in the following description are only some embodiments of the present disclosure. For those of ordinary skill in the art, other accompanying drawings can also be obtained based on the structures illustrated in these drawings without creative efforts.

DESCRIPTION OF REFERENCE SIGNS OF THE ACCOMPANYING DRAWINGS

Figure 1:
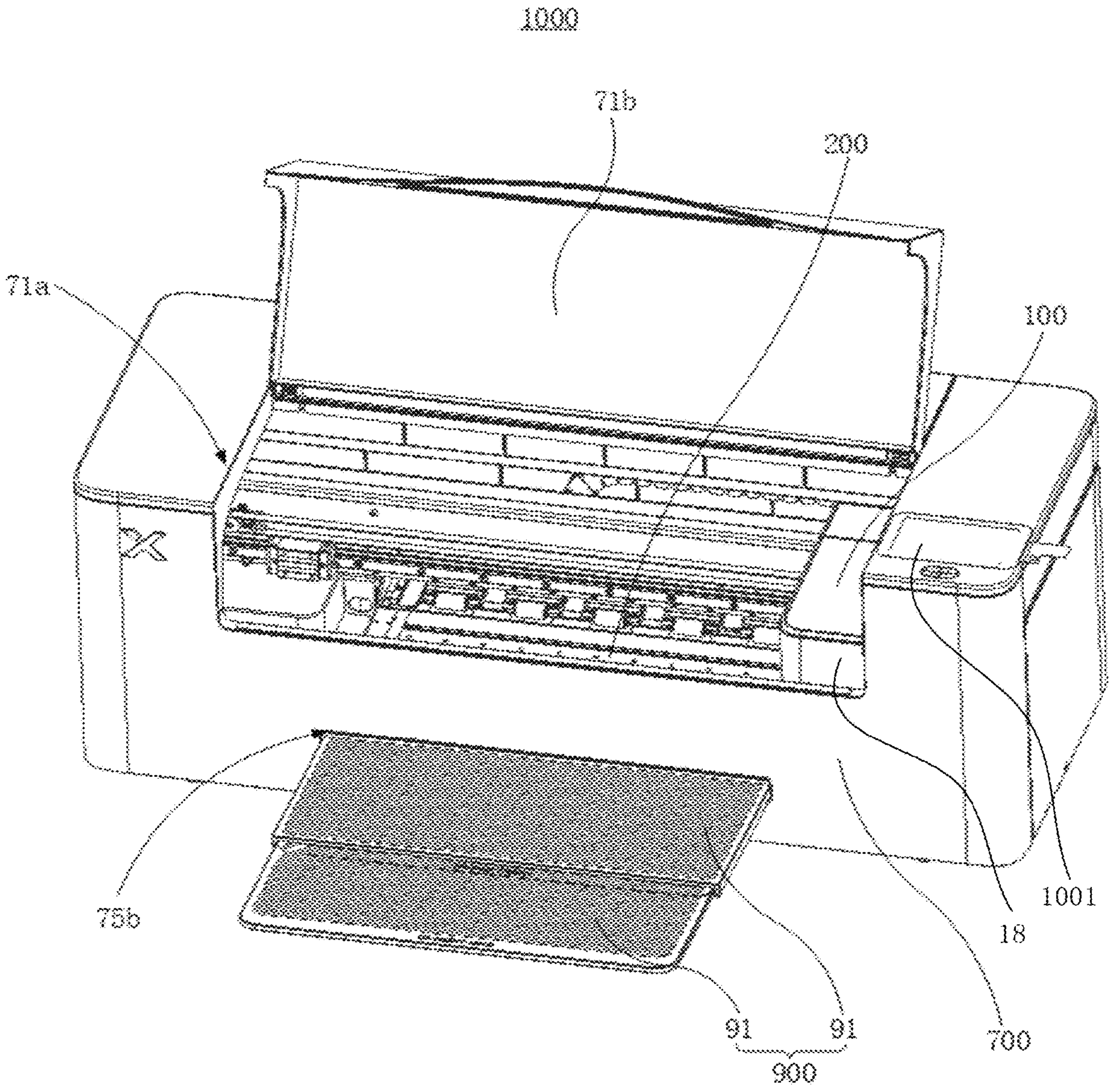
FIG. 1 is a schematic structural view of an embodiment of an inkjet printing device provided in the present disclosure.

1000: inkjet printing device;

100: printhead; 11: shell; 111: main shell; 1111: bottom shell; 1111*a*: first through-opening; 1111*b*: second through-opening; 1111*c*: heat dissipation portion; 1111*d*: heat dissipation hole; 1113: cover body; 1115: printing surface; 113: connecting member; 1131: bearing surface; 115: mounting member; 13: printing module; 131: inkjet mechanism; 1311: positioning groove; 132: leak-prevention mechanism; 133: ink storage mechanism; 134: adapter board; 135: recess; 15: cutter module; 151: first driving mechanism; 1511: rotating portion; 1513: translating portion; 1513*a*: pushing member; 1513*b*: first elastic member; 153: cutter assembly; 1531: frame body; 1531*a*: limiting groove; 1531*b*: surrounding edge structure; 1533: cutter; 1535: pressing member; 17: main board; 18: camera module; 19: anti-collision mechanism;

200: printing table; 21: suction cavity; 22: feeding mechanism; 221: rotating shaft; 222: support; 223: roller; 23: pressing mechanism; 231: second driving mechanism; 2311: first support frame; 2313: driving rod; 2315: handle; 233: pressing roller; 24: vacuum hole; 25: limiting plate; 251: conveying slot; 27: detection slot; 271: material detection mechanism; 29: negative-pressure module;

300: ink supply module; 31: ink cartridge; 311: ink-material detection device; 3111: first detection float; 3113: first detection signaler; 313: first ink-cartridge; 3131: first ink-port; 3132: second ink-port; 315: second ink-cartridge; 317: functional-liquid tank; 319: guiding structure; 33: ink supply line; 331: filter; 333: pump; 335: ink-return branch conduit; 35: stirring mechanism; 351: stirring blade; 353: stirring motor;

400: ink station module; 41: ink station platform; 411: waste collection groove; 413: scraper holder; 42: ink pad; 43: scraper; 44: shielding cover plate; 441: first avoidance hole; 443: second avoidance hole; 45: fourth driving mechanism; 451: fourth support frame; 4511: side plate; 4511*a*: first elongated hole; 4511*b*: second elongated hole; 453: driving motor; 455: lead screw; 457: driving slider; 459: driving linkage; 46: water-inlet pipeline; 47: trigger structure; 471: protruding structure; 48: polluted-water discharge pipeline;

500: waste-liquid cartridge; 51: first pipe-head structure; 511: liquid inlet channel; 513: liquid outlet hole; 515: one-way valve; 53: waste-liquid detection mechanism; 531: second detection float; 533: second detection signaler;

600: moving device; 61: second support frame; 63: driving mechanism; 633: driving wheel; 635: driven wheel; 637: driving belt; 6371: chuck; 6371*a*: base plate; 6371*b*: clamping block; 6373: belt body; 639: tensioning mechanism; 6391: adjustment plate; 6393: adjustment bolt; 6395: third elastic member; 65: support guide rail; 67: support slider;

700: housing; 71*a*: first opening; 71*b*: first cover-plate; 72*a*: second opening; 72*b*: second cover-plate; 73*a*: third opening; 73*b*: third cover-plate; 74: reflective structure; 75*a*: printing-material inlet; 75*b*: printing-material outlet; 76: third support frame; 77: drag-chain structure; 78: second pipe-head structure; 79: position-detection mechanism;

800: material rack; 81: fifth support frame; 83: fixed shaft; 831: ratchet structure; 85: material-roll structure; 851: first sleeve-member; 8511: material clamp; 8513: first bearing sleeve; 8515: fourth elastic member; 853: second sleeve-member; 8531: second bearing sleeve; 8533: retaining ring; 8533*a*: extendable-and-retractable snap;

900: output tray; 91: tray plate; 1001: display module.

DETAILED DESCRIPTION

The following will clearly and completely describe technical solutions in embodiments of the present disclosure with reference to accompanying drawings in the embodiments of the present disclosure. Apparently, the described embodiments are only part of the embodiments of the present disclosure, rather than all of them. Based on the embodiments in the present disclosure, all other embodiments obtained by those of ordinary skill in the art without creative efforts shall fall within the protection scope of the present disclosure.

It should be noted that if there are directional indications (such as up, down, left, right, front, back . . . ) in the embodiments of the present disclosure, the directional indications are only used to explain the relative positional relationship and movement conditions among components in a specific posture. If the specific posture changes, the directional indications will also change accordingly.

In addition, if descriptions involving "first", "second", and the like are involved in the present disclosure, the descriptions of "first", "second", and the like are used for description only and cannot be construed as indicating or implying relative importance thereof or implicitly indicating the quantity of technical features indicated. Therefore, the features defined with "first" and "second" may explicitly or implicitly include at least one of the features. In addition, the meaning of "and/or" throughout the text includes three parallel solutions. Taking "A and/or B" as an example, it includes a solution A, a solution B, or a solution meeting both A and B. In addition, the technical solutions of the various embodiments may be combined with each other, but should be based on what is capable of being implemented by those of ordinary skill in the art. When a combination of technical solutions is contradictory or cannot be implemented, it should be considered that the combination of technical solutions does not exist, and is not within the protection scope of the present disclosure.

In the related art, an inkjet printing device can eject ink on printing material such as paper, film, and fabric, so as to accurately form desired images or text on the printing material. Therefore, the inkjet printing device enables high-resolution printing operations and is widely used in various industries. However, after printing the pattern, the inkjet printing device is unable to automatically cut the printing material according to the size of the printed pattern. Usually, the printing material needs to be manually cut to the required size after printing, which is rather inconvenient.

In response to the above problems, in order to solve the problem that the inkjet printing device is unable to adjust the size of the printing material after printing, the present disclosure provides an inkjet printing device 1000. It should be noted that the inkjet printing device provided in the present disclosure may be a thermal inkjet printer, a piezoelectric inkjet printer, or a direct to film (DTF) printer, a direct to garment (DTG) printer, etc., as long as it is a device used for ejecting ink for printing operations. The printing material used by the inkjet printing device in the present disclosure may be paper, film material, or, of course, fabric, etc. The present disclosure does not limit the material and shape of the printing material, as long as the printing material can be printed by the inkjet printing device.

In a first aspect, the present disclosure provides an inkjet printing device. The inkjet printing device includes a printing table, a printhead, an ink supply module, and a cutter module. The printhead is movably disposed above the printing table, and is configured to print on a printing material disposed on the printing table. The ink supply module is connected to the printhead, and is configured to supply ink to the printhead. The cutter module is movably disposed above the printing table, and is configured to cut the printing material disposed on the printing table.

In an embodiment, the cutter module is disposed in the printhead. The printhead includes a shell and a printing module. The shell defines an accommodating cavity therein. The shell defines a first through-opening and a second through-opening on a surface of the shell facing towards the printing table. The first through-opening and the second through-opening are in communication with the accommodating cavity. The first through-opening is spaced apart from the second through-opening. The printing module is disposed in the accommodating cavity and is disposed opposite to the first through-opening. The cutter module is disposed in the accommodating cavity and is disposed opposite to the second through-opening.

In an embodiment, the cutter module is movably disposed in the accommodating cavity. The cutter module has an extended state in which at least part of the cutter module extends out of the second through-opening and a retracted state in which the cutter module retracts through the second through-opening; and/or the cutter module is rotatable or translatable towards or away from the second through-opening.

In an embodiment, the cutter module includes a first driving mechanism and a cutter assembly. The first driving mechanism is disposed in the accommodating cavity, and the cutter assembly is drivingly connected to the first driving mechanism, to enable the cutter assembly to have an extended state in which at least part of the cutter assembly extends out of the second through-opening and a retracted state in which the cutter assembly retracts through the second through-opening. The cutter assembly includes a frame body and a cutter. The frame body has one end drivingly connected to the first driving mechanism. The cutter is disposed at another end of the frame body away from the first driving mechanism and is detachably connected to the frame body.

In an embodiment, the cutter assembly further includes a pressing member. The pressing member is disposed at the other end of the frame body away from the first driving mechanism and protrudes from the frame body. The pressing member is arranged side by side with the cutter. The pressing member is configured to press against the printing material.

In an embodiment, the inkjet printing device further includes a waste-liquid cartridge. The ink station module includes a functional-liquid tank, an ink pad, a water-inlet pipeline, and a polluted-water discharge pipeline. The water-inlet pipeline is connected between the functional-liquid tank and the ink pad. The polluted-water discharge pipeline is connected between the ink pad and the waste-liquid cartridge. The functional-liquid tank is configured to provide a functional liquid to the ink pad through the water-inlet pipeline. The functional liquid includes a moisturizing liquid and/or a cleaning liquid. The waste-liquid cartridge is configured to receive a waste liquid discharged from the ink pad through the polluted-water discharge pipeline.

In an embodiment, the shell includes a main shell, a connecting member, and a mounting member. The main shell defines the accommodating cavity therein. The main shell forms a printing surface on one end of the main shell. The connecting member has one end disposed on an outer sidewall of the main shell, and the other end extending in a direction away from the main shell. The connecting member is configured to be connected to a driving device to drive the printhead to move under driving of the driving device. The mounting member has one end disposed on one side of the main shell away from the connecting member, and the other end extending in a direction away from the main shell. The printhead further includes a camera module. The camera module is mounted on the mounting member.

In a second aspect, the present disclosure provides an inkjet printing device. The inkjet printing device includes a printing table, a printhead, and an ink supply module. The printhead is movably disposed above the printing table and is configured to print on a printing material disposed on the printing table. The printhead includes a shell, a color ink printing module, and a white ink printing module. The shell defines an accommodating cavity therein. The shell defines a first through-opening on a surface of the shell facing towards the printing table. The color ink printing module and the white ink printing module are disposed in the accommodating cavity. The color ink printing module and the white ink printing module are disposed opposite to the first through-opening, and arranged in sequence in a conveying direction of the printing material. The ink supply module is connected to the printhead, and is configured to supply ink to the printhead.

In an embodiment, the printhead further includes an anti-collision mechanism disposed on the shell. The printhead is movable in a first direction. The anti-collision mechanism is disposed on at least two opposite sides of the printhead in the first direction.

In an embodiment, the printing module includes an inkjet mechanism, an ink storage mechanism, and a leak-prevention mechanism. The inkjet mechanism is disposed at the first through-opening. The ink storage mechanism is detachably connected to the inkjet mechanism. The leak-prevention mechanism is connected between the inkjet mechanism and the ink storage mechanism. The ink storage mechanism is connected to the ink supply module.

In an embodiment, the printhead further includes a main board disposed in the accommodating cavity. The printing module further includes an adapter board. The adapter board is electrically connected to the inkjet mechanism. The adapter board has an input interface connected to the main board of the printhead. The adapter board is connected to multiple nozzles in the inkjet mechanism.

In an embodiment, the inkjet printing device further includes a housing. The housing defines an accommodating space therein. The printing table and the printhead are disposed in the accommodating space. The ink supply module is disposed in the accommodating space. The housing defines a first opening in communication with the accommodating space. The first opening is defined above the printing table. The housing further includes a first cover-plate. The first cover-plate is configured to open or cover the first opening. The housing defines a second opening opposite to the ink supply module. The housing includes a second cover-plate. The second cover-plate is configured to open or cover the second opening.

In an embodiment, the inkjet printing device further includes a housing and an ink station module. The housing defines an accommodating space therein. The printing table and the printhead are disposed in the accommodating space. The ink station module is disposed in the accommodating space and is disposed on a moving path of the printhead. The printhead is movable to the ink station module to cooperate with the ink station module. The ink station module is configured to perform maintenance on the printhead. The maintenance includes cleaning and/or moisturizing.

In an embodiment, the ink station module includes a trigger structure. The trigger structure is configured to detect and position the printhead when the printhead cooperates with the ink station module.

In an embodiment, the trigger structure includes a protruding structure. The printing module defines a recess thereon. A sensor is provided in the protruding structure or the recess. When the printing module is located in the ink station module, the protruding structure is inserted into the recess to trigger the sensor.

In an embodiment, the ink station module includes an ink station platform, an ink pad, and a scraper. The ink station platform defines a waste collection groove on a top surface of the ink station platform. The ink pad is disposed in the waste collection groove. The scraper is disposed in the waste collection groove and is arranged side by side with the ink pad.

In an embodiment, the inkjet printing device further includes a waste-liquid cartridge and a third cover-plate. The waste-liquid cartridge is disposed in the accommodating space. The waste-liquid cartridge is connected to the ink station module to collect a waste liquid output by the ink station module. The housing defines a third opening on one side of the housing adjacent to the waste-liquid cartridge. The third opening is in communication with the accommodating space. The third cover-plate is configured to cover or open the third opening.

In an embodiment, the inkjet printing device further includes a negative-pressure module, the printing table defines a suction cavity therein, the printing table defines a vacuum hole on a surface of the printing table, the vacuum hole is in communication with the suction cavity, and the negative-pressure module is disposed in the suction cavity; and/or the printing table is provided with a material detection mechanism, and the printing table defines a detection slot thereon, and the material detection mechanism is disposed in the detection slot.

In an embodiment, the inkjet printing device is further provided with a limiting plate extending in a second direction, the limiting plate is disposed opposite to a surface of the printing table. The limiting plate and the surface of the printing table are spaced apart from each other and cooperatively define a conveying slot, with an edge of the printing material located in the conveying slot.

In an embodiment, the ink supply module includes an ink cartridge and an ink supply line. The ink supply line is connected between the ink cartridge and the printhead. The ink cartridge is provided with an ink-material detection device. The ink-material detection device includes a first detection float inside the ink cartridge and a first detection signaler outside the ink cartridge. The first detection float is movable with a rise and fall of a liquid level in the ink cartridge. The first detection signaler is triggered when the first detection float moves to a preset height position.

In an embodiment, the ink cartridge includes a first ink-cartridge and a second ink-cartridge. The first ink-cartridge is configured to store white ink. The second ink-cartridge is configured to store color ink. The first ink-cartridge is provided with a stirring mechanism therein. The stirring mechanism includes a stirring blade and a stirring motor. The stirring blade is rotatably disposed in the first ink-cartridge. The stirring motor is disposed on an outer wall of the first ink-cartridge. A rotating shaft of the stirring motor passes through a wall surface of the first ink-cartridge and is connected to the stirring blade.

In an embodiment, the ink cartridge includes a first ink-cartridge and a second ink-cartridge. The first ink-cartridge is configured to store white ink. The second ink-cartridge is configured to store color ink. The first ink-cartridge defines a first ink-port and a second ink-port. The ink supply line has one end connected to the first ink-port. The ink supply line is provided with an ink-return branch conduit. The ink-return branch conduit is in communication with the second ink-port.

In an embodiment, the inkjet printing device further includes a material rack. The material rack is configured to allow a material to-be-printed to be wound around the material rack. The material rack includes a fifth support frame, a fixed shaft, and a material-roll structure. The fixed shaft is connected to the fifth support frame. The material-roll structure is sleeved on the fixed shaft for loading the material to-be-printed. The material-roll structure includes a first sleeve-member and a second sleeve-member. The first sleeve-member and the second sleeve-member are spaced apart from each other and are sleeved on the fixed shaft. A distance between the first sleeve-member and the second sleeve-member is adjustable. The first sleeve-member and the second sleeve-member are configured to allow the material to-be-printed to be sleeved thereon.

In a third aspect, the present disclosure provides an inkjet printing device. The inkjet printing device includes a printing table, a printhead, an ink supply module, and a pressing mechanism. The printhead is movably disposed above the printing table, and is configured to print on a printing material disposed on the printing table. The ink supply module is connected to the printhead, and is configured to supply ink to the printhead. The pressing mechanism includes a second driving mechanism and a pressing roller. The second driving mechanism includes a first support frame, a driving rod, and a handle. The driving rod is rotatably connected to the first support frame. The handle is connected to one end of the driving rod. The pressing roller is connected to the driving rod. The driving rod abuts against the pressing roller to drive the pressing roller to move towards the printing table. The second driving mechanism is configured to drive the pressing roller to move downward and to enable the pressing roller to be in an elastic deformation state.

In an embodiment, the inkjet printing device further includes a feeding mechanism. The feeding mechanism is disposed on one side of the printing table or in the printing table. The feeding mechanism is configured to drive the printing material to move in a second direction. The second direction intersects with a first direction. The first direction is a moving direction of the printhead. The feeding mechanism includes a support frame fixedly mounted on a feeding side of the printing table, a rotating shaft rotatably disposed on the support frame, and a roller sleeved on the rotating shaft. The roller is configured to contact the printing material to enable the printing material to move in the second direction.

In an embodiment, the pressing mechanism is at least partially located above the feeding mechanism, to enable the pressing mechanism to press the printing material onto the feeding mechanism.

Reference can be made to FIG. 1 to FIG. 5. In an embodiment of the present disclosure, the inkjet printing device 1000 includes a printing table 200, a printhead 100, an ink supply module 300, and a cutter module 15. The printhead 100 is movably disposed above the printing table 200, and is configured to print on the printing material disposed on the printing table 200. The ink supply module 300 is connected to the printhead 100, and is configured to supply ink to the printhead 100. The cutter module 15 is movably disposed above the printing table 200. The cutter module 15 is configured to cut the printing material disposed on the printing table 200.

The printing table 200 may form a bearing structure for the operation and processing of the whole machine, so that the printhead 100 can stably print on and process the printing material carried on the printing table 200, thereby ensuring the stable operation of the inkjet printing device 1000. The printing table 200 may be configured with a regular shape, such as a cube shape, a circular truncated cone shape, or, of course, may be configured with an irregular shape. The present disclosure does not limit the specific shape of the printing table 200. The printing table 200 can be used for supporting the printing material.

The printhead 100 may integrate ink nozzles, control components, etc., and is capable of accurately ejecting ink supplied by the ink supply module 300 onto the printing material. The principle by which the printhead 100 ejects ink to perform printing operations is known in the related art, so the structure of the printhead 100 is not limited. Here, the printhead 100 is movably disposed above the printing table 200, which may be achieved by driving the printhead 100 to move through a rail transmission device, or by driving the printhead 100 to move through a mechanical arm or other devices. The present disclosure does not limit the moving mode of the printhead 100, as long as the printhead 100 can move on the printing table 200. Thereby, the printhead 100 can perform printing operations according to a certain moving path, so that the printhead 100 can better eject ink onto the printing material to form the required images or text.

The ink supply module 300 may be connected to the printhead 100 through a pipeline to deliver ink, or the ink supply module 300 may be disposed in the printhead 100 to directly deliver ink to the print nozzles in the printhead 100. Of course, the ink supply module 300 may also supply ink to the printhead 100 in other ways, as long as the stable supply of ink to the printhead 100 for inkjet printing can be ensured. The present disclosure does not limit this.

By movably disposing the cutter module 15 above the printing table 200, the cutter module 15 can be used to cut the printing material placed on the printing table 200, thereby adjusting the size of the printing material, and facilitating direct cutting of the printing material during the printing process. Therefore, the inkjet printing device 1000 can directly output the processed printing material of the required size, thereby enabling a more convenient and reliable printing process for the inkjet printing device 1000. The cutter module 15 can be disposed on the printhead 100, thereby using the movement of the printhead 100 to synchronously drive the cutter module 15 to move. At this time, the cutter module 15 may be disposed inside the printhead 100 or may be disposed around the periphery of the printhead 100. Of course, in addition to using the printhead 100 to synchronously drive the cutter module 15 to move, the cutter module 15 and the printhead 100 may also adopt a connection structure combining a sliding rail and a slider, so that the cutter module 15 can move relative to the printhead 100 to cut the printing material. Alternatively, the cutter module 15 may be disposed above the printing table 200 in a manner capable of vertical movement, so that the cutter module 15 can cut the printing material by pressing down vertically. Therefore, there are various ways to mount the cutter module 15 and various ways to cut the printing material, and the present disclosure does not limit this.

According to the technical solution of the present disclosure, the cutter module 15 is disposed above the printing table 200, so that the printing material on the printing table 200 can be cut by the cutter module 15. Therefore, after the printhead 100 prints on the printing material, the cutter module 15 can be used to directly cut the printing material into the required size, so that one-step printing and forming by the inkjet printing device 1000 can be realized, and there is no need to manually cut the printing material after the printing output, thereby effectively improving the printing convenience and practicality of the inkjet printing device 1000.

Reference can be made to FIG. 1 to 4. In some embodiments of the present disclosure, the inkjet printing device 1000 further includes a housing 700. The housing 700 defines an accommodating space therein. The printing table 200, the printhead 100, and the cutter module 15 are disposed in the accommodating space.

It can be understood that by disposing the printing table 200, the printhead 100, and the cutter module 15 in the accommodating space, the printing process of the inkjet printing device 1000 can be carried out in a certain enclosed environment, thereby facilitating the housing 700 to play a certain role in isolation and protection, effectively reducing the interference of debris in the environment on the printing process, and ensuring the stable operation of the printing process. The housing 700 may be configured as an integral structure, or the housing 700 may be formed by splicing multiple housings. The present disclosure does not limit the shape of the housing 700.

Figure 16:
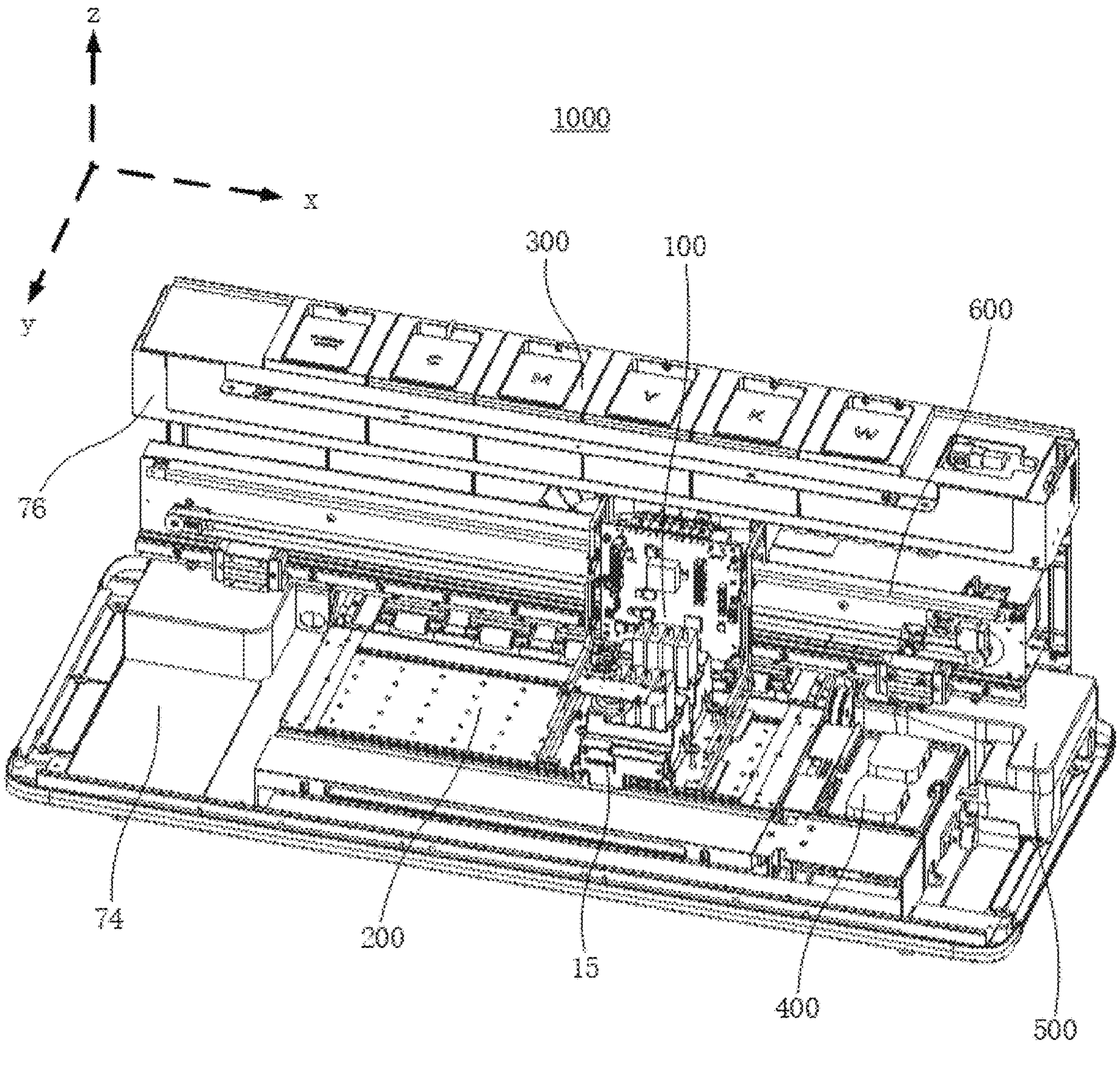
FIG. 16 is a schematic view of an internal structure of an embodiment of an inkjet printing device provided in the present disclosure.

In some implementations, the ink supply module 300 of the inkjet printing device 1000 may also be disposed in the accommodating space, so as to achieve a more functionally integrated structural design of the inkjet printing device 1000. At this time, the ink supply module 300 may be disposed behind the printhead 100, so as to avoid the ink supply module 300 from interfering with the printhead 100 when performing printing operations on the printing table 200. Therefore, a more reasonable layout design of various components of the inkjet printing device 1000 in the accommodating space can be realized, thereby facilitating a compact overall design of the inkjet printing device 1000 and further improving the practicality and reliability of the inkjet printing device 1000. For ease of understanding and explanation, the directions indicated by the coordinate system illustrated in FIG. 16 are used as references in the present disclosure. The first direction is a positive direction of the x-axis, and the second direction is a positive direction of the y-axis. The positive direction of the x-axis is to the right, and a negative direction of the x-axis is to the left. The positive direction of the y-axis is forward, and a negative direction of the y-axis is backward. A positive direction of the z-axis is upward, and a negative direction of the z-axis is downward.

Reference can be made to FIG. 1. In some embodiments of the present disclosure, the housing 700 defines a first opening 71*a* that is in communication with the accommodating space. The first opening 71*a* is defined above the printing table 200. The housing 700 further includes a first cover-plate 71*b*. The first cover-plate 71*b* can open or cover the first opening 71*a*.

In the present disclosure, by defining the first opening 71*a* that is on the housing 700 and above the printing table 200, the operation status of the printhead 100, the printing table 200, or other components disposed in the accommodating space can be observed through the first opening 71*a*, thereby facilitating timely intervention, maintenance, or replacement of malfunctioning components, and ensuring the stable operation of the inkjet printing device 1000. The first opening 71*a* may be configured with a regular shape, such as a rectangle or a circle, or, of course, may be configured with an irregular shape. The present disclosure does not limit the shape of the first opening 71*a*.

In addition, by providing the first cover-plate 71*b* to open or cover the first opening 71*a*, the first cover-plate 71*b* may have a connection relationship with the housing 700. For example, the first cover-plate 71*b* may be rotatably connected to the housing 700 to open or cover the first opening 71*a*, or the first cover-plate 71*b* may be slidably connected to the housing 700 to open or cover the first opening 71*a*. Of course, the first cover-plate 71*b* and the housing 700 may also be provided and separable, so that the first cover-plate 71*b* is detached from the housing 700 when it is necessary to open the first opening 71*a*, and the first cover-plate 71*b* is placed on the housing 700 when it is necessary to close the first opening 71*a*. Therefore, there are various connection methods between the first cover-plate 71*b* and the housing 700, and the present disclosure does not limit this. The first cover-plate 71*b* may be made of a material with certain light-transmitting properties, such as glass or acrylic, which facilitates observing the operation status of the components in the accommodating space through the first cover-plate 71*b* even when the first cover-plate 71*b* closes the first opening 71*a*. Of course, the first cover-plate 71*b* may also be made of a material with higher structural strength, such as steel. The present disclosure does not limit the material of the first cover-plate 71*b*. In some implementations, the first cover-plate 71*b* may be configured with a regular shape, such as a square or a circle, or, of course, may be configured with an irregular shape. The present disclosure does not limit the shape of the first cover-plate 71*b*. The first cover-plate 71*b* may be transparent or semi-transparent, so that the printing status inside can be directly observed through the first cover-plate 71*b*.

In some implementations, the housing 700 may be provided with an open-and-close detection device. The open-and-close detection device is configured to detect an open-and-close state of the first cover-plate 71*b*. It can be understood that the open-and-close detection device may have two triggering states. When the first cover-plate 71*b* covers the first opening 71*a*, one triggering state of the open-and-close detection device may be correspondingly triggered; and when the first cover-plate 71*b* opens the first opening 71*a*, the other triggering state of the open-and-close detection device can be triggered. Therefore, certain system controls can be executed according to the state changes of the open-and-close detection device. For example, when the open-and-close detection device detects that the first cover-plate 71*b* opens the first opening 71*a*, the components in the accommodating space can be controlled to be in a suspended operation state, thereby facilitating the maintenance of the components; or when the printing operation can be started only when the open-and-close detection device detects that the first cover-plate 71*b* covers the first opening 71*a*. Similarly, the open-and-close detection device may also be linked with other control systems, which is not limited in the present disclosure. The open-and-close detection device may have various structures. For example, a travel switch may be used, so that the first cover-plate 71*b* is in contact with a triggering part of the travel switch when the first cover-plate 71*b* covers the first opening 71*a*, and the first cover-plate 71*b* is separated from the triggering part of the travel switch when the first cover-plate 71*b* opens the first opening 71*a*. Alternatively, a Hall sensor may be used. At this time, a magnet may be provided on the first cover-plate 71*b*, so that the magnet approaches the Hall sensor when the first cover-plate 71*b* covers the first opening 71*a*, and the magnet moves away from the Hall sensor when the first cover-plate 71*b* opens the first opening 71*a*. The present disclosure does not limit the open-and-close detection device.

Figure 2:
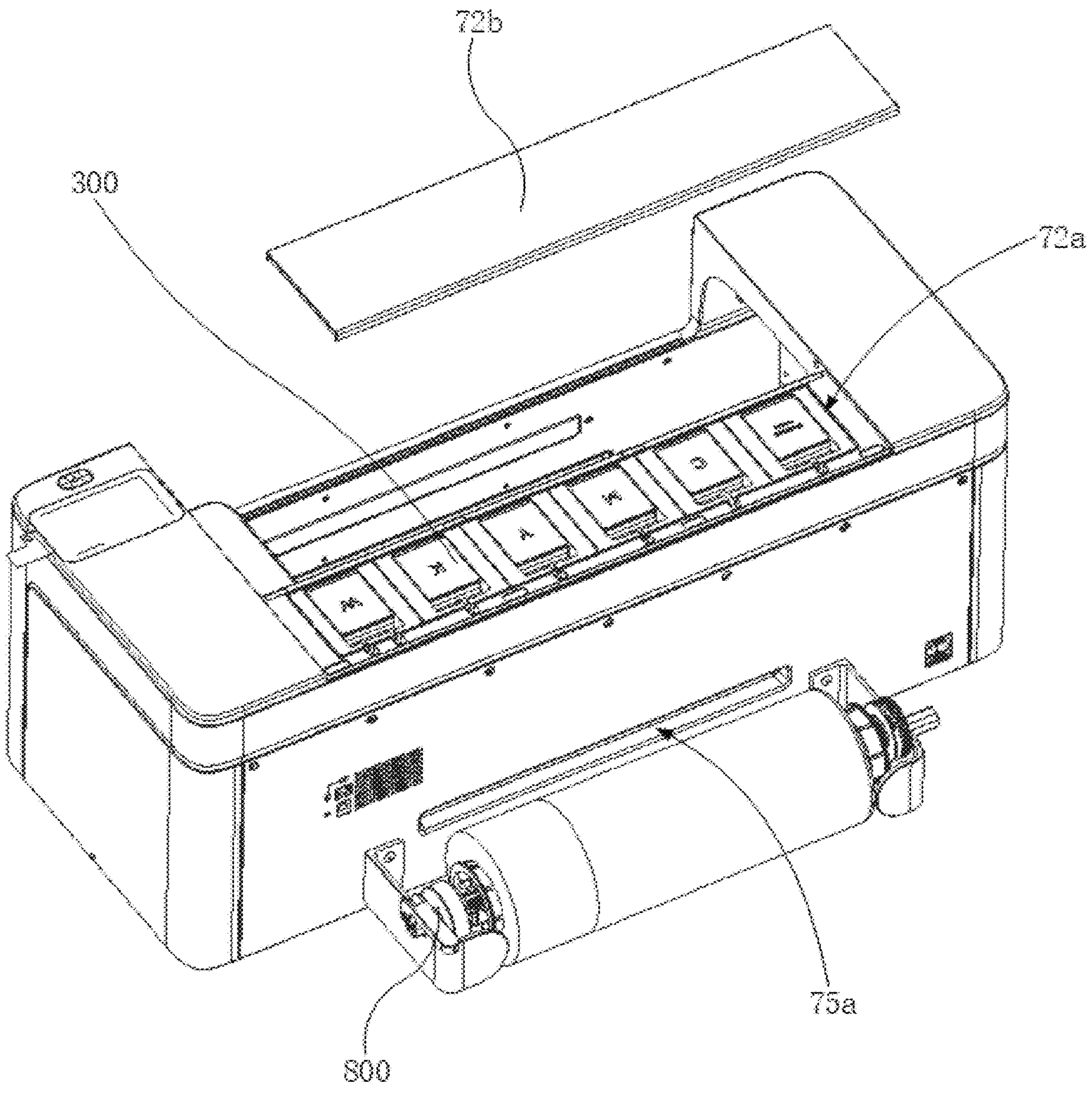
FIG. 2 is a schematic structural view of the inkjet printing device in FIG. 1 from another perspective.

Reference can be made to FIG. 2. In some embodiments of the present disclosure, when the ink supply module 300 is disposed in the accommodating space, the housing 700 may define a second opening 72*a* in communication with the accommodating space. The second opening 72*a* may be correspondingly located above the ink supply module 300, or may be correspondingly located behind the ink supply module 300. The present disclosure does not limit the position of the second opening 72*a*, as long as the ink supply module 300 can be exposed through the second opening 72*a*.

The second opening 72*a* may be configured with a regular shape, such as a rectangle or a circle, or, of course, may be configured with an irregular shape. The present disclosure does not limit the shape of the second opening 72*a*. Therefore, operations such as ink filling, overhaul and maintenance, and pipeline dredging can be performed on the ink supply module 300 through the second opening 72*a*, so as to ensure the stable operation of the inkjet printing device 1000. The housing 700 may also include a second cover-plate 72*b*. The second cover-plate 72*b* can open or cover the second opening 72*a*. The second cover-plate 72*b* may have a connection relationship with the housing 700. For example, the second cover-plate 72*b* may be slidably connected to the housing 700 to open or cover the second opening 72*a*, or the second cover-plate 72*b* may be rotatably connected to the housing 700 to open or cover the second opening 72*a*. Of course, the second cover-plate 72*b* may not have a connection relationship with the housing 700, that is, the second cover-plate 72*b* and the housing 700 are provided and separable. When the second opening 72*a* needs to be covered, the second cover-plate 72*b* can be placed on the housing 700. When the second opening 72*a* needs to be opened, the second cover-plate 72*b* can be detached from the housing 700. There are many connection methods between the second cover-plate 72*b* and the housing 700, which is not limited in the present disclosure.

Exemplarily, the second cover-plate 72*b* is provided with a first magnetic member. The housing 700 is provided with a second magnetic member around the second opening 72*a*. The second cover-plate 72*b* is magnetically connected to the housing 700. The first magnetic member may be a magnet with a certain magnetism. At this time, the second magnetic member may be a magnet with the opposite magnetism to the first magnetic member or a metal member capable of magnetic attraction. Alternatively, the second magnetic member may be a magnet with a certain magnetism. At this time, the first magnetic member may be a magnet with the opposite magnetism to the first magnetic member or a metal member capable of magnetic attraction. The present disclosure does not limit the first magnetic member and the second magnetic member as long as mutual magnetic attraction can be realized. By magnetically connecting the second cover-plate 72*b* to the housing 700, the second cover-plate 72*b* can be opened and closed on the housing 700 more conveniently, thereby further improving the operational convenience of the inkjet printing device 1000.

Figure 3:
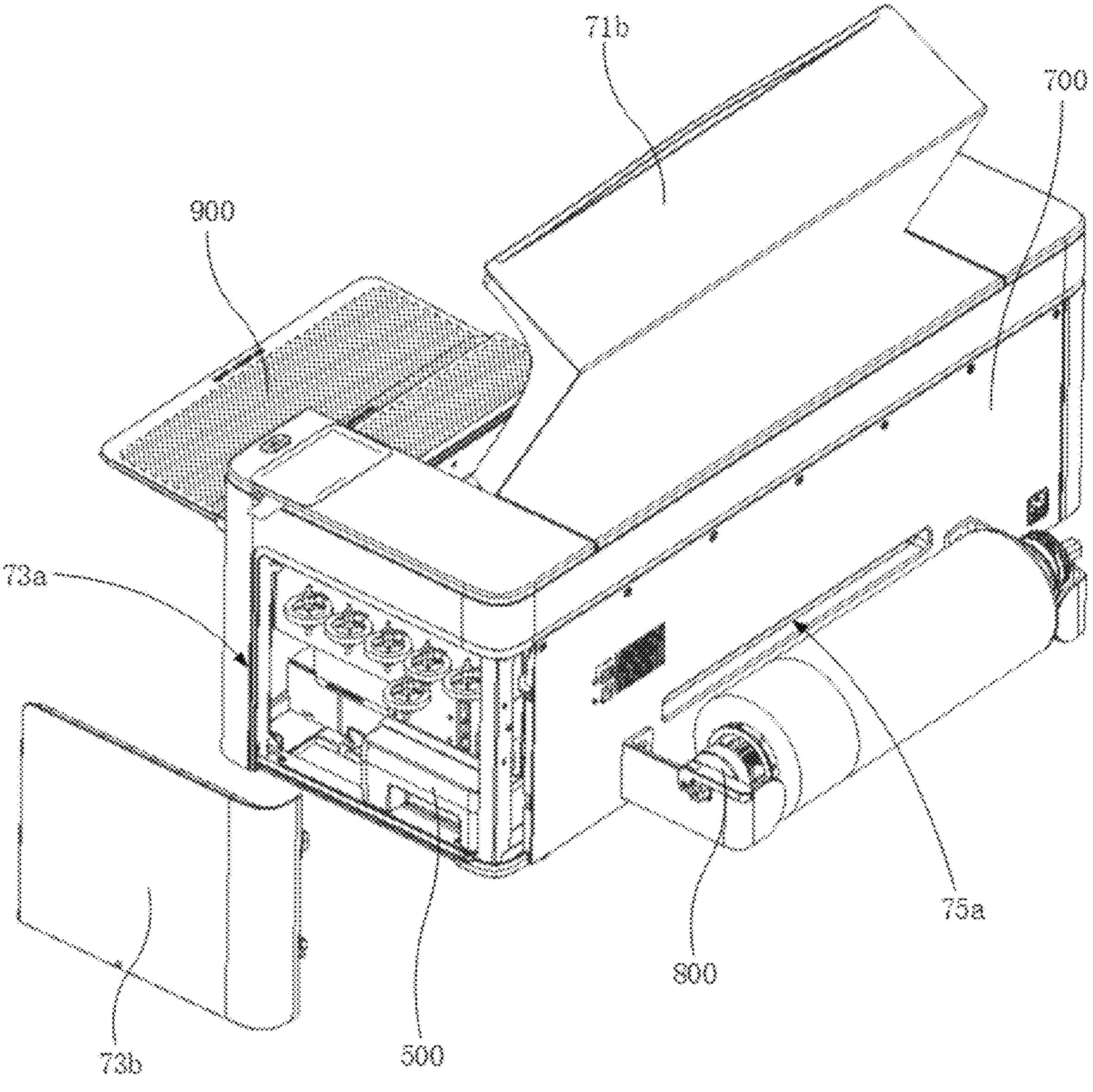
FIG. 3 is a schematic structural view of the inkjet printing device in FIG. 1 from yet another perspective.

Reference can be made to FIG. 3. In some embodiments of the present disclosure, when the inkjet printing device 1000 is provided with an ink station module 400 and a waste-liquid cartridge 500, and the waste-liquid cartridge 500 is disposed in the accommodating space, the housing 700 may define a third opening 73*a* on one side of the housing 700 adjacent to the waste-liquid cartridge 500, and the third opening 73*a* is in communication with the accommodating space. Therefore, the waste-liquid cartridge 500 can be exposed through the third opening 73*a*, thereby facilitating disassembly and assembly of the waste-liquid cartridge 500 through the third opening 73*a* more conveniently, and further improving the operational convenience of the inkjet printing device 1000. The third opening 73*a* may be configured with a regular shape, such as a rectangle or a circle, or, of course, may be configured with an irregular shape. The present disclosure does not limit the shape of the third opening 73*a*.

In some implementations, the housing 700 may be provided with a third cover-plate 73*b* to cover or open the third opening 73*a*, so as to ensure the integrity and esthetics of the machine body, and at the same time facilitate the disassembly and assembly of the waste-liquid cartridge 500 on the housing 700. The third cover-plate 73*b* may have a connection relationship with the housing 700. For example, the third cover-plate 73*b* is slidably connected to the housing 700 to open or cover the third opening 73*a*, or the third cover-plate 73*b* is rotatably connected to the housing 700 to open or cover the third opening 73*a*. Of course, the third cover-plate 73*b* may not have a connection relationship with the housing 700, that is, the third cover-plate 73*b* and the housing 700 are provided and separable. When it is necessary to cover the third opening 73*a*, the third cover-plate 73*b* is placed on the housing 700, and when it is necessary to open the third opening 73*a*, the third cover-plate 73*b* is detached from the housing 700. There are many connection methods between the third cover-plate 73*b* and the housing 700, which is not limited in the present disclosure.

In addition, the ink station module 400 may be disposed in the accommodating space and disposed on a moving path of the printhead 100. The ink station module 400 may be used to clean the printing module 13 of the printhead 100, so as to avoid the blockage or contamination of the inkjet outlet of the printing module 13. When the printhead 100 performs printing operations for a certain period of time or is in standby mode after pausing operations, the printhead 100 can be adjusted to a maintenance state at this time, so that the printhead 100 moves to a position above the ink station module 400 for cleaning or docking, thereby facilitating the printhead 100 to better perform subsequent printing operations, and further improving the practicability and reliability of the inkjet printing device 1000. Exemplarily, reference can be made to FIG. 4 and FIG. 16. When the printhead 100 can reciprocate in the first direction to perform printing operations, the ink station module 400 and the printing table 200 can be arranged in the first direction, that is, the ink station module 400 may be located on the left or right side of the printing table 200, thereby facilitating the movement of the printhead 100 between the ink station module 400 and the printing table 200, and realizing a more compact structural design of the inkjet printing device 1000. Of course, the ink station module 400 and the printing table 200 may also be arranged in other ways in the accommodating space, as long as the movement and processing of the printhead 100 can be cooperated with. The present disclosure does not limit this.

Figure 4:
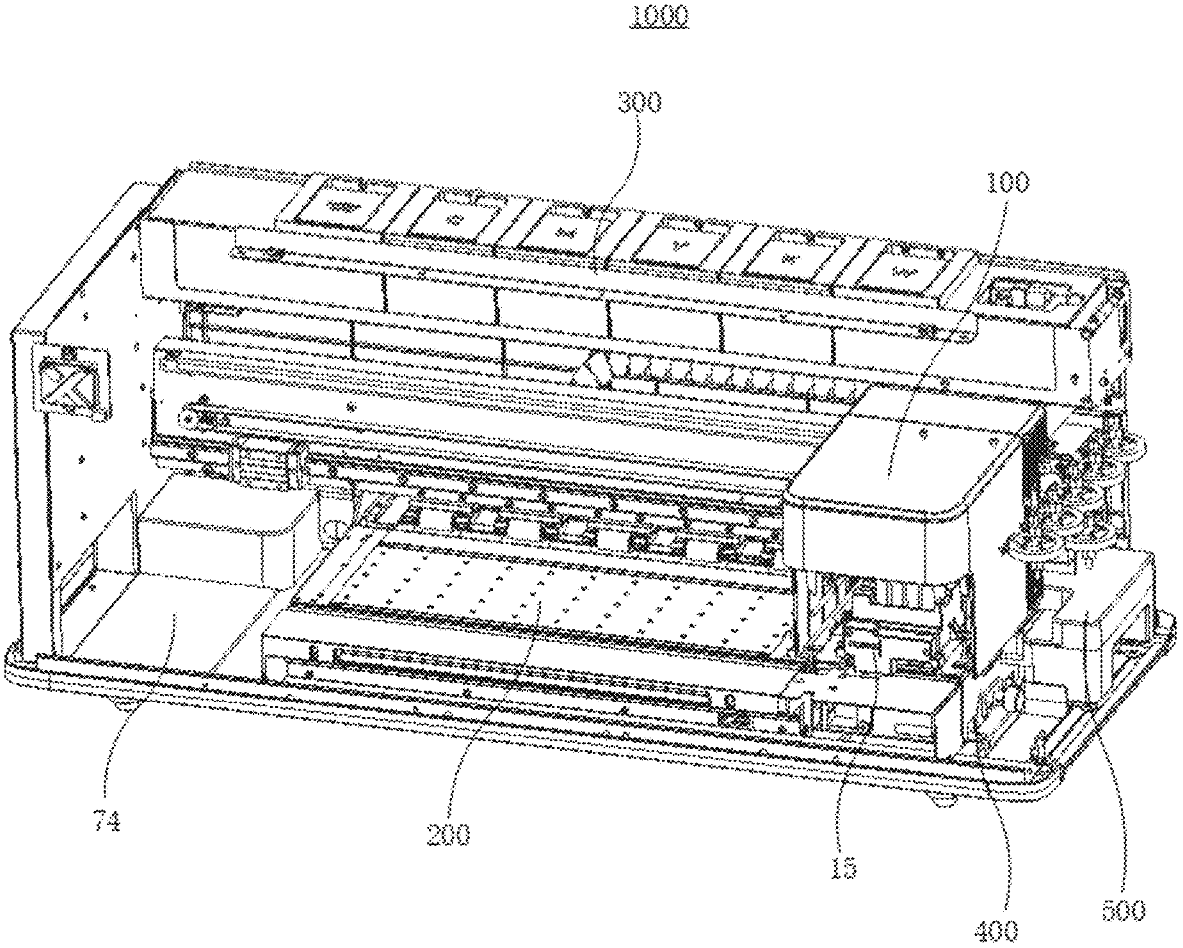
FIG. 4 is a schematic structural view of an embodiment of the inkjet printing device in FIG. 1 with a housing removed.
Figure 5:
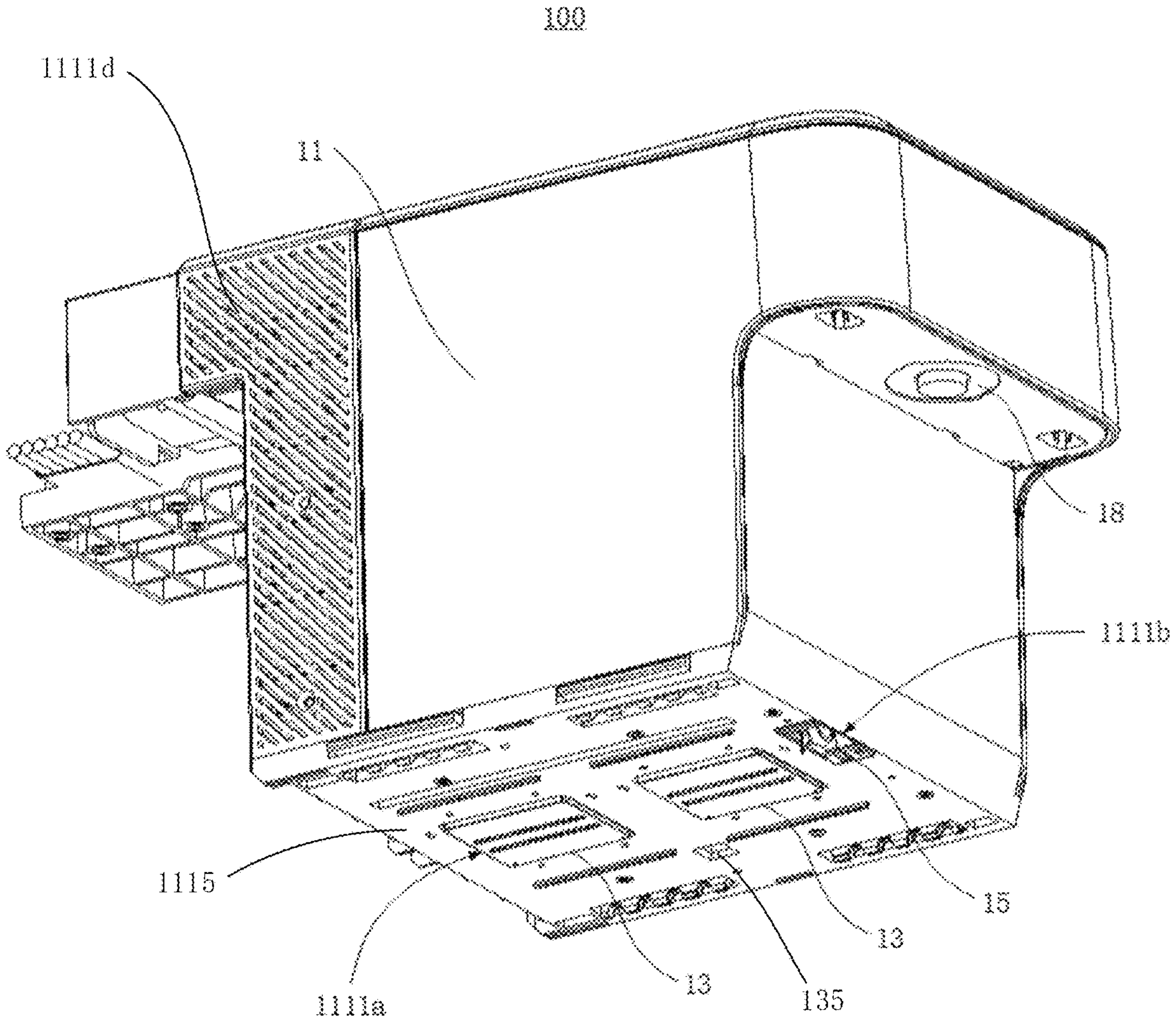
FIG. 5 is a schematic structural view of a printhead of an inkjet printing device provided in an embodiment of the present disclosure.

Reference can be made to FIG. 4 and FIG. 16. In some embodiments of the present disclosure, the inkjet printing device 1000 further includes a reflective structure 74. The reflective structure 74 is disposed close to the printing table 200. Through the reflective structure 74, the operation status of the printing module 13 of the printhead 100 or the sharpness of the cutter module 15 can be observed, so as to facilitate the maintenance of the printing module 13 and the cutter module 15. The reflective structure 74 may employ a reflective mirror, or employ a metal member having a certain reflective effect, etc. The present disclosure does not limit this.

Exemplarily, the reflective structure 74 may be disposed on the moving path of the printhead 100. At this time, the inkjet printing device 1000 can control the printhead 100 to be adjusted to a first observation state, so that the printhead 100 can stably move to a position above the reflective structure 74 and the operation status of the printing module 13 can be observed. In some implementations, the reflective structure 74 may also be disposed on a moving path of the cutter module 15. At this time, the inkjet printing device 1000 can control the cutter module 15 to be adjusted to a second observation state, so that the cutter module 15 can stably move to a position above the reflective structure 74 and the sharpness of the cutter module 15 can be observed. The moving paths of the printhead 100 and the cutter module 15 may be made to have at least partial overlap. For example, the cutter module 15 may be disposed on the printhead 100 to move synchronously, so that the reflective structure 74 may be disposed at a position where the moving paths of the cutter module 15 and the printhead 100 overlap. Alternatively, the reflective structure 74 may be designed with a structure of relatively large size, so that the reflective structure 74 may be located on both a certain moving path of the printhead 100 and a certain moving path of the cutter module 15. Of course, the reflective structure 74 may also be designed in other ways, as long as the reflective structure 74 can be located on the moving path of the printhead 100 and the moving path of the cutter module 15. The present disclosure does not limit this.

Figure 17:
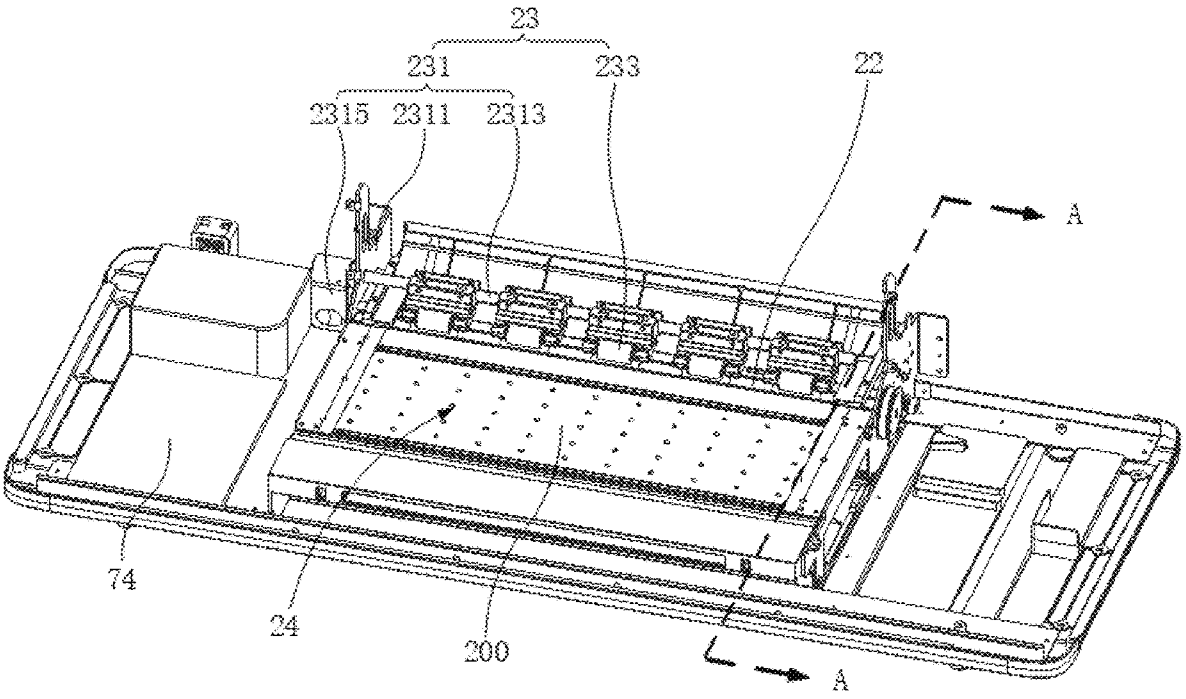
FIG. 17 is a schematic structural view of an embodiment of a printing table in FIG. 16.

In addition, referring to FIG. 16 and FIG. 17, when the printhead 100 and the cutter module 15 can reciprocate in the first direction, the reflective structure 74 and the printing table 200 can be arranged in the first direction, that is, the reflective structure 74 can be located on the left or right side of the printing table 200, thereby facilitating the movement of the printhead 100 and the cutter module 15 between the reflective structure 74 and the printing table 200, and realizing a more compact structural design of the inkjet printing device 1000. Of course, the reflective structure 74 and the printing table 200 may also be arranged in other ways in the accommodating space, as long as the movement of the printhead 100 and the cutter module 15 can be cooperated with. The present disclosure does not limit this.

In some implementations, the housing 700 may define a fourth opening at a position of the housing 700 adjacent to the reflective structure 74, and the fourth opening is in communication with the accommodating space. Therefore, the reflective structure 74 can be clearly observed through the fourth opening, and the operation status of the printhead 100 and the cutter module 15 can be understood, so that the printing module 13 can be cleaned or the cutter module 15 can be maintained and replaced in time. The fourth opening may be configured with a regular shape, such as a rectangle or a circle, or, of course, may be configured with an irregular shape. The present disclosure does not limit the shape of the fourth opening.

In some implementations, the housing 700 may be provided with a fourth cover-plate for covering or opening the fourth opening, so as to ensure the integrity and esthetics of the machine body, and at the same time, it is convenient to observe the printhead 100 and the cutter module 15 through the reflective structure 74. The fourth cover-plate may have a connection relationship with the housing 700. For example, the fourth cover-plate is slidably connected to the housing 700 to open or cover the fourth opening, or the fourth cover-plate is rotatably connected to the housing 700 to open or cover the fourth opening. Of course, the fourth cover-plate may not have a connection relationship with the housing 700, that is, the fourth cover-plate and the housing 700 are provided and separable. When it is necessary to cover the fourth opening, the fourth cover-plate can be placed on the housing 700, and when it is necessary to open the fourth opening, the fourth cover-plate can be detached from the housing 700. There are many connection methods between the fourth cover-plate and the housing 700, which is not limited in the present disclosure.

Reference can be made to FIG. 1 to FIG. 3. In some embodiments of the present disclosure, the housing 700 may further define a printing-material inlet 75*a* and a printing-material outlet 75*b* on two opposite sides of the housing 700 respectively. The printing-material inlet 75*a* and the printing-material outlet 75*b* may be respectively defined with respect to the feeding side and the discharging side of the printing table 200, so that the printing material can be fed into the machine body through the printing-material inlet 75*a* for printing processing, and the printed printing material can be output through the printing-material outlet 75*b*. The printing-material inlet 75*a* and the printing-material outlet 75*b* can be configured with regular shapes such as rectangles, ellipses, or, of course, may be configured with irregular shapes. The present disclosure does not limit the shapes of the printing-material inlet 75*a* and the printing-material outlet 75*b*.

Reference can be made to FIG. 1. In some embodiments of the present disclosure, the inkjet printing device 1000 may be provided with a display module 1001. Therefore, it is conducive to using the display module 1001 to display at least part of the operation status of the inkjet printing device 1000, and it meanwhile facilitates a more intuitive operation of the inkjet printing device 1000, thereby improving the practicability and reliability of the inkjet printing device 1000.

Reference can be made to FIG. 5 to FIG. 9. The printhead 100 provided in the present disclosure includes a shell 11, a printing module 13, and a cutter module 15. The shell 11 defines an accommodating cavity therein. The shell 11 has a printing surface 1115, on which a first through-opening 1111*a* and a second through-opening 1111*b* that are in communication with the accommodating cavity are defined. The first through-opening 1111*a* is spaced apart from the second through-opening 1111*b*. The printing module 13 is disposed in the accommodating cavity and is opposite to the first through-opening 1111*a*, and the printing module 13 is configured to print on and process the printing material. The cutter module 15 is disposed in the accommodating cavity and is opposite to the second through-opening 1111*b*, and the cutter module 15 is configured to cut the printing material.

The shell 11 may have a hollow box structure for defining the accommodating cavity, and the printing module 13 and the cutter module 15 can be placed in the accommodating cavity, so as to provide isolation and protection for the functional modules placed inside the shell 1, thereby improving the protection performance of the printhead 100. In some embodiments, the shell 11 may be cuboid-shaped, square-shaped, or have other shapes.

In some implementations, one side of the shell 11 is used to form the printing surface 1115. By defining the first through-opening 1111*a* on the printing surface 1115, the printing module 13 in the accommodating cavity can operate outwardly to print preset images or text on the printing material. By further defining the second through-opening 1111*b* on the printing surface 1115, the cutter module 15 in the accommodating cavity can operate outwardly to cut the printing material on the printing table. The printing surface 1115 may be a flat surface formed at the bottom end of the shell 11 facing towards the printing table. The shape of the first through-opening 1111*a* or the second through-opening 1111*b* can be a cuboid, a cube, or other shapes, which is not limited here. In one embodiment, the first through-opening 1111*a* may be shaped to correspond to the printing module 13, and the second through-opening 1111*b* may be shaped to correspond to the cutter module 15, so as to facilitate the positioning and assembly of the shell 11 with the printing module and the cutter module 15, respectively.

Reference can be made to FIG. 5 to FIG. 10. In embodiments of the present disclosure, the cutter module 15 includes a first driving mechanism 151 and a cutter assembly 153. The first driving mechanism 151 is disposed in the accommodating cavity. The cutter assembly 153 is drivingly connected to the first driving mechanism 151, so that the cutter assembly 153 has an extended state in which at least part of the cutter assembly 153 extends out of the second through-opening 1111*b* and a retracted state in which the cutter assembly 153 retracts through the second through-opening 1111*b*.

It should be noted that the inkjet printing device includes a driving device provided outside the printhead 100. The printhead 100 can be drivingly connected to the driving device. During use, the printhead 100 can be driven by the driving device to move relative to the printing material to move to a corresponding position of the printing material, and print on the printing material by the printing module 13 and divide the printing material by the cutter module 15.

The printing module 13 may be entirely disposed in the accommodating cavity of the shell 11, or one part of the printing module 13 may be disposed in the accommodating cavity and the other part of the printing module 13 is disposed outside the accommodating cavity, which is not limited here. The cutter module 15 may be disposed to be extendable and retractable relative to the second through-opening 1111*b*. During the printing step, the printing surface 1115 of the printhead 100 is disposed opposite to the printing material in the vertical direction, that is, opposite in the third direction. The printing module 13 can perform inkjet printing on the printing material below, while the cutter assembly 153 is retracted back to the accommodating cavity through the second through-opening 1111*b* and remains in the retracted state, so as to prevent a cutter 1533 from damaging the printing material during movement and printing of the printhead 100, thereby avoiding affecting the processing effect of the printhead 100.

After completing the step of printing on the printing material, the printing module 13 stops performing inkjet printing on the printing material, while the cutter assembly 153 is switched to the extended state in which at least part of the cutter assembly 153 extends out of the second through-opening 1111*b*, so that the printed printing material can be cut through the part of the cutter assembly 153 extending out of the second through-opening 1111*b*.

Figure 10:
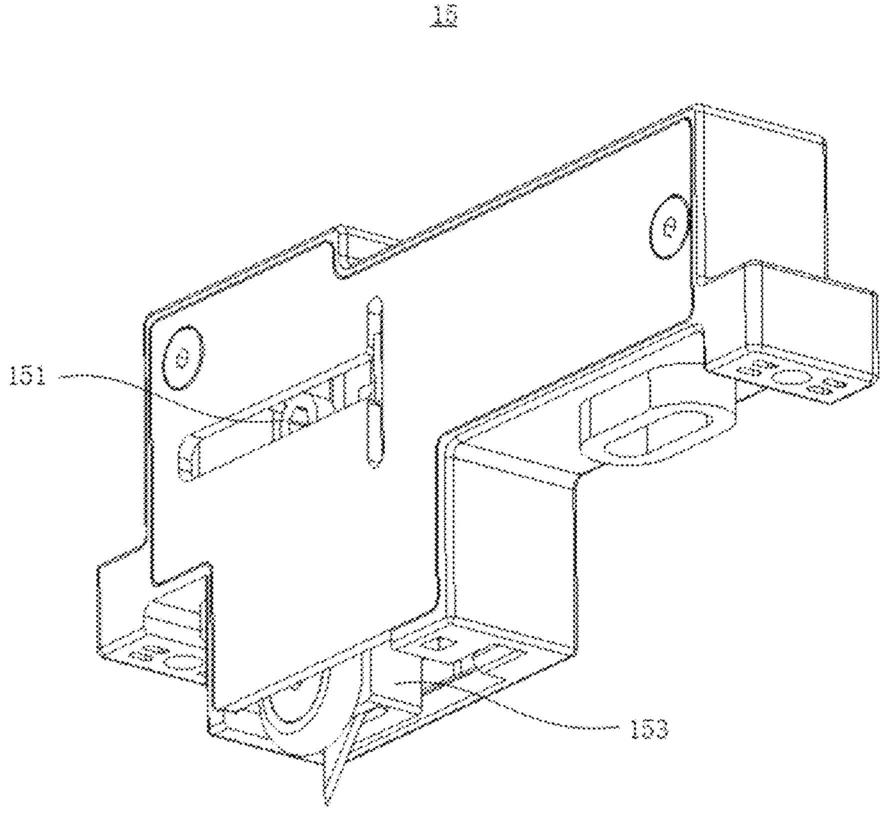
FIG. 10 is a schematic structural view of an embodiment of a cutter module of the printhead in FIG. 5.
Figure 11:
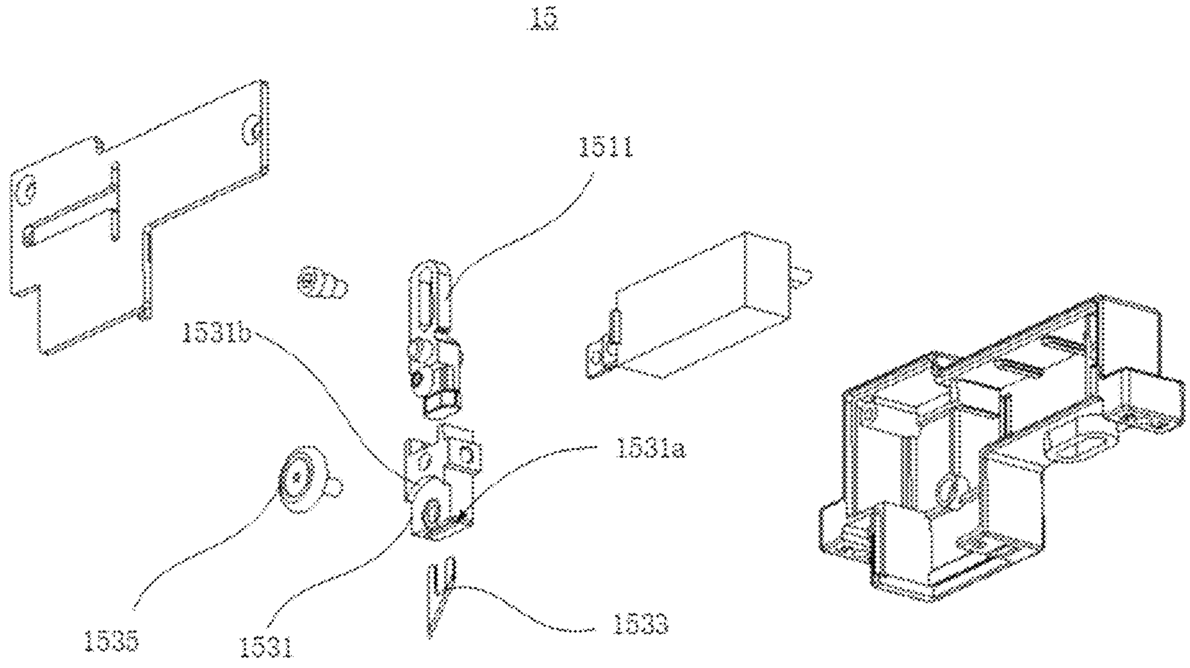
FIG. 11 is an exploded view of an embodiment of the cutter module of the printhead in FIG. 10.

Reference can be made to FIG. 10 and FIG. 11. In an embodiment of the present disclosure, the first driving mechanism 151 includes a rotating portion 1511. One end of the rotating portion 1511 is disposed opposite to the second through-opening 1111*b* and is connected to the cutter assembly 153. The rotating portion 1511 is configured to rotate relative to the second through-opening 1111*b* to drive the cutter assembly 153 to rotate towards or away from the second through-opening 1111*b*.

The rotating portion 1511 is a mechanism that provides power to the cutter assembly 153 to drive the cutter assembly 153 to rotate towards or away from the second through-opening 1111*b*. The rotating portion 1511 may provide power by purely mechanical driving means, or by electric driving means. For example, the rotating portion 1511 may be, but is not limited to, configured as a rotating motor or other electric driving structures. The specific configuration of the rotating portion 1511 can be selected by those skilled in the art.

The rotating portion 1511 may be directly connected to the cutter assembly 153 to drive the cutter assembly 153 to rotate relative to the second through-opening 1111*b*. The rotating portion 1511 may also be indirectly connected to the cutter assembly 153 through a transmission structure to drive the cutter assembly 153 to rotate by driving the transmission structure to move.

Figure 12:
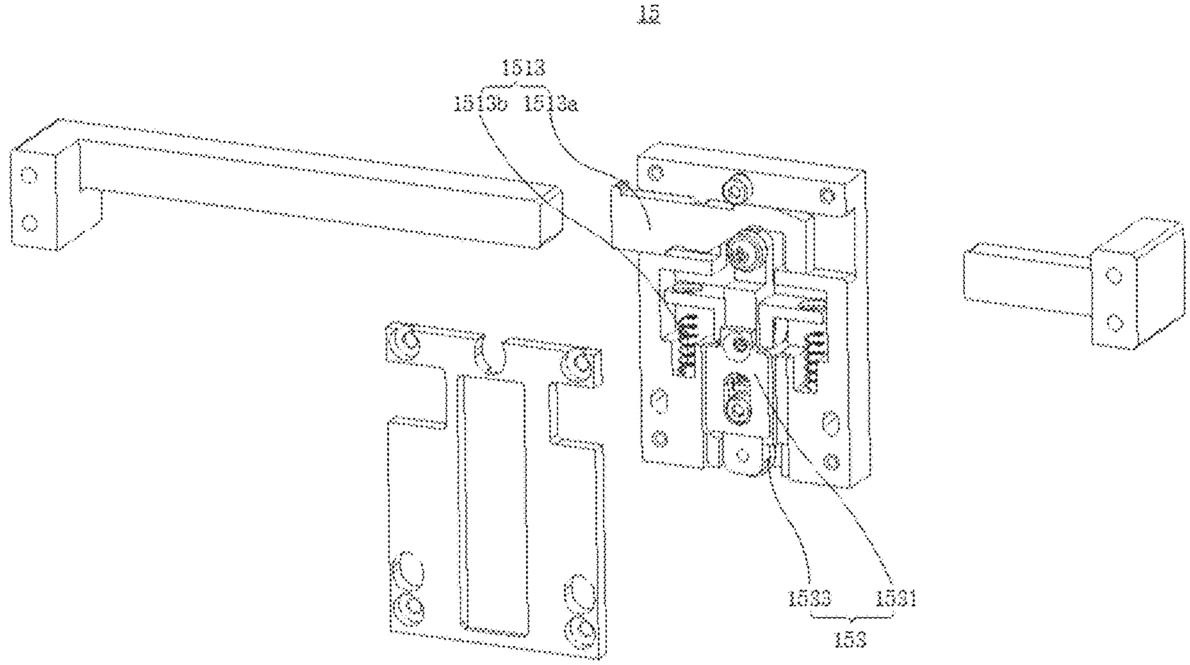
FIG. 12 is an exploded view of another embodiment of the cutter module of the printhead in FIG. 5.

Reference can be made to FIG. 12. In another embodiment of the present disclosure, the first driving mechanism 151 includes a translating portion 1513. One end of the translating portion 1513 is disposed opposite to the second through-opening 1111*b* and is connected to the cutter assembly 153. The translating portion 1513 is configured for translational movement relative to the second through-opening 1111*b*, so as to drive the cutter assembly 153 to move towards or away from the second through-opening 1111*b*.

The translating portion 1513 is a mechanism that provides power to the cutter assembly 153 to drive the cutter assembly 153 to move linearly towards or away from the second through-opening 1111*b*. The translating portion 1513 may provide power by purely mechanical driving means, or by electric driving means. For example, the translating portion may be, but is not limited to, a linear motor, a linear module, or other electric driving structures. The specific configuration of the translation portion 1513 can be selected by those skilled in the art.

The translating portion 1513 may be directly connected to the cutter assembly 153 to drive the cutter assembly 153 to move translationally towards or away from the second through-opening 1111*b*. The translating portion 1513 may also be indirectly connected to the cutter assembly 153 through a transmission structure to drive the cutter assembly 153 to perform translational movement by driving the transmission structure.

In some embodiments, the translating portion 1513 may include a pushing member 1513*a* and a first elastic member 1513*b*. In some implementations, the pushing member 1513*a* is movably disposed on one side of the cutter assembly 153 and has an extended position and a retracted position. When the pushing member 1513*a* is in the extended position, the pushing member 1513*a* is configured to abut against the cutter 1533 to drive the cutter assembly 153 to be in the extended state. When the pushing member 1513*a* is in the retracted position, the pushing member 1513*a* is configured to disengage from the cutter 1533. The first elastic member 1513*b* is elastically connected to the cutter assembly 153 and the pushing member 1513*a*. The first elastic member 1513*b* is configured to drive the cutter assembly 153 to return to the retracted state when the pushing member 1513*a* is in the retracted position.

The pushing member 1513*a* may be configured as an electric driving structure. Alternatively, it is assumed that the printhead 100 has a pushing stroke moving in a forward direction of the first direction and a reset stroke moving in an opposite direction of the first direction, and the pushing member 1513*a* is movably disposed in the first direction. The pushing member 1513*a* is configured to abut against a stopper outside the printhead 100 and move to the extended position when the printhead 100 completes the pushing stroke, so as to drive at least part of the cutter assembly 153 to extend out of the second through-opening 1111*b*; or is configured to abut against another stopper outside the printhead 100 and move to the retracted position when the printhead 100 completes the reset stroke, so as to drive the cutter assembly 153 to retract back to the accommodating cavity through the second through-opening 1111*b*.

Of course, the technical solution of the present disclosure is not limited to this. In some embodiments, the first driving mechanism 151 may include a variety of driving structures. The variety of driving structures can be used for the rotating portion 1511 and the translating portion in the aforementioned embodiment, so that the cutter assembly 153 can be driven by the first driving mechanism 151 to rotate or translate relative to the second through-opening 1111*b* in the multi-axis direction. In this way, the freedom of movement of the cutter assembly 153 can be improved. The specific implementation can be configured according to actual needs and is not limited here.

Reference can be made to FIG. 11. In embodiments of the present disclosure, the cutter assembly 153 includes a frame body 1531 and a cutter 1533. One end of the frame body 1531 is drivingly connected to the first driving mechanism 151. The cutter 1533 is disposed at one end of the frame body 1531 away from the first driving mechanism 151, and is detachably connected to the frame body 1531.

The frame body 1531 serves as a fixed structure for mounting of the cutter 1533 and can be drivingly connected to the first driving mechanism 151, so that the cutter 1533 can be driven to perform extendable and retractable movement relative to the second through-opening 1111*b* under the driving of the first driving mechanism 151. Since the cutter 1533 is detachably connected to the frame body 1531 and the cutter assembly 153 is disposed opposite to the second through-opening 1111*b*, a user can, without removing the shell 11, assemble the cutter 1533 to the frame body 1531 or disassemble the cutter 1533 from the frame body 1531 through the second through-opening 1111*b*, thereby improving the convenience of the assembly and disassembly of the cutter 1533.

In this embodiment, the frame body 1531 may also define a limiting groove 1531*a*. Part of the cutter 1533 can be inserted into the limiting groove 1531*a*. Therefore, by means of the limiting effect of the limiting groove 1531*a* on the cutter 1533, the quick positioning of the cutter 1533 and the frame body 1531 can be realized, and the connection stability between the cutter 1533 and the frame body 1531 can be improved.

It should be noted that the cutter 1533 may be detachably connected to the frame body 1531 by magnetic engagement, or by threaded connection, or may be detachably mounted to the frame body 1531 by other means. In some embodiments, the cutter 1533 may also be mounted to the frame body 1531 by two or more detachable connection methods simultaneously. For example, on the basis of the magnetic connection between the cutter 1533 and the frame body 1531, the cutter 1533 can be further locked to the frame body 1531 by a screw structure. In this way, the connection stability between the frame body 1531 and the cutter 1533 can be further improved.

Reference can be made to FIG. 11. In an embodiment of the present disclosure, the cutter assembly 153 further includes a pressing member 1535. The pressing member 1535 is disposed at one end of the frame body 1531 away from the first driving mechanism 151, and protrudes from the frame body 1531. The pressing member 1535 is arranged side by side with the cutter 1533. The pressing member 1535 is configured to press against the printing material. It can be understood that when the cutter 1533 cuts the printing material, the pressing member 1535 can press the printing material from the side of the cutter 1533 through an outer peripheral surface of the pressing member 1535, so as to prevent the printing material from lifting and avoiding affecting the cutting effect of the cutter assembly 153 on the printing material. The pressing member 1535 may have a wheel-shaped structure, with its central axis direction perpendicular to a cutting surface of the cutter 1533. Of course, the pressing member 1535 may also be configured in other shapes, which is not limited here.

In this embodiment, the frame body 1531 may be provided with surrounding edge structure 1531*b* protruding from a sidewall of the frame body 1531. The surrounding edge structure 1531*b* is disposed at one end of the pressing member 1535 away from the second through-opening 1111*b* and surrounds the periphery of the pressing member 1535. In this way, the sidewall of the surrounding edge structure 1531*b* can cooperate with the outer peripheral surface of the pressing member 1535 for limiting, to realize the quick positioning of the pressing member 1535 and the frame body 1531, thereby improving the connection stability between the pressing member 1535 and the frame body 1531. The positioning and limiting between the frame body 1531 and the pressing member 1535 may also be realized through other limiting structures, such as the cooperation of positioning holes and positioning protrusions, which is not limited in the present disclosure.

In some implementations, the pressing member 1535 may be detachably connected to the frame body 1531 to facilitate the maintenance or replacement of the pressing member 1535. In some implementations, the pressing member 1535 may be detachably connected to the frame body 1531 by means of magnetic engagement, or may be detachably connected to the frame body 1531 by means of threaded connection, which is not limited here.

In a feasible implementation, the cutter assembly 153 further includes a fastener. The fastener may be configured as a screw. The frame body 1531 may define a screw hole thereon. The fastener may sequentially pass through the cutter 1533 and the pressing member 1535, and be threadedly connected to the frame body 1531. That is, the cutter 1533 and the pressing member 1535 may be locked onto the frame body 1531 by the same fastener. Of course, the cutter 1533 and the pressing member 1535 may also be respectively fixed to the frame body 1531 by different fasteners. In this way, the cutter 1533 or the pressing member 1535 can be disassembled and assembled separately according to the use requirements.

Reference can be made to FIG. 5 to FIG. 9. In an embodiment of the present disclosure, two first through-openings 1111*a* that are spaced apart from each other are defined on the printing surface 1115. Two printing modules 13 are provided. Each printing module 13 is disposed corresponding to one first through-opening 1111*a*. The cutter module 15 is disposed between the two printing modules 13, or the cutter module 15 is disposed on one side of one printing module 13 away from the other printing module 13.

In this embodiment, the inkjet printing device may be a white ink DTF printer. The DTF ink used by the white ink DTF printer typically consists of four colors (i.e., cyan, magenta, yellow, and black, also known as CMYK four-color printing) and white. Correspondingly, the printhead 100 is provided with two printing modules 13. One printing module 13 is a color ink printing module for realizing the color ink printing function corresponding to the CMYK four colors, and the other printing module 13 is a white ink printing module for realizing the white ink printing function. During use, the printhead 100 can first print a color pattern or text on the printing material through one printing module 13, and then print a layer of white ink on the color pattern through the other printing module 13. In this way, by printing white ink on the printing material, the color of the resulting color pattern or text can be more vivid.

In an embodiment, the two printing modules 13 are spaced apart from each other, and the cutter module 15 may be disposed between the two printing modules 13. During use, after the color ink printing module and the white ink printing module complete the pattern printing successively, the cutter module 15 can be switched from the retracted state to the extended state, and move to a specific position relative to the printing material to cut the printing material.

In another embodiment, the two printing modules 13 may also be closely arranged, and the cutter module 15 may be disposed on the side of one printing module 13 away from the other printing module 13. For example, the color ink printing module, the white ink printing module, and the cutter module 15 are arranged in sequence in a conveying direction of the printing material, that is, the color ink printing module, the white ink printing module, and the cutter module 15 may be arranged in sequence in the second direction. In this way, during the conveying of the printing material, the printing material can be aligned with the color ink printing module, the white ink printing module, and the cutter module 15 in sequence, so as to complete the steps of color ink printing, white ink printing, and printing material cutting in sequence. In addition, since the printing material needs to be transferred to a baking machine or a curing machine for the subsequent drying steps of the printing material after completing the steps of printing and printing material cutting, and the inkjet printing device and the baking machine or curing machine are generally connected in sequence in the conveying direction of the printing material, the sequential arrangement of the color ink printing module, the white ink printing module, and the cutter module 15 in the conveying direction of the printing material also facilitates the transfer of the cut printing material to the baking machine or curing machine.

Reference can be made to FIG. 5 to FIG. 9. In an embodiment of the present disclosure, the shell 11 includes a main shell 111 and a connecting member 113. The main shell 111 defines an accommodating cavity therein. One end of the main shell 111 forms the printing surface 1115. One end of the connecting member 113 is disposed on an outer sidewall of the main shell 111, and the other end of the connecting member 113 extends in a direction away from the main shell 111. The connecting member 113 is configured to be externally connected to a driving device, to drive the printhead 100 to move under the driving of the driving device.

In this embodiment, the main shell 111 may be formed as an integrated structure, through integral injection molding or integral die-casting. Alternatively, the main shell 111 may also be disassembled into several shell components and assembled from the several shell components.

Figure 9:
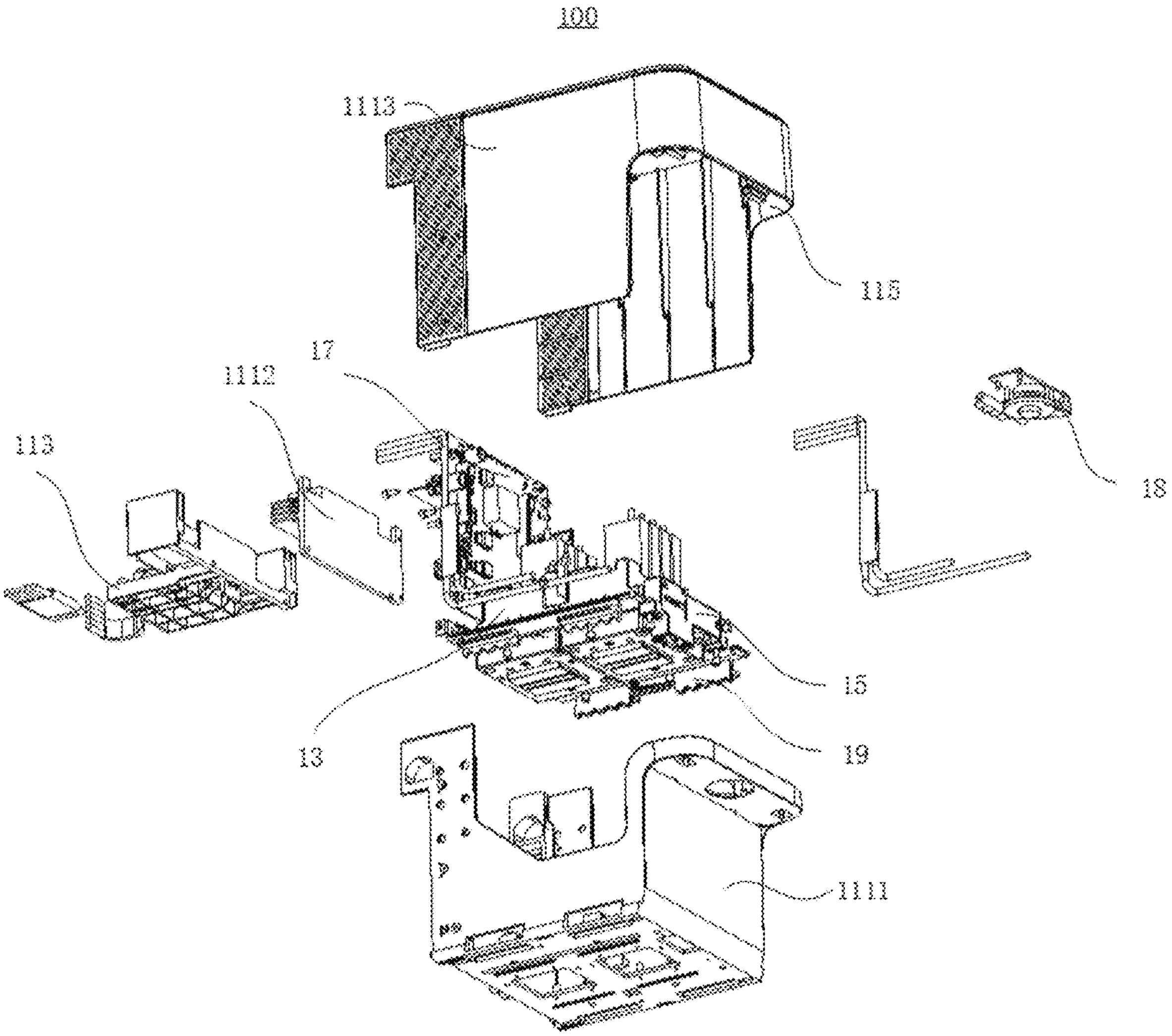
FIG. 9 is an exploded view of an embodiment of the printhead in FIG. 5.

Reference can be made to FIG. 9. In a feasible implementation, the main shell 111 includes a bottom shell 1111 and a cover body 1113. The bottom shell 1111 defines an accommodating space with a top opening, and components such as the printing module and the cutter module 15 can be placed in the accommodating space. The bottom shell 1111 also has the printing surface 1115 formed at the bottom end thereof. The first through-opening 1111*a* and the second through-opening 1111*b* are defined on the printing surface 1115 and extend through the bottom wall of the bottom shell 1111. The bottom shell 1111 may be rectangular, square, or of other shapes. The cover body 1113 is disposed above the bottom shell 1111, covers the top opening of the bottom shell 1111, and cooperates with the bottom shell 1111 to define the accommodating cavity. By providing the cover body 1113 to cover the opening, various functional modules placed inside the accommodating cavity can be isolated and protected.

The connecting member 113 is in a plate-like structure. One end of the connecting member 113 is connected to the outer sidewall of the main shell 111, specifically fixedly connected to an outer sidewall of the bottom shell 1111 or an outer side portion of the cover body 1113. The other end of the connecting member 113 protrudes towards the side of the main shell 111. By externally connecting the connecting member 113 to the driving device, the driving device can drive the connecting member 113 to drive the entire printhead 100 to move relative to the printing material, so that the printhead 100 can process different positions of the printing material. In some implementations, the connecting member 113 further has a bearing surface 1131 formed on the top of the connecting member 113, so that the connecting member 113 can not only play a role in connecting with an external driving device but also support some components of the printhead 100.

Figure 6:
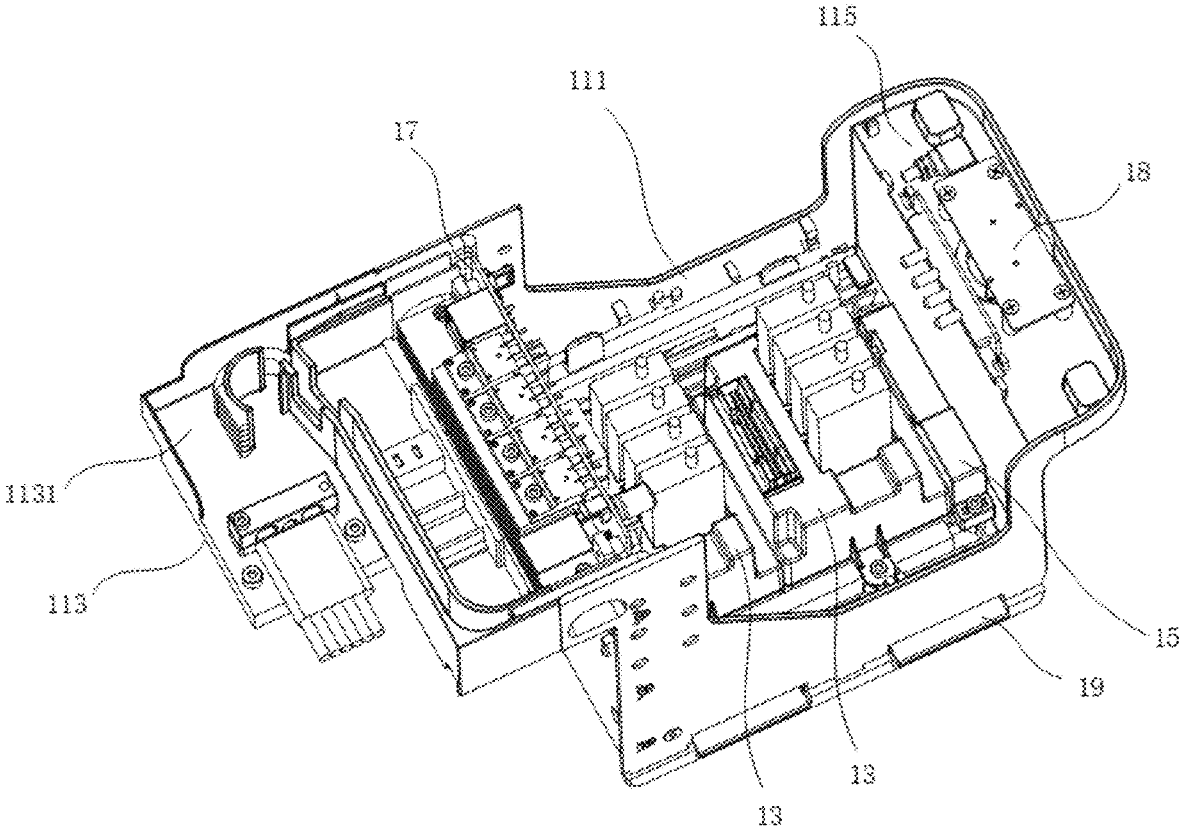
FIG. 6 is a partial structural view of an embodiment of the printhead in FIG. 5.
Figure 7:
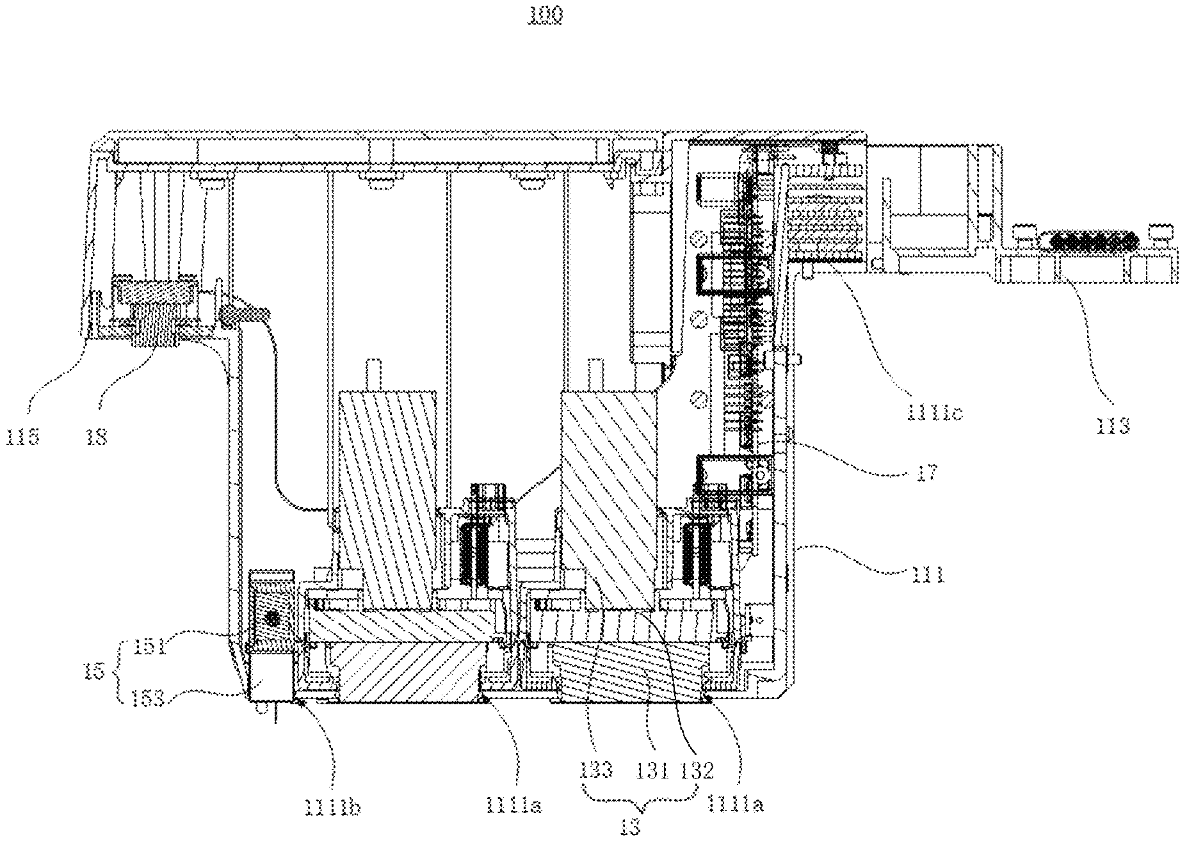
FIG. 7 is a cross-sectional view of an embodiment of the printhead in FIG. 5.
Figure 8:
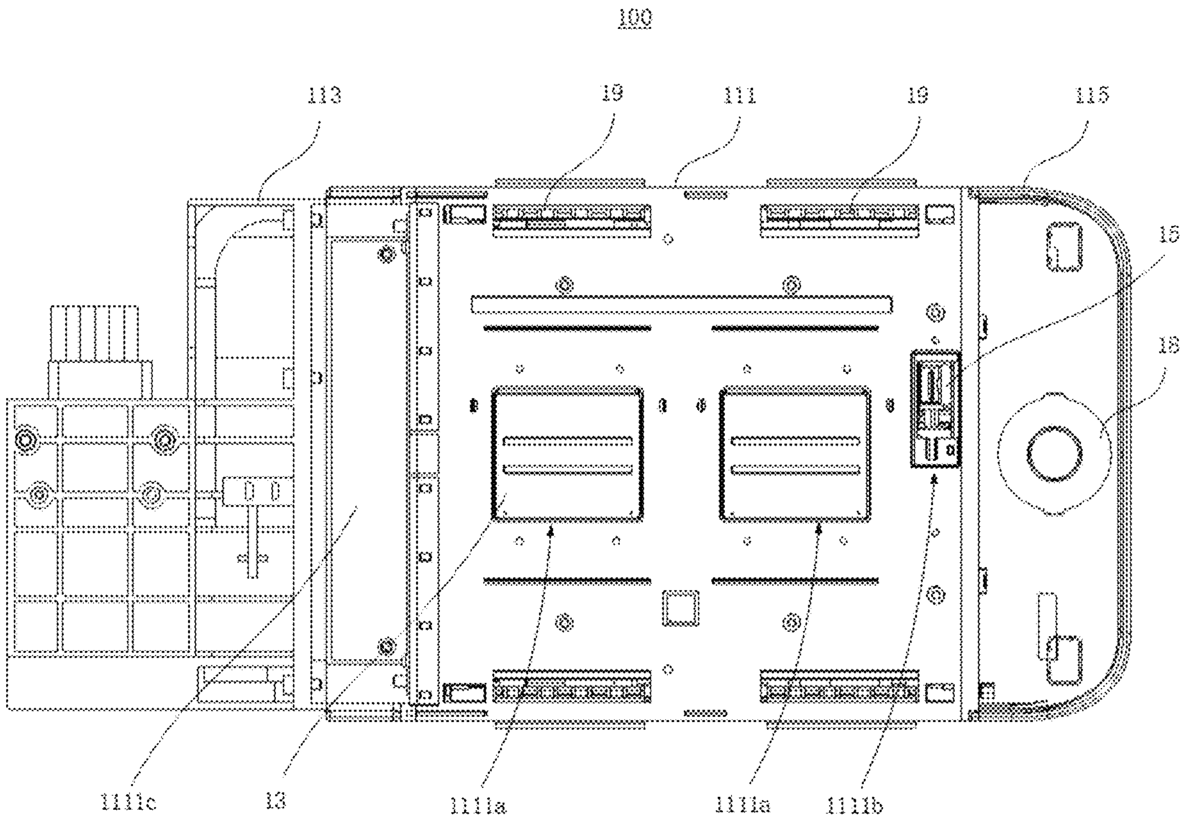
FIG. 8 is a bottom view of an embodiment of the printhead in FIG. 5.

Reference can be made to FIG. 6 and FIG. 7. In an embodiment of the present disclosure, the printhead 100 further includes a main board 17. The main board 17 is disposed in the accommodating cavity, and is connected to one side cavity-wall of the accommodating cavity facing towards the connecting member 113. The main shell 111 includes a heat dissipation portion 1111*c*. The heat dissipation portion 1111*c* is located on one side of the main shell 111 facing towards the connecting member 113, and is disposed to avoid the connecting member 113. At least part of the main board 17 abuts against the heat dissipation portion 1111*c*, so as to dissipate heat through the heat dissipation portion 1111*c*.

The main shell 111 may be provided with a heat dissipation member on the outer sidewall of the main shell 111 to form the heat dissipation portion 1111*c*. The heat dissipation member may be, but is not limited to, a heat sink. The main shell 111 may also have several protruding structures protruding from one side of the main shell 111 away from the main board 17, and the several protruding structures are arranged in an array, so that heat dissipation fins can be formed by the self-structure of the main shell 111, thereby forming the heat dissipation portion 1111*c* of the main shell 111.

In some implementations, at least part of the connecting member 113 is flush with the heat dissipation portion 1111*c* in height. On this basis, the connecting member 113 can define an avoidance groove in a region, corresponding to the heat dissipation portion 1111*c* and on one side of the connecting member 113 facing towards the main shell 111, of the connecting member 113, and the heat dissipation portion 1111*c* is disposed in the avoidance groove. In this way, the heat dissipation portion 1111*c* and the connecting member 113 are disposed in a mutually avoiding manner. Of course, the heat dissipation portion 1111*c* and the connecting member 113 may also be disposed in a staggered manner in the height direction, to achieve the mutual avoidance between the heat dissipation portion 1111*c* and the connecting member 113, which is not limited here.

In some implementations, to improve the heat dissipation effect, the main shell 111 is also provided with heat dissipation holes 1111*d* in the area corresponding to the main board 17. For example, reference can be made to FIG. 5. One or more heat dissipation holes 1111*d* may be respectively defined at positions on both sides of the main board 17 corresponding to the main shell 111. The heat dissipation holes 1111*d* are in communication with the accommodating cavity in the main shell 111, so as to ventilate and dissipate heat for the main board 17 and other components in the accommodating cavity.

Reference can be made to FIG. 5 to FIG. 9. In an embodiment of the present disclosure, the shell 11 further includes a mounting member 115. One end of the mounting member 115 is disposed on one side of the main shell 111 away from the connecting member 113, and the other end of the mounting member 115 extends in a direction away from the main shell 111. The printhead 100 further includes a camera module 18. The camera module 18 is mounted on the mounting member 115.

It can be understood that by providing the camera module 18 on the printhead 100 to photograph a printing path of the printhead 100, it is possible to detect whether the printing path of the printhead 100 is a straight line, and further calibrate the printing position of the printhead 100 based on the detection result, thereby facilitating ensuring the printing quality of the printhead 100.

In an embodiment of the present disclosure, the mounting member 115 and the connecting member 113 are respectively disposed on two opposite sides of the main shell 111. The connecting member 113 is drivingly connected to the external driving device. The external driving device may be disposed inside the housing of the inkjet printing device, for example, behind the printhead 100. The external driving device can drive the printhead 100 to move in translation in a direction perpendicular to an arrangement direction of the mounting member 115 and the connecting member 113. By means of this arrangement method, the volume of the printhead 100 in the direction perpendicular to the arrangement direction of the mounting member 115 and the connecting member 113 can be reduced, so that the printhead 100 can have sufficient transfer space. Of course, the present disclosure is not limited to this. In other embodiments, the driving device may also be drivingly connected to the main shell 111 or the mounting member 115, as long as the printhead 100 can be driven to move in translation in the direction perpendicular to the arrangement direction of the mounting member 115 and the connecting member 113.

The mounting member 115 may have a hollow box structure. The mounting member 115 defines an inner cavity therein, and the camera module 18 can be accommodated in the inner cavity. The inner cavity may be in communication with the accommodating cavity of the main shell 111. The mounting member 115 defines a through hole on an outer wall of the mounting member 115. The through hole is in communication with the inner cavity, so that the camera module 18 can shoot and detect outwardly through the through hole. Alternatively, the mounting member 115 may also be in a plate-like structure for being fixedly connected to the camera module 18, and the camera module 18 may be fixed at the bottom of this plate-like structure. The mounting member 115 may be separable from the main shell 111, or the mounting member 115 may be integrated with the main shell 111, thereby improving the stability of the overall structure of the printhead 100.

In the implementation of the present disclosure, at least part of the main shell 111 is made of a plastic material. It should be noted that in the related art, the shell 11 of the printhead 100 is typically made of a sheet metal material. In contrast, in the technical solution of the present disclosure, at least part of the main shell 111 is made of a plastic material, which helps to reduce the weight of the shell 11, so that the external driving device can drive the printhead 100 more easily, and there is more margin for adjusting the moving speed of the printhead 100. In addition, the use of plastic material also helps to reduce the manufacturing cost of the shell 11.

In an embodiment of the present disclosure, the connecting member 113 is made of a sheet metal material. In the inkjet printing device, the printhead 100 is connected to the external driving device through the connecting member 113 of the shell 11, so that the overall weight of the printhead 100 is mainly supported by the connecting member 113. Therefore, by making the connecting member 113 from the sheet metal material, the structural strength of the connecting member 113 can be ensured, thereby ensuring the structural stability of the inkjet printing device.

Figure 13:
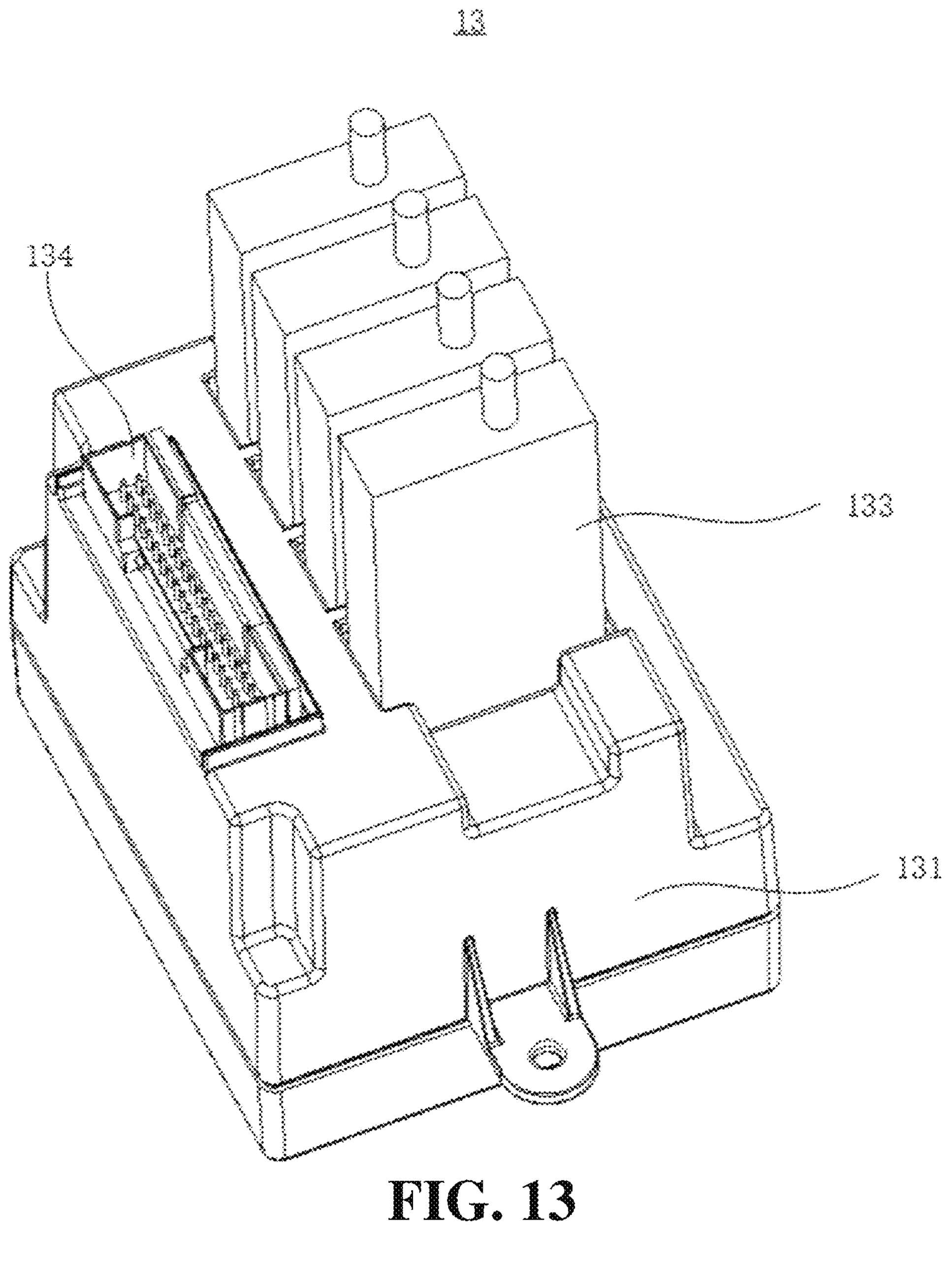
FIG. 13 is a schematic structural view of an embodiment of a printing module of the printhead in FIG. 5.
Figure 14:
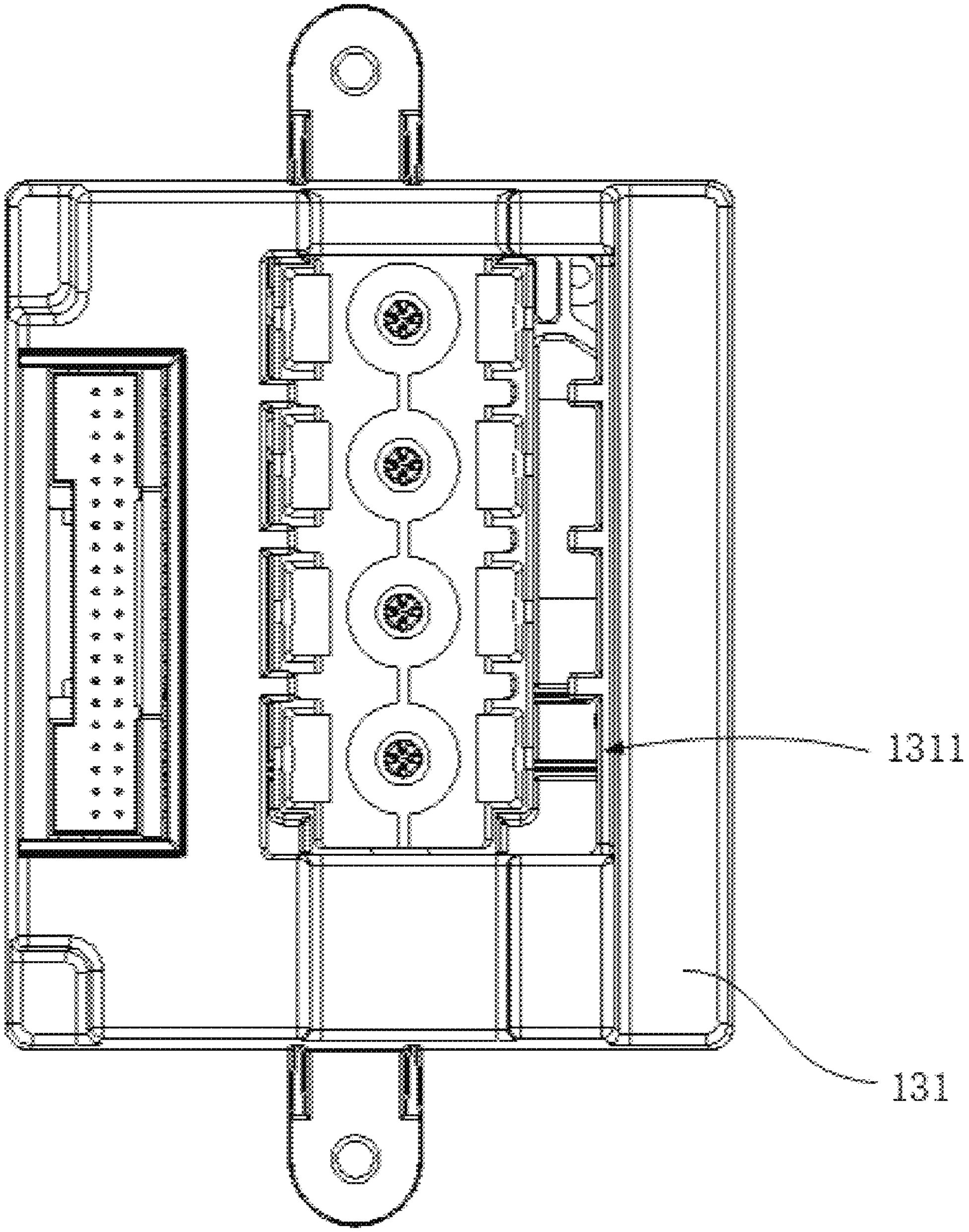
FIG. 14 is a partial structural view of an embodiment of a printing module of the printhead in FIG. 5.

Reference can be made to FIG. 7, and FIG. 13 to FIG. 14. In some embodiments, the printing module 13 includes an inkjet mechanism 131, an ink storage mechanism 133, and a leak-prevention mechanism 132. The inkjet mechanism 131 is disposed at the first through-opening 1111*a*. The ink storage mechanism 133 is detachably connected to the inkjet mechanism 131 to supply ink to the inkjet mechanism 131. The leak-prevention mechanism 132 is connected between the inkjet mechanism 131 and the ink storage mechanism 133. The leak-prevention mechanism 132 is configured to prevent ink in the ink storage mechanism 133 from leaking out when the ink storage mechanism 133 is detached from the inkjet mechanism 131. The inkjet mechanism 131 is configured to eject ink.

The ink storage mechanism 133 may be a color ink supply mechanism such as a color ink sac, or a white ink supply mechanism such as a white ink sac. The inkjet mechanism 131 may be configured as a nozzle, which is configured to print the ink provided by the ink sac onto the printing material in an inkjet printing manner.

In an embodiment of the present disclosure, the ink storage mechanism 133 and the inkjet mechanism 131 may be connected by a plug-in fit, so that the ink storage mechanism 133 and the inkjet mechanism 131 can be quickly plugged and unplugged, thereby improving the assembly convenience of the printing module 13. Of course, the ink storage mechanism 133 and the inkjet mechanism 131 may also be detachably connected by snap connection, threaded connection, or other methods, which is not limited here. In some implementations, the ink storage mechanism 133 may be connected to the ink supply module 300 through a pipeline, so that the ink supply module 300 can supply ink to the ink storage mechanism 133, and then the ink storage mechanism 133 ejects the ink onto the printing material through the inkjet mechanism 131.

It should be noted that in a printing module 13, there may be multiple ink storage mechanisms 133, and the multiple ink storage mechanisms 133 are connected side by side to the inkjet mechanism 131. To improve the connection stability between the ink storage mechanism 133 and the inkjet mechanism 131, the inkjet mechanism 131 may define multiple positioning grooves 1311 thereon. The positioning groove 1311 is shaped to correspond to the inkjet mechanism 131, and each positioning groove 1311 is used for limiting and matching with one inkjet mechanism 131. Of course, the inkjet mechanism 131 may also limit the position of the ink storage mechanism 133 through other positioning structures, which are not limited here.

The ink storage mechanism 133 is detachably connected to the inkjet mechanism 131. That is, after the ink storage mechanism 133 is mounted on the inkjet mechanism 131, the ink storage mechanism 133 can be separated and removed, thereby facilitating the maintenance and replacement of various structures of the printing module 13. On this basis, by connecting the leak-prevention mechanism 132 between the inkjet mechanism 131 and the ink storage mechanism 133, the following can be avoided. When the leak-prevention mechanism 132 is disassembled from the inkjet mechanism 131, the ink in the ink storage mechanism 133 may leak out and directly enter the accommodating cavity, resulting in pollution to other structures of the printhead 100.

The leak-prevention mechanism 132 may be configured as a leak-prevention valve. When the ink storage mechanism 133 is connected to the inkjet mechanism 131, the leak-prevention valve is opened to communicate an ink path of the ink storage mechanism 133 with an ink path of the inkjet mechanism 131. When the ink storage mechanism 133 is detached from the inkjet mechanism 131, the leak-prevention valve is closed to stop the ink storage mechanism 133 from discharging ink.

In a feasible implementation, the inkjet printing device may be a white ink DTF printer. Correspondingly, for the two printing modules 13 of the printhead 100, one printing module 13 is provided with four ink storage mechanisms 133, which are configured as four color ink sacs corresponding to the CMYK four colors; and the other printing module 13 may also be provided with four ink storage mechanisms 133, all of which are white ink sacs. During use, the printhead 100 can first print a color pattern on the printing material through one printing module 13, and then print a layer of white ink on the color pattern through the other printing module 13. In this way, by printing white ink on the printing material, the color of the resulting color pattern can be more vivid.

In some implementations, when the four ink storage mechanisms 133 in the printing module 13 are all white ink sacs, the four white ink sacs may adopt a four-in-one design, that is, the four white ink sacs are connected to form an integral structure. In this way, the four white ink sacs can be disassembled and assembled as a whole with the inkjet mechanism 131, thereby facilitating the improvement of the structural integration and disassembly convenience of the printing module 13.

Reference can be made to FIG. 6 and FIG. 13. In some embodiments, the printing module 13 further includes an adapter board 134. The adapter board 134 may be electrically connected to the inkjet mechanism 131. An input interface of the adapter board 134 may be connected to the main board 17. The adapter board 134 may be connected to multiple nozzles in the inkjet mechanism 131 (such as the four nozzles in FIG. 13). Therefore, when assembling the printing module 13, only one cable is needed to connect the main board 17 to the adapter board 134, without requiring multiple cables to connect the main board to multiple nozzles, so that wiring is more convenient and assembly is simpler.

Reference can be made to FIG. 6 and FIG. 7. In an embodiment of the present disclosure, the printhead 100 further includes an anti-collision mechanism 19. The anti-collision mechanism 19 is disposed on the shell 11, and is configured to prevent the shell 11 from being externally collided. It can be understood that by providing the anti-collision mechanism 19 on the printhead 100 to prevent the shell 11 from being externally collided, the safety of the printhead 100 can be improved.

The anti-collision mechanism 19 may be disposed on the side of the shell 11, to prevent an outer sidewall of the printhead 100 from colliding with external structures. For example, if the printhead 100 can move in the first direction, the anti-collision mechanisms 19 can be respectively disposed on two opposite sides of the printhead 100 in the first direction, so as to avoid the risk of the shell 11 being externally collided when the printhead 100 moves in the first direction. Alternatively, the anti-collision mechanism 19 may also be disposed at the bottom of the shell 11, to prevent the printing surface 1115 at the bottom of the printhead 100 from colliding with external structures, and thus a hand-pinching prevention effect can be achieved. Alternatively, the anti-collision mechanisms 19 may be disposed on both the side and the bottom of the shell 11, so that the overall protection for the printhead 100 can be improved. Of course, the anti-collision mechanism 19 may also be used to realize the anti-collision function at other positions of the shell 11. The number of the anti-collision mechanisms 19 disposed on the shell 11 may be one, two, or more. That is, the present disclosure does not limit the position and the number of the anti-collision mechanisms 19.

In some implementations, the anti-collision mechanisms 19 are disposed on both the side and the bottom of the shell 11. The anti-collision mechanisms 19 respectively disposed on the side and the bottom of the shell 11 may be integrated into one piece, thereby facilitating the reduction of the number of components on the printhead 100, and thus improving the structural integration and the assembly efficiency of the printhead 100.

In an embodiment, the anti-collision mechanism 19 may be disposed on the shell 11 of the printhead 100 and at least partially protrude from the outer surface of the shell 11. In this way, during the movement of the printhead 100, the anti-collision mechanism 19 can detect whether the printhead 100 is in contact with external structures by means of contact detection. For example, the anti-collision mechanism 19 may be configured as a pressure sensor or other contact detection mechanisms. Since the anti-collision mechanism 19 protrudes from the outer surface of the shell 11, the anti-collision mechanism 19 can contact the external structure before the shell 11. Therefore, when the anti-collision mechanism 19 is triggered, the shell 11 can be braked in time to avoid the shell 11 from colliding with the external structure due to excessive movement.

Alternatively, in another embodiment, the anti-collision mechanism 19 may also detect a distance between the anti-collision mechanism 19 and the external structure by means of non-contact detection. For example, the anti-collision mechanism 19 can be configured as an infrared distance measuring sensor or other non-contact detection mechanisms. In this way, when the anti-collision mechanism 19 detects that the distance between the anti-collision mechanism 19 and the external structure is too close, the shell 11 can be braked in time to avoid the shell 11 from colliding with the external structure due to excessive movement. It can be specifically configured as required, which is not limited here.

Figure 20:
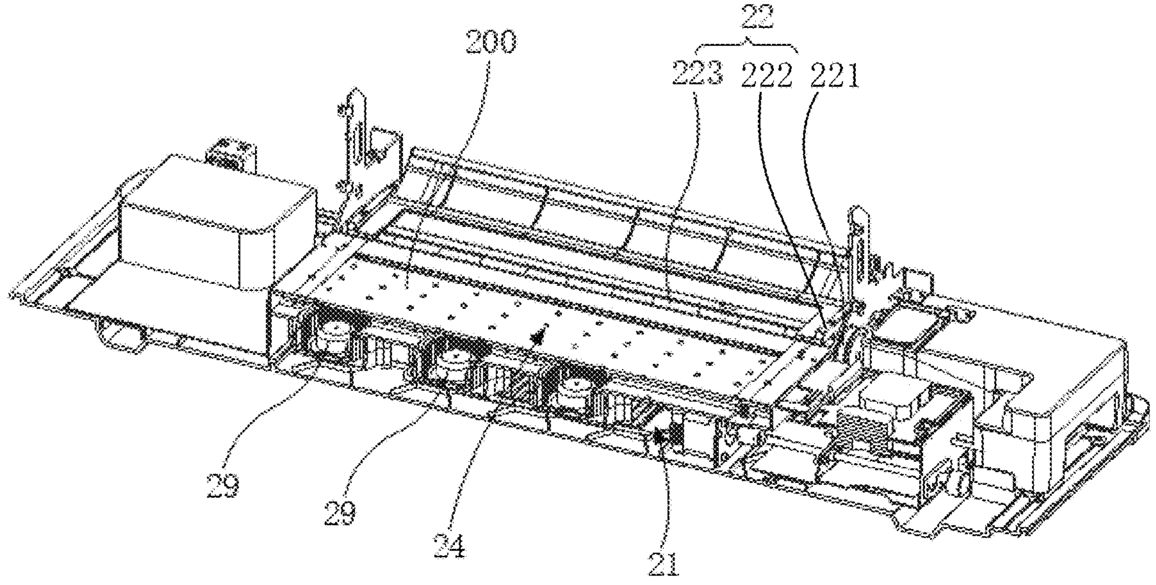
FIG. 20 is a cross-sectional view of an embodiment of the printing table in FIG. 17.

Reference can be made to FIG. 16 and FIG. 20. In some embodiments of the present disclosure, the inkjet printing device 1000 may further include a negative-pressure module 29. The printing table 200 defines a suction cavity 21 therein. The printing table 200 defines a vacuum hole 24 on a surface of the printing table 200, and the vacuum hole 24 is in communication with the suction cavity 21. The negative-pressure module 29 is disposed in the suction cavity 21.

In this embodiment, the suction cavity 21 with a certain space may be defined in the printing table 200. By using the negative-pressure module 29 to operate in the suction cavity 21, a certain vacuum negative-pressure environment can be formed in the suction cavity 21, so that the printing material placed on the surface of the printing table 200 can be subjected to negative pressure at the vacuum holes 24, so that the printing material can be stably held by suction on the surface of the printing table 200, for printing processing, thereby preventing displacement of the printing material during the processing, reducing printing waste, and ensuring the accurate printing effect of the inkjet printing device 1000. The negative-pressure module 29 may adopt various types of structures, such as an axial flow fan, a centrifugal fan, etc. The present disclosure does not limit the type of the negative-pressure module 29, as long as the negative-pressure module 29 can extract air from the suction cavity 21 to form a certain negative-pressure environment. In some implementations, a single negative-pressure module 29 may be provided in the suction cavity 21, or multiple negative-pressure modules 29 may be provided in the suction cavity 21 in an array to increase the rate of formation of the negative-pressure environment. The present disclosure does not specifically limit the number of the negative-pressure modules 29.

In an embodiment, the suction cavity 21 may be configured in a flat shape. The negative-pressure module 29 may be configured as a centrifugal fan. It can be understood that the centrifugal fan has a relatively small height and can be more conveniently disposed in the flat suction cavity 21. Therefore, the height dimension of the printing table 200 can be better reduced, and the space occupied by the bearing component in the machine body can be reduced, thereby realizing a better spatial layout of each component in the inkjet printing device 1000.

Figure 18:
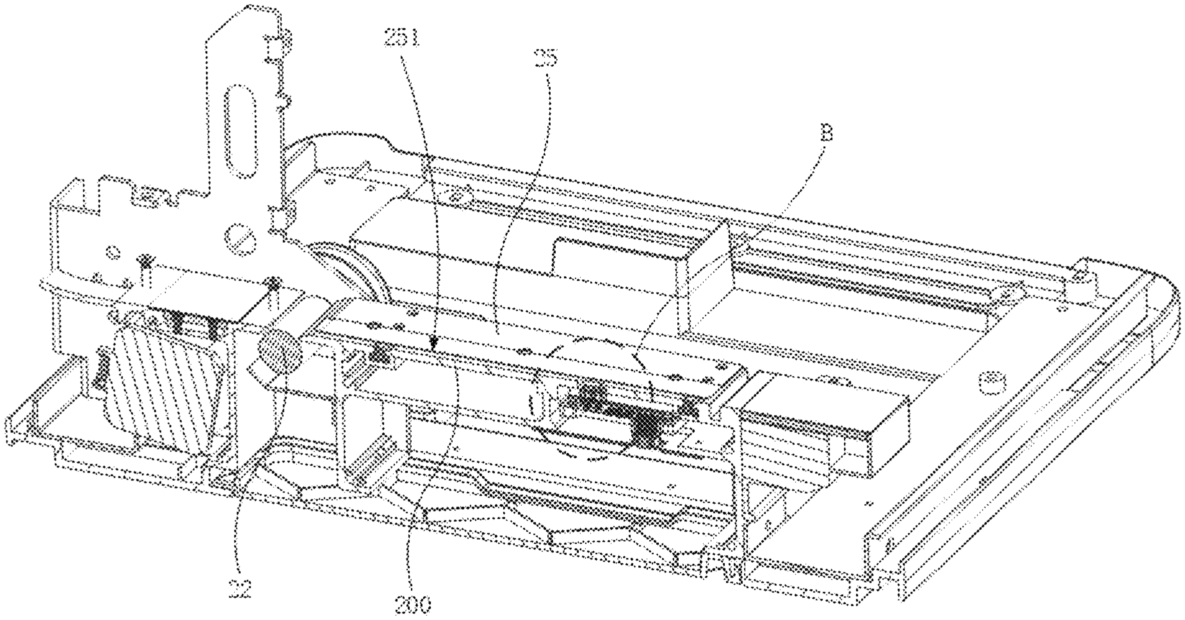
FIG. 18 is a cross-sectional view of FIG. 17 taken along line A-A.

Reference can be made to FIG. 16 to FIG. 18. In some embodiments of the present disclosure, the printing table 200 has a feeding side and a discharging side that are opposite to each other. The inkjet printing device 1000 further includes a feeding mechanism 22. The feeding mechanism 22 is disposed on the feeding side of the printing table 200, or is integrated in the printing table 200.

In this embodiment, the printing material may be conveyed from the feeding side of the printing table 200 onto the surface of the printing table 200 for printing processing. After the processing operation is completed on the printing table 200, the printing material is output from the discharging side of the printing table 200. By providing the feeding mechanism 22 on the feeding side of the printing table 200, the feeding mechanism 22 can play a certain transmission role for the printing material, so that the printing material can stably move from the feeding side towards the discharging side, thereby realizing the continuous automatic feeding operation of the inkjet printing device 1000. For ease of understanding and explanation, the directions indicated by the coordinate system illustrated in FIG. 16 are used as references. The first direction is the positive direction of the x-axis, and the second direction is the positive direction of the y-axis. The positive direction of the x-axis is to the right, and the negative direction of the x-axis is to the left. The positive direction of the y-axis is forward, and the negative direction of the y-axis is backward. The positive direction of the z-axis is upward, and the negative direction of the z-axis is downward. The feeding side and the discharging side of the printing table 200 may be the two opposite sides in the second direction, so that the printing material moves under the transmission action of the feeding mechanism 22, that is, the printing material can be conveyed in the second direction for feeding and printing. At this time, the printhead 100 can be moved in the first direction. Therefore, by coordinating the transmission efficiency of the feeding mechanism 22 and the moving speed of the printhead 100, the precise printing operation of the printhead 100 can be realized.

In some embodiments, the feeding mechanism 22 may include a support 222 fixedly mounted on the feeding side of the printing table 200, a rotating shaft 221 rotatably provided on the support 222, and a roller 223 sleeved on the rotating shaft 221. The rotating shaft 221 can be driven to rotate by a driving member such as a motor. By using the rotating shaft 221 to drive the roller 223 to rotate, the roller 223 can contact the printing material placed on the feeding side of the printing table 200. Then, under the frictional force between the roller 223 and the printing material, the printing material can be transmitted in the second direction, thereby realizing the stable feeding of the inkjet printing device 1000. Of course, the present disclosure is not limited to this. In other embodiments, the feeding mechanism 22 may also be configured with a conveyor-belt structure. The present disclosure does not limit the structural shape of the feeding mechanism 22, as long as the feeding mechanism 22 can realize the transmission of the printing material.

Figure 19:
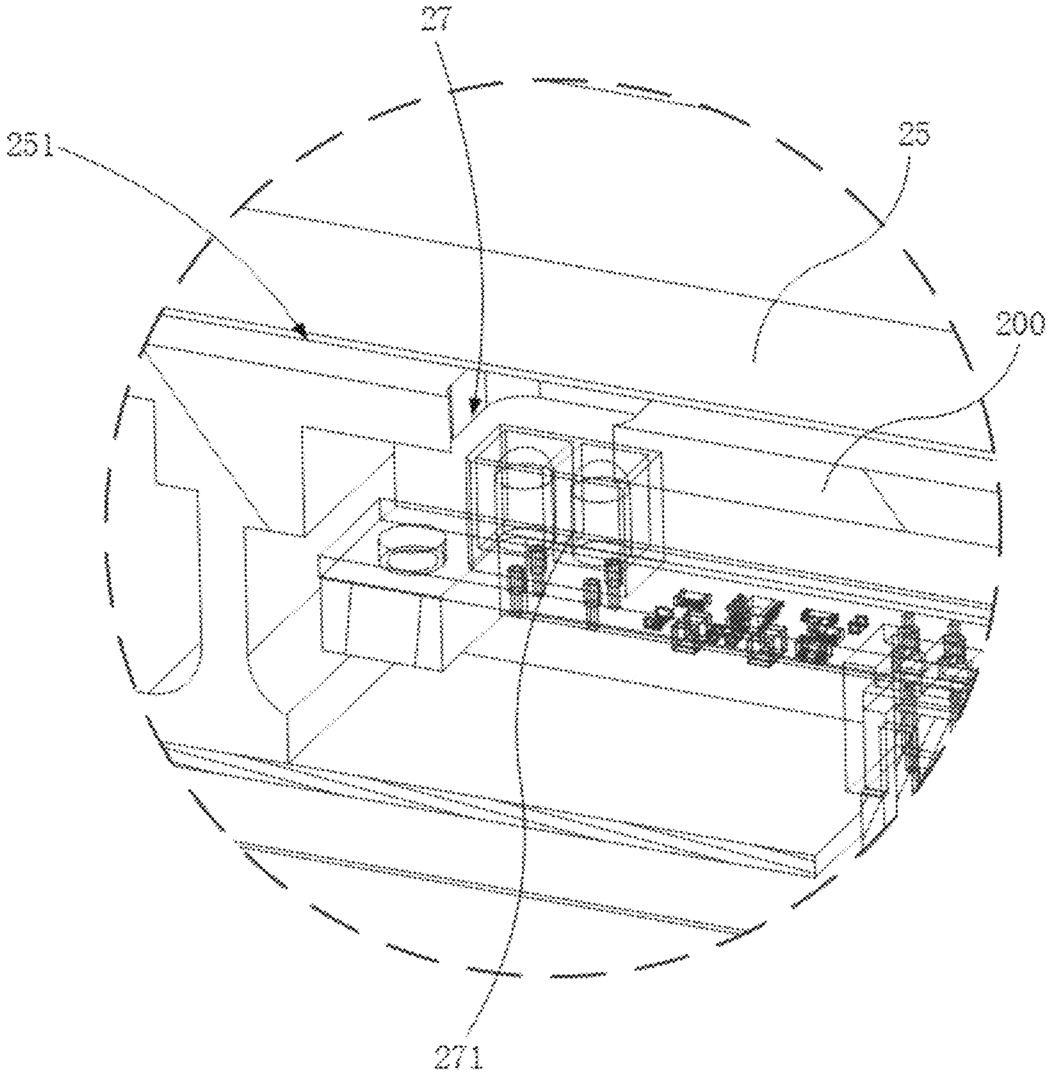
FIG. 19 is a partial enlarged view of FIG. 18 at Circle B.

Reference can be made to FIG. 18 and FIG. 19. In some embodiments of the present disclosure, the printing table 200 may be provided with a limiting plate 25 that is on the surface of the printing table 200 and extends in the second direction. The limiting plate 25 is disposed opposite to the surface of the printing table 200. The limiting plate 25 and the surface of the printing table 200 are spaced apart from each other and cooperatively define a conveying slot 251. An edge of the printing material is clamped in the conveying slot 251. It can be understood that the limiting plate 25 may have a side edge that is bent and connected to the surface of the printing table 200 in the first direction, or the limiting plate 25 may be formed by bending upward a side edge of the printing table 200, so that the limiting plate 25 and the printing table 200 are integrally formed. The present disclosure does not limit the shape of the limiting plate 25. By defining the conveying slot 251 in a spaced manner between the limiting plate 25 and printing table 200, the edge of the printing material can be clamped in the conveying slot 251 when the printing material is conveyed in the second direction, so that the limiting plate 25 can play a certain limiting role in the conveying of the printing material, thereby effectively preventing the printing material from deviating during conveying and preventing affecting the printing effect to a certain extent, thus realizing the precise printing processing of the inkjet printing device 1000.

Reference can be made to FIG. 17. In some embodiments of the present disclosure, the inkjet printing device 1000 further includes a pressing mechanism 23. The pressing mechanism 23 is disposed above the printing table 200, and is configured to press the printing material on the surface of the printing table 200.

It can be understood that when the printing material is placed on the printing table 200, the pressing mechanism 23 can be used to press the printing material, so that the printing material can closely abut against the surface of the printing table 200 for printing processing, thereby reducing the defective rate of the printing material after processing, and further improving the reliability of the inkjet printing device 1000.

Reference can be made to FIG. 17. In some embodiments, the pressing mechanism 23 may include a second driving mechanism 231 and a pressing roller 233. The second driving mechanism 231 may include a first support frame 2311, a driving rod 2313, and a handle 2315. The driving rod 2313 may have a cam-rod structure. The driving rod 2313 is rotatably connected to the first support frame 2311, the handle 2315 is connected to one end of the driving rod 2313, and the pressing roller 233 is sleeved and mounted on the driving rod 2313. Therefore, the handle 2315 can be operated on one side of the first support frame 2311 to drive the driving rod 2313 to rotate, so that a cam surface of the driving rod 2313 abuts against the pressing roller 2333 to drive the pressing roller 233 to move towards the printing table 200, thereby enabling the pressing roller 233 to press the printing material. The pressing roller 233A may be provided with a second elastic member such as a spring or a rubber pad therein. When the second driving mechanism 231 drives the pressing roller 233 to move downward, the second elastic member in the pressing roller 233 can be in a certain elastic deformation state. Then, when it is necessary to release the pressing action of the pressing roller 233 on the printing material to pick and place the printing material, the handle 2315 can be operated in a reverse direction, so that a flat surface of the driving rod 2313 contacts the pressing roller 233. At this time, the second elastic member in the pressing roller 233 is released from the force and recovers the elastic deformation, so that the pressing roller 233 is reset and moves away from the printing table 200, thereby realizing the stable pressing and avoidance of the pressing roller 233 on the printing material, and ensuring the stable printing processing and picking and placing of the printing material on the printing table 200, and further improving the practicability and reliability of the inkjet printing device 1000. Of course, the present disclosure is not limited to this. In other embodiments, the pressing mechanism 23 may also be configured with a lifting pressing block structure. The present disclosure does not limit the structure of the pressing mechanism 23, as long as the pressing mechanism 23 can press the printing material on the printing table 200.

When the inkjet printing device 1000 is further provided with a feeding mechanism 22 to convey the printing material, the pressing mechanism 23 may be at least partially located above the feeding mechanism 22, so that the pressing mechanism 23 can press the printing material onto the feeding mechanism 22, thereby ensuring the contact between the printing material and the feeding mechanism 22, and enabling the feeding mechanism 22 to convey the printing material onto the surface of the printing table 200 more stably.

Reference can be made to FIG. 18 and FIG. 19. In some embodiments of the present disclosure, a material detection mechanism 271 may be mounted on the printing table 200. The material detection mechanism 271 may be used to detect whether there is the printing material on the printing table 200, and then transmit, the information identified and detected by the material detection mechanism 271, to a controller of the inkjet printing device 1000. The printhead 100 can be started to perform the printing operation after the printing material is identified to be placed on the printing table 200, thereby preventing the printhead 100 from directly ejecting ink onto the printing table 200. In addition, by detecting the presence or absence of the printing material on the printing table 200 using the material detection mechanism 271, feedback may also be provided as to whether the printing material has been successfully loaded, thereby facilitating fault detection of the inkjet printing device 1000 and further improving the practicality and reliability of the inkjet printing device 1000.

Figure 21:
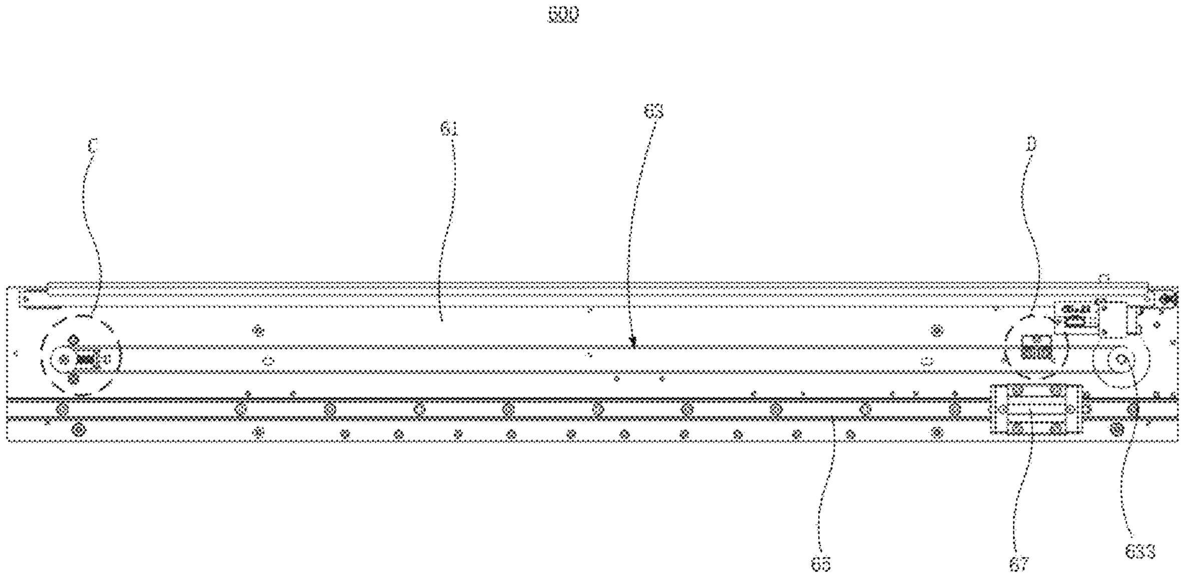
FIG. 21 is a front view of an embodiment of a moving device of an inkjet printing device provided in the present disclosure.
Figure 22:
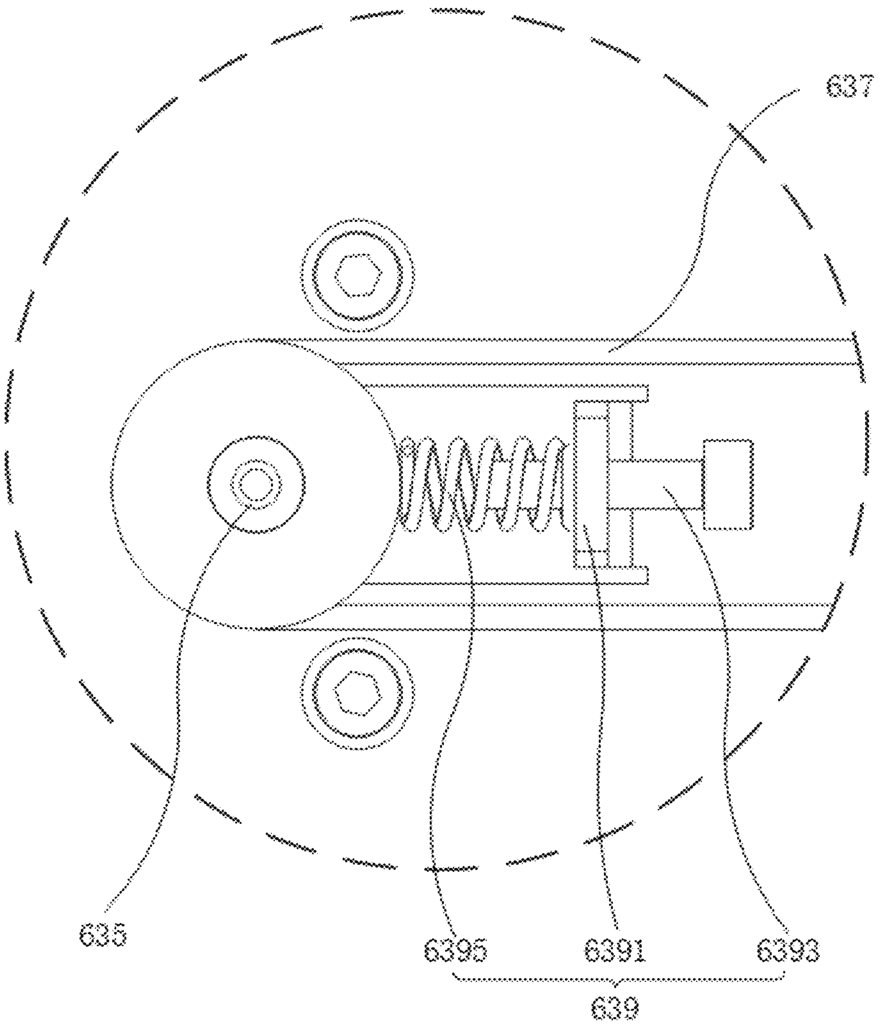
FIG. 22 is a partial enlarged view of FIG. 21 at Circle C.

In some implementations, reference can be made to FIG. 19, FIG. 21, and FIG. 22. The printing table 200A may define a detection slot 27 on the printing table 200. The material detection mechanism 271 is accommodated in the detection slot 27, so that the material detection mechanism 271 can identify the printing material on the surface of the printing table 200 through the slot opening of the detection slot 27, thereby facilitating the reduction of the interference between the material detection mechanism 271 and the printing material on the surface of the printing table 200, and enabling the printing material to be processed or conveyed on the printing table 200 more smoothly. At this time, the material detection mechanism 271 may include a signal emitter and a signal receiver. The signal emitter can be used to emit detection light such as infrared light. When no printing material is placed on the surface of the printing table 200, the detection light emitted by the signal emitter is not blocked and reflected, so that the signal receiver is unable to receive the detection light emitted by the signal emitter, and the signal receiver can send a signal indicating that the printing material is not placed to the controller at this time. When the printing material is placed on the surface of the printing table 200, the printing material covers a slot opening of the detection slot 27, so that the detection light emitted by the signal emitter is blocked and reflected by the printing material, and then the signal receiver can receive the light emitted from the signal emitter, so that the signal receiver sends a signal indicating that the printing material is placed to the controller at this time. Of course, the present disclosure is not limited to this. In other embodiments, the material detection mechanism 271 may also adopt a photosensitive sensor, a pressure-sensitive sensor, etc. The present disclosure does not limit the type of the material detection mechanism 271, as long as the material detection mechanism 271 can detect whether there is the printing material on the printing table 200.

Reference can be made to FIG. 4, FIG. 16, and FIG. 21. In some embodiments of the present disclosure, the inkjet printing device 1000 includes a moving device 600. The moving device 600 is disposed above the printing table 200 or on one side of the printing table 200, and is connected to the printhead 100. The moving device 600 is configured to drive the printhead 100 to move on the printing table 200.

Figure 23:
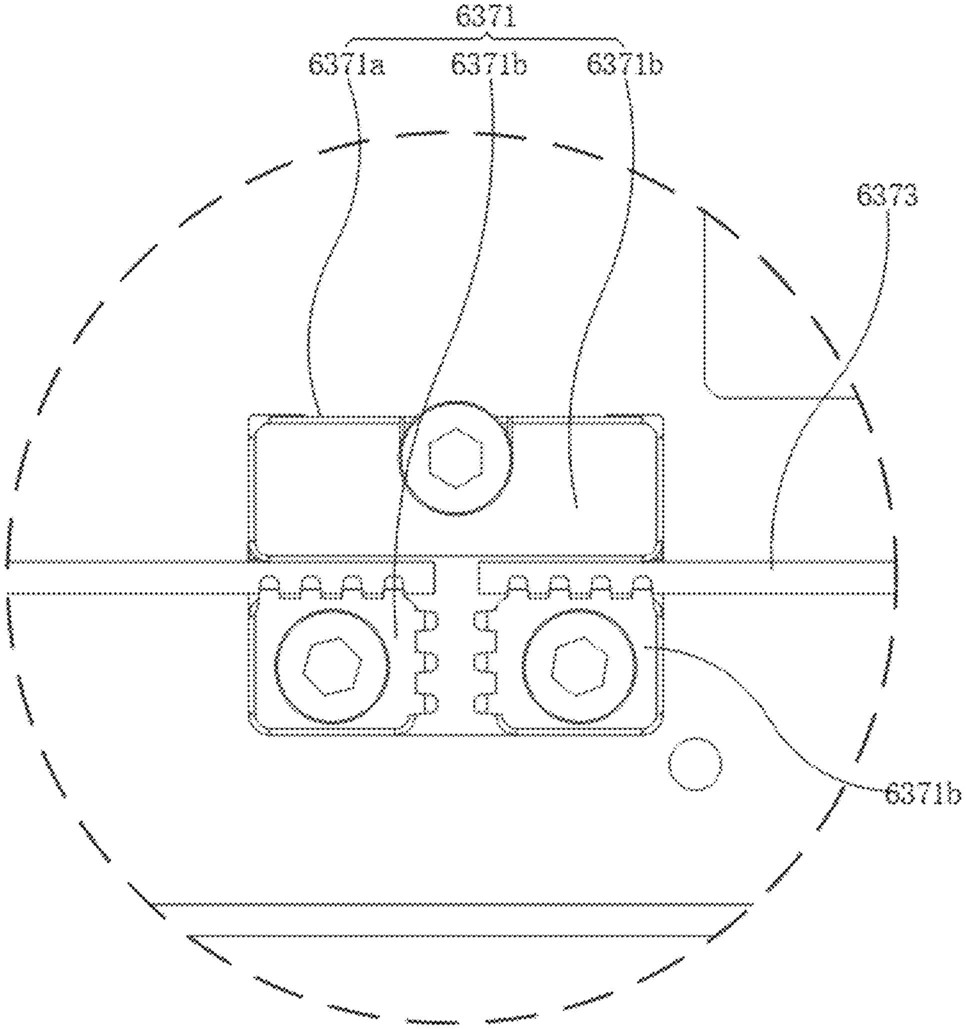
FIG. 23 is a partial enlarged view of FIG. 21 at Circle D.

In some implementations, reference can be made to FIG. 21 to FIG. 23. In some implementations, the moving device 600 includes a second support frame 61 and a driving mechanism 63. The second support frame 61 is disposed on a base of the housing 700. The driving mechanism 63 is connected to the second support frame 61. The printhead 100 is connected to the driving mechanism 63 and is movable relative to the second support frame 61. The driving mechanism 63 is configured to drive the printhead 100 to reciprocate in the first direction.

For ease of understanding and explanation, the directions indicated by the coordinate system illustrated in FIG. 16 are used as references. The first direction is the positive direction of the x-axis, and the second direction is the positive direction of the y-axis. The positive direction of the x-axis is to the right, and the negative direction of the x-axis is to the left. The positive direction of the y-axis is forward, and the negative direction of the y-axis is backward. The positive direction of the z-axis is upward, and the negative direction of the z-axis is downward. In this embodiment, the second support frame 61 may be formed from steel having a certain structural strength. Of course, it may also be formed by overlapping and processing a tubular structure. The second support frame 61 may have various structural materials and shapes, as long as the second support frame 61 can play a certain supporting role, which is not limited in the present disclosure. The driving mechanism 63 may adopt a synchronous belt transmission method (that is, a combination of pulleys and a belt), or, of course, may adopt a chain transmission method (that is, a combination of sprockets and a chain). The present disclosure does not limit the transmission method of the driving mechanism 63, as long as the driving mechanism 63 can drive the printhead 100. Furthermore, the first direction may be a length direction of the second support frame 61, that is, a length direction of the machine body. By using the driving mechanism 63 to drive the printhead 100 to reciprocate in the first direction on the second support frame 61, the position of the printhead 100 can be adjusted reciprocally along a certain moving path, so that the printhead 100 can eject ink on the printing material to form the required images or text.

In some implementations, reference can be made to FIG. 21. The moving device 600 further includes a support guide rail 65 and a support slider 67. The support guide rail 65 is disposed on the second support frame 61 and extends in the first direction, and may be arranged side by side with the driving mechanism 63. The support slider 67 is movably connected to the support guide rail 65. The printhead 100 is connected to the support slider 67. By moving the support slider 67 on the support guide rail 65 in the first direction, a certain rigid support can be provided for the printhead 100, which is conducive to sharing part of the force of the printhead 100, thereby reducing the load-bearing requirements of the driving mechanism 63, and further improving the service life of the driving mechanism 63.

In some implementations, reference can be made to FIG. 21 to FIG. 23. The driving mechanism 63 includes a third driving mechanism, a driving wheel 633, a driven wheel 635, and a driving belt 637. The driving wheel 633 and the driven wheel 635 are disposed on the second support frame 61 in a transmission manner. The driving belt 637 is connected to both the driving wheel 633 and the driven wheel 635. The third driving mechanism is connected to the second support frame 61. The third driving mechanism is configured to drive the driving wheel 633 to rotate, so that the driving wheel 633 can drive the driving belt 637 and the driven wheel 635 to rotate. The third driving mechanism may be a motor, or, of course, may be other devices that can drive the driving wheel 633 to rotate, which is not limited in the present disclosure. The driving belt 637 includes a chuck 6371 and a belt body 6373. The chuck 6371 may be connected to the printhead 100, so that the printhead 100 can follow the chuck 6371 to move in the first direction. The chuck 6371 includes a base plate 6371*a* and two opposite clamping blocks 6371*b*. The two opposite clamping blocks 6371*b* define a clamping slot therebetween. The two ends of the belt body 6373 are respectively inserted into the clamping slot from the opposite sides of the chuck 6371. The two opposite clamping blocks 6371*b* are movable relative to each other, so that the chuck 6371 clamps the two ends of the belt body 6373, and the belt body 6373 and the chuck 6371 cooperatively define a loop. Therefore, by using the chuck 6371 to clamp the two ends of the belt body 6373 to form a looped driving belt 637, the overall length dimension of the driving belt 637 can be adjusted more conveniently, so that the driving belt 637 can be better adapted to various types of driving mechanisms 63. Protruding structures such as engaging teeth may be provided on the opposite surfaces of the two clamping blocks 6371*b*, so that the chuck 6371 can better engage and clamp the belt body 6373 by using the protruding structures, thereby improving the structural stability and reliability of the driving belt 637. Exemplarily, the clamping block 6371*b* may be connected to the base plate 6371*a* by means of screw connection. At this time, a spindle-shaped structure may be provided on one side of the base plate 6371*a* adjacent to the clamping block 6371*b*, so that the clamping block 6371*b* can abut against the spindle-shaped structure during the tightening and mounting process, and then the two opposite clamping blocks 6371*b* can approach each other to clamp the belt body 6373. Of course, the clamping block 6371*b* may be connected to the base plate 6371*a* by a snap-fit or other means, as long as the clamping block 6371*b* can be connected to the base plate 6371*a* and clamp the belt body 6373, which is not limited in the present disclosure.

In some implementations, reference can be made to FIG. 21 and FIG. 22. The driving mechanism 63 further includes a tensioning mechanism 639. The tensioning mechanism 639 is configured to adjust a distance between the driven wheel 635 and the driving wheel 633. Exemplarily, in some embodiments, the tensioning mechanism 639 may include an adjustment plate 6391, an adjustment bolt 6393, and a third elastic member 6395. The adjustment plate 6391 is connected to the second support frame 61 and is located on one side of the driven wheel 635. The adjustment plate 6391 defines a bolt hole. The adjustment bolt 6393 is connected to an inner wall of the bolt hole. The third elastic member 6395 is connected to the adjustment bolt 6393 and abuts against the driven wheel 635. The third elastic member 6395 may be a spring or rubber, etc. The present disclosure does not limit the type of the third elastic member 6395. Therefore, by tightening or loosening the adjustment bolt 6393 on the adjustment plate 6391, the elastic deformation of the third elastic member 6395 can be changed, thereby adjusting the distance between the driven wheel 635 and the driving wheel 633, realizing the adjustment of the degree of tightness of the driving belt 637, and enabling the driving mechanism 63 to drive the printhead 100 to reciprocate in the first direction more stably. Of course, the present disclosure is not limited to this. In other embodiments, the tensioning mechanism 639 may also adopt a sliding structure that is connected to and supports the driven wheel 635. The present disclosure does not limit the tensioning mechanism 639, as long as the tensioning mechanism 639 can adjust the distance between the driven wheel 635 and the driving wheel 633.

Figure 15:
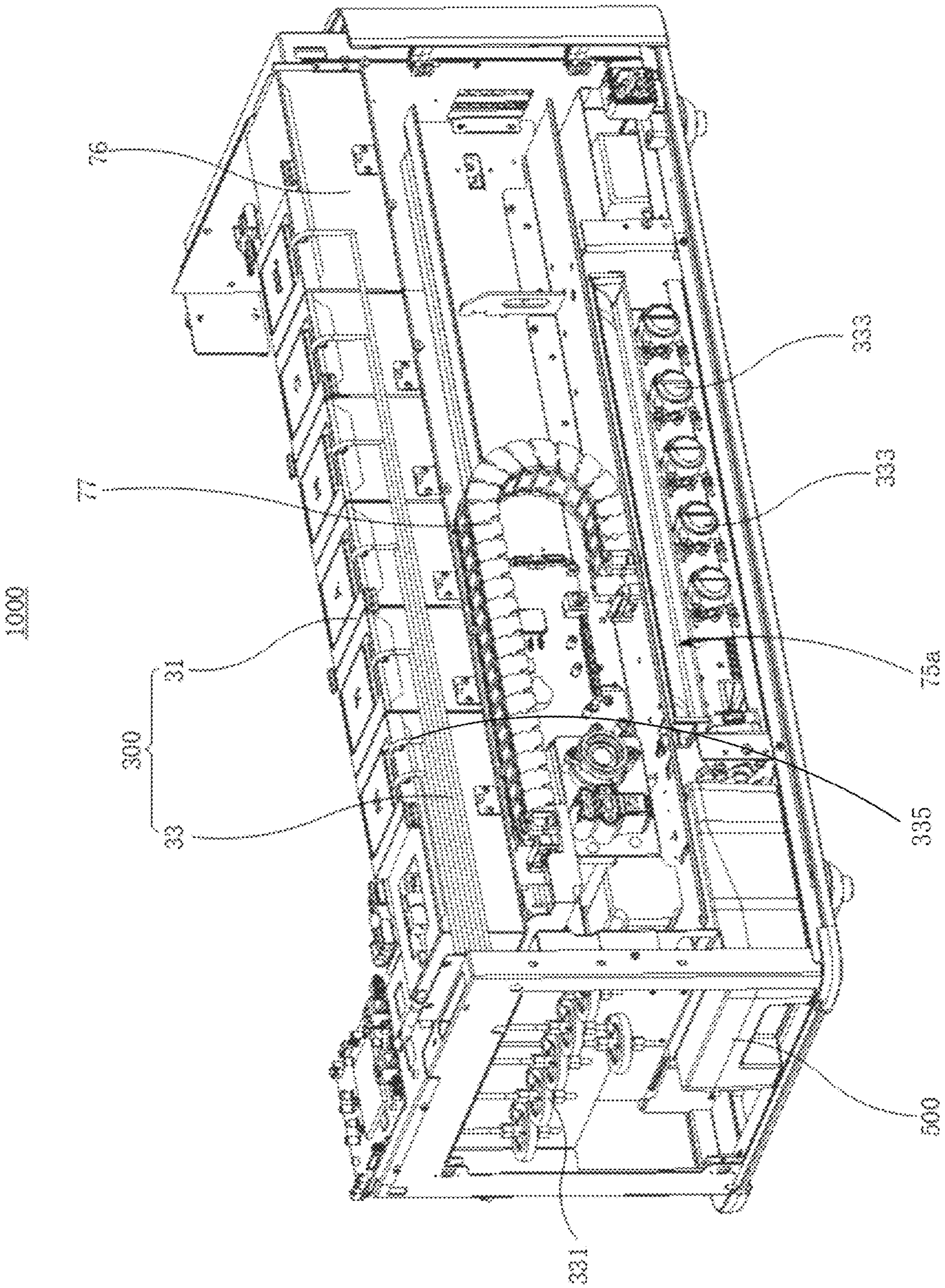
FIG. 15 is a rear view of an embodiment of an inkjet printing device provided in the present disclosure.
Figure 24:
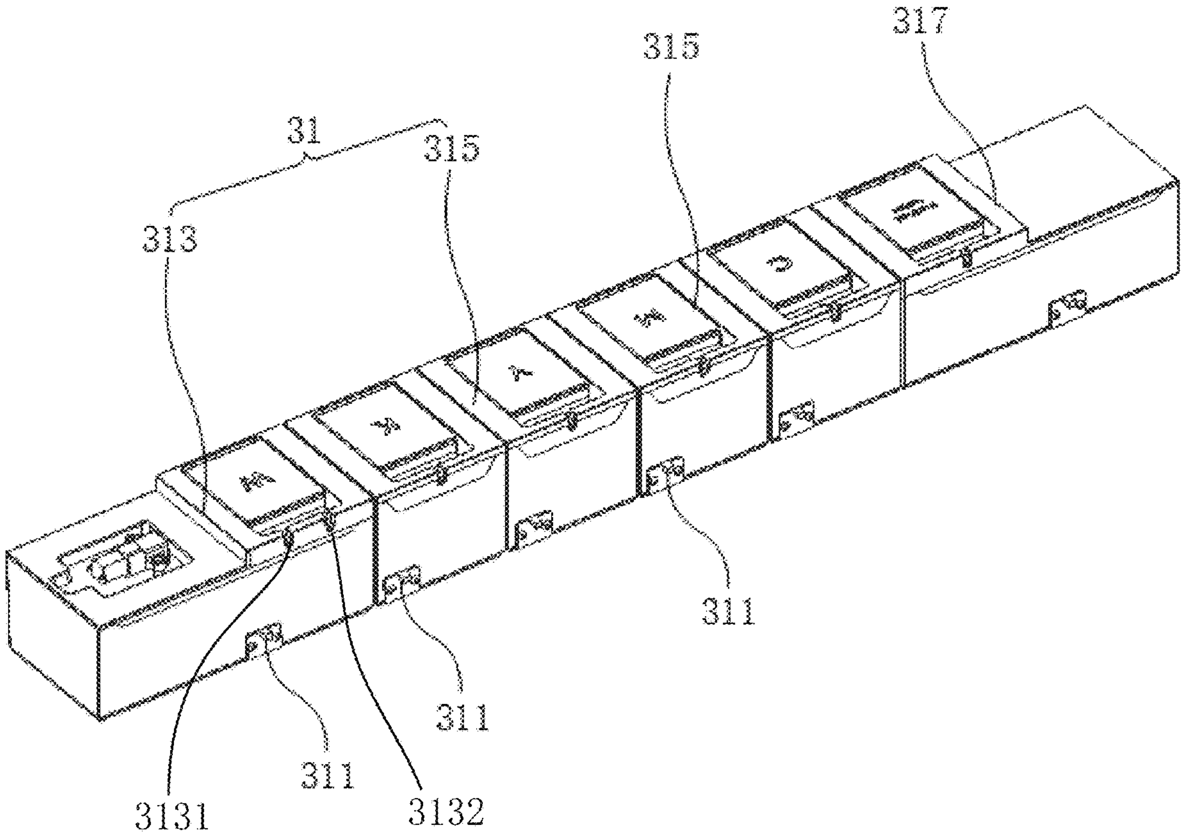
FIG. 24 is a partial structural view of an embodiment of an ink supply assembly of an inkjet printing device provided in the present disclosure.

Reference can be made to FIG. 15 and FIG. 24. In some embodiments of the present disclosure, the ink supply module 300 includes an ink cartridge 31 and an ink supply line 33. The ink supply line 33 is connected between the ink cartridge 31 and the printing module 13 of the printhead 100.

It can be understood that the ink cartridge 31 may be a storage container capable of storing a certain volume of ink. By connecting the ink supply line 33 between the ink cartridge 31 and the printing module 13 of the printhead 100, the printhead 100 and the ink supply module 300 can be better arranged through pipeline layout, so that the inkjet printing device 1000 can achieve a more reasonable structural design.

Reference can be made to FIG. 15 and FIG. 24. The ink supply module 300 may be provided with at least two ink cartridges 31. By injecting inks of different colors into the at least two ink cartridges 31 respectively, the printhead 100 can use different ink combinations to realize multi-color inkjet effects, so that the inkjet printing device 1000 can better process and form the desired images or text on the printing material. At this time, the at least two ink cartridges 31 may be arranged and connected in sequence to form a whole, thereby facilitating the disassembly and assembly of the ink cartridges 31. A disassembly and assembly structure may be provided between the at least two ink cartridges 31, so that the at least two ink cartridges 31 can only be removed in a certain pick-and-place order. Of course, the ink supply module 300 may also use a fixed frame for mounting of the at least two ink cartridges 31, so that the at least two ink cartridges 31 are arranged on the fixed frame in a certain order. The present disclosure does not limit the assembly method of the ink cartridges 31. In some implementations, the ink supply module 300 may be provided with at least two ink supply lines 33, with one ink supply line 33 connected to one ink cartridge 31, thereby ensuring the stable and independent ink supply of multiple ink cartridges 31 and the stable operation of the inkjet printing device 1000.

It can be understood that the ink cartridge 31 of the ink supply module 300 can be disposed outside the inkjet printing device 1000, and the ink cartridge 31 and the printhead 100 are connected by the ink supply pipe for ink supply. Alternatively, when the inkjet printing device 1000 is provided with the housing 700 to accommodate multiple components, the ink supply module 300 may also be disposed in the accommodating space of the housing 700, so that multiple components can be integrated in the housing 700 of the inkjet printing device 1000, thereby facilitating the esthetics and the compact design of the whole machine of the inkjet printing device 1000. Of course, the present disclosure does not limit the arrangement method of the ink supply module 300, as long as the stable arrangement of the ink supply module 300 and the supply of ink from the ink supply module 300 to the printhead 100 can be realized.

Exemplarily, reference can be made to FIG. 15. In some embodiments, when the ink supply module 300 is disposed in the housing 700, the housing 700 may be provided with a third support frame 76 behind the printhead 100, so that the ink cartridges 31 of the ink supply module 300 can be stably arranged and mounted on the third support frame 76. Then, by using the ink supply line 33 to route stably inside the housing 700, the stable ink supply and connection between the ink cartridge 31 and the printhead 100 can be realized. The ink supply line 33 may be connected to a filter 331 and a pump 333 in sequence. By using the pump 333 to generate a suction force on the ink supply line 33, the ink can flow through the filter 331 and the pump 333 in sequence and then flow into the printing module 13 of the printhead 100, thereby facilitating reduction of the blockage of the printing module 13 caused by impurities in the ink, and ensuring the stable inkjet printing of the printing module 13. The filter 331 and the pump 333 may be mounted in the housing 700, and multiple pipe sections are used to connect the ink cartridge 31, the filter 331, the pump 333, and the printing module 13 in sequence, so that a more compact structural layout of the inkjet printing device 1000 can be realized.

Figure 26:
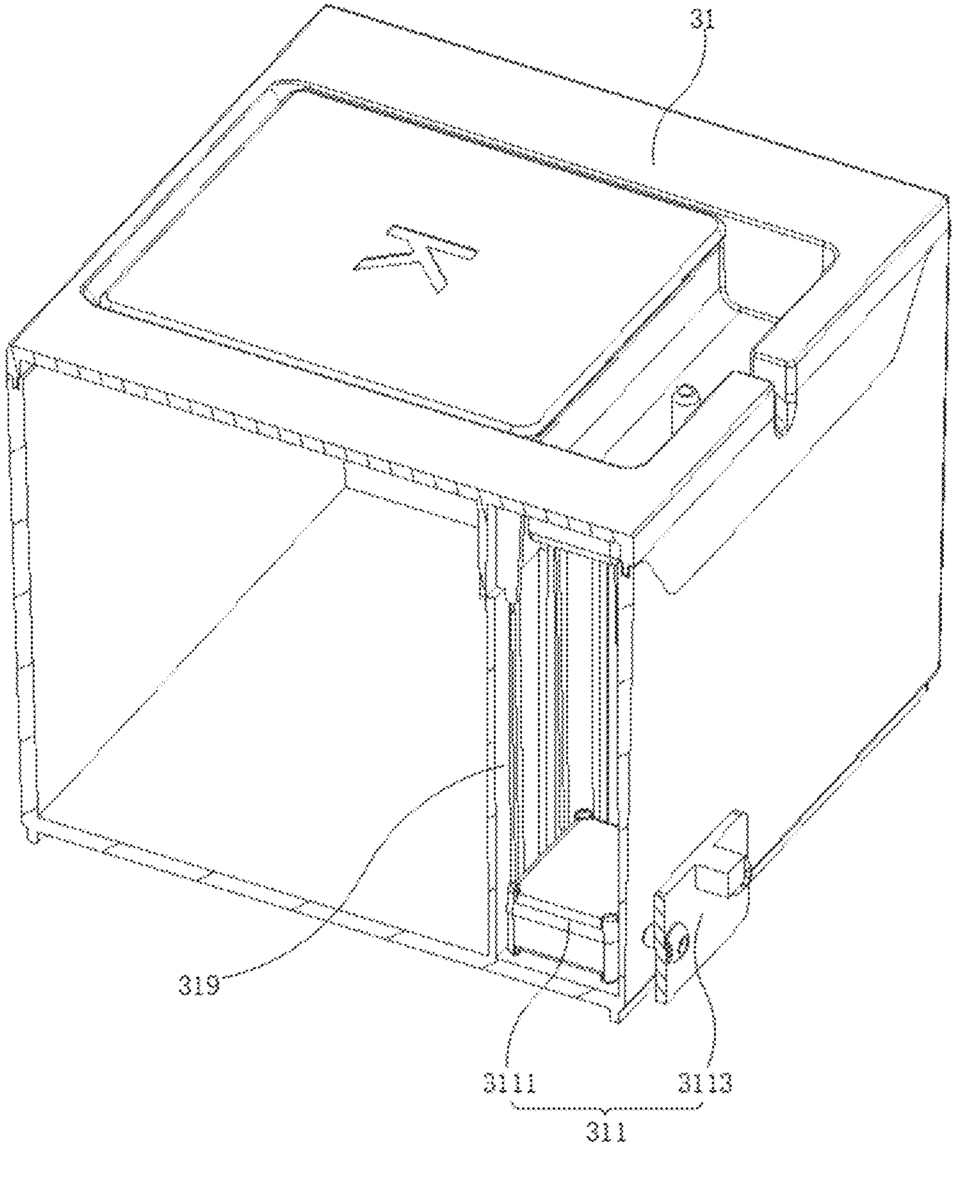
FIG. 26 is a cross-sectional view of another embodiment of the ink cartridge of the ink supply assembly in FIG. 24.

In some implementations, reference can be made to FIG. 26. The ink cartridge 31 may be provided with an ink-material detection device 311. The ink-material detection device 311 can be used to detect an ink level in the ink cartridge 31. Exemplarily, the ink-material detection device 311 may include a first detection float 3111 disposed inside the ink cartridge 31 and a first detection signaler 3113 disposed outside the ink cartridge 31. The first detection float 3111 is movable with a rise and fall of a liquid level in the ink cartridge 31. When the first detection float 3111 moves to a certain height, the first detection signaler 3113 can be triggered, so that the first detection signaler 3113 can send a signal indicating a lack of ink or a full ink load to the controller of the inkjet printing device 1000, thereby reminding the user to refill the ink cartridge 31 with ink or stop refilling. The first detection signaler 3113 may be a Hall sensor, and the first detection float 3111 may be provided with a trigger structure such as a magnet therein, so that when the first detection float 3111 rises or falls to a position flush with the first detection signaler 3113, the first detection signaler 3113 can be triggered. Of course, the ink-material detection device 311 may also adopt a detection device such as a pressure-sensitive sensor, which is not limited in the present disclosure.

In addition, the ink cartridge 31 may be further provided with a guiding structure 319 therein, and the guiding structure 319 is configured to guide and limit the up-and-down movement of the first detection float 3111, so that the first detection float 3111 can be vertically moved up and down in the third direction, thereby preventing the first detection float 3111 from moving out of the detection range of the first detection signaler 3113.

Figure 25:
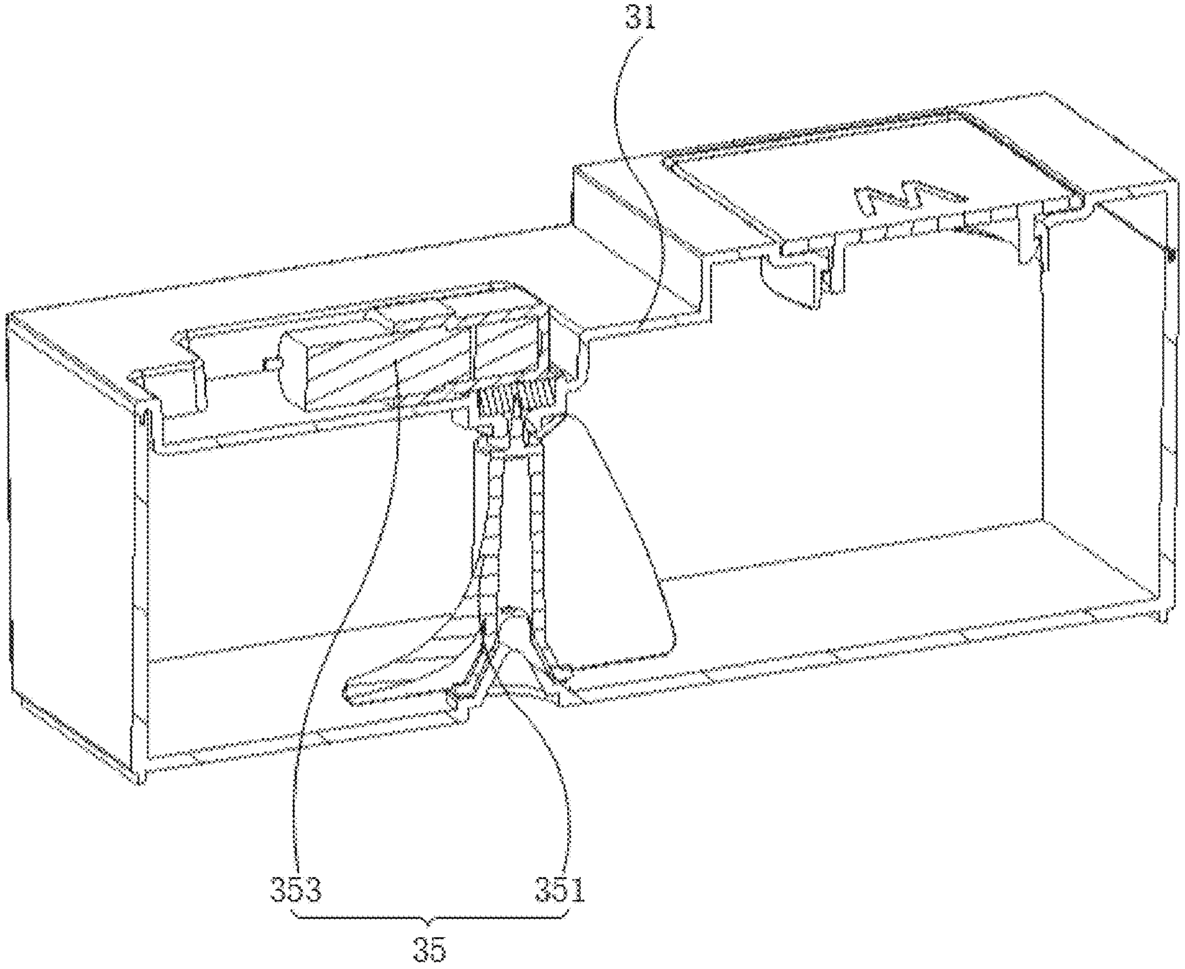
FIG. 25 is a cross-sectional view of an embodiment of an ink cartridge of the ink supply assembly in FIG. 24.

Reference can be made to FIG. 25. In some embodiments, the ink cartridge 31 may include a first ink-cartridge 313 and a second ink-cartridge 315. The first ink-cartridge 313 is provided with a stirring mechanism 35 therein. When the inkjet printing device 1000 prints on printing material such as films, colored ink is generally ejected first, followed by white ink as a background color for the printing material. At this time, the first ink-cartridge 313 can be used to store white ink, and the second ink-cartridge 315 can be used to store colored ink. Of course, the present disclosure is not limited to this. In other embodiments, the first ink-cartridge 313 and the second ink-cartridge 315 may also be used to store other different types of ink, as long as the printing function of the inkjet printing device 1000 can be guaranteed. When the first ink-cartridge 313 is filled with ink such as white ink that is prone to coagulation, the stirring mechanism 35 can be used to stir the ink in the first ink-cartridge 313, thereby effectively preventing the ink in the first ink-cartridge 313 from coagulating and ensuring the fluidity of the ink in the first ink-cartridge 313.

In some implementations, reference can be made to FIG. 25. In some implementations, the stirring mechanism 35 includes a stirring blade 351 and a stirring motor 353. The stirring blade 351 is rotatably disposed in the first ink-cartridge 313. The stirring motor 353 is disposed on an outer wall of the first ink-cartridge 313. A rotating shaft 221 of the stirring motor 353 passes through a wall of the first ink-cartridge 313 and is connected to the stirring blade 351. By disposing the stirring motor 353 on the first ink-cartridge 313 to drive the stirring blade 351 inside the first ink-cartridge 313 to rotate, the stirring mechanism 35 can be serviced and maintained without removing the entire first ink-cartridge 313, thereby avoiding an opening structure on the first ink-cartridge 313 that is required for disassembling and assembling the stirring mechanism 35, and reducing the risk of ink leakage from the first ink-cartridge 313. Of course, in other embodiments, the stirring mechanism 35 may also adopt an ultrasonic vibration manner. The present disclosure does not limit the type of the stirring mechanism 35, as long as the stirring mechanism 35 can stir the ink in the first ink-cartridge 313.

In addition, the first ink-cartridge 313 may define a first ink-port 3131 and a second ink-port 3132. One end of the ink supply line 33 is connected to the first ink-port 3131. The ink supply line 33 is provided with an ink-return branch conduit 335. The ink-return branch conduit 335 is connected to the second ink-port 3132. The ink supply line 33 can draw out the ink in the first ink-cartridge 313 through the first ink-port 3131. By providing the ink-return branch conduit 335 on the ink supply line 33, part of the ink in the first ink-cartridge 313 can circulate through the ink supply line 33, thereby helping to prevent the ink in the first ink-cartridge 313 from having a certain probability of coagulation caused by standing still, and further ensuring the fluidity of the ink in the ink supply module 300.

In some embodiments, both the first ink-cartridge 313 and the second ink-cartridge 315 are provided with a liquid-level detection module. The liquid-level detection module is configured to detect a liquid level inside the first ink-cartridge 313 and a liquid level inside the second ink-cartridge 315, so as to issue a warning or indicate the amount of ink in the first ink-cartridge 313 and the amount of ink in the second ink-cartridge 315 when the amount of ink in the first ink-cartridge 313 and the amount of the second ink-cartridge 315 are insufficient, thereby enabling a user to timely replenish the corresponding ink when the amount of ink in the first ink-cartridge 313 and the amount of ink in the second ink-cartridge 315 are insufficient. The liquid-level detection module may employ detection mechanisms such as a float-type liquid-level detection mechanism, a probe-type liquid-level detection mechanism, an optical liquid-level detection structure, or an ultrasonic liquid-level detection structure.

In some embodiments, there are multiple second ink-cartridges 315. The multiple second ink-cartridges 315 are respectively used for storing ink liquids of different colors. For example, there may be four second ink-cartridges 315, respectively storing ink of the CMYK four colors, so as to respectively supply the CMYK four colors of ink to the printhead 100.

In some embodiments, reference can be made to FIG. 15. The housing 700 further includes a drag-chain structure 77. The drag-chain structure 77 is movably disposed. The drag-chain structure 77 defines tubing-routing channel therein. The ink supply line 33 passes through the tubing-routing channel.

In this embodiment, by routing the ink supply line 33 through the drag-chain structure 77, the drag-chain structure 77 can be used to bind multiple pipelines together into a whole, thereby realizing the orderly arrangement of the ink supply line 33 inside the housing 700, and reducing the interference between the ink supply line 33 and other components inside the housing 700, and better realizing the compact design of the inkjet printing device 1000. In addition, the use of the drag-chain structure 77 also enables the ink supply line 33 to move more stably along with the printhead 100, reducing the dragging force on the ink supply line 33, and better avoiding liquid leakage between the ink supply module 300 and the printing module 13.

Figure 27:
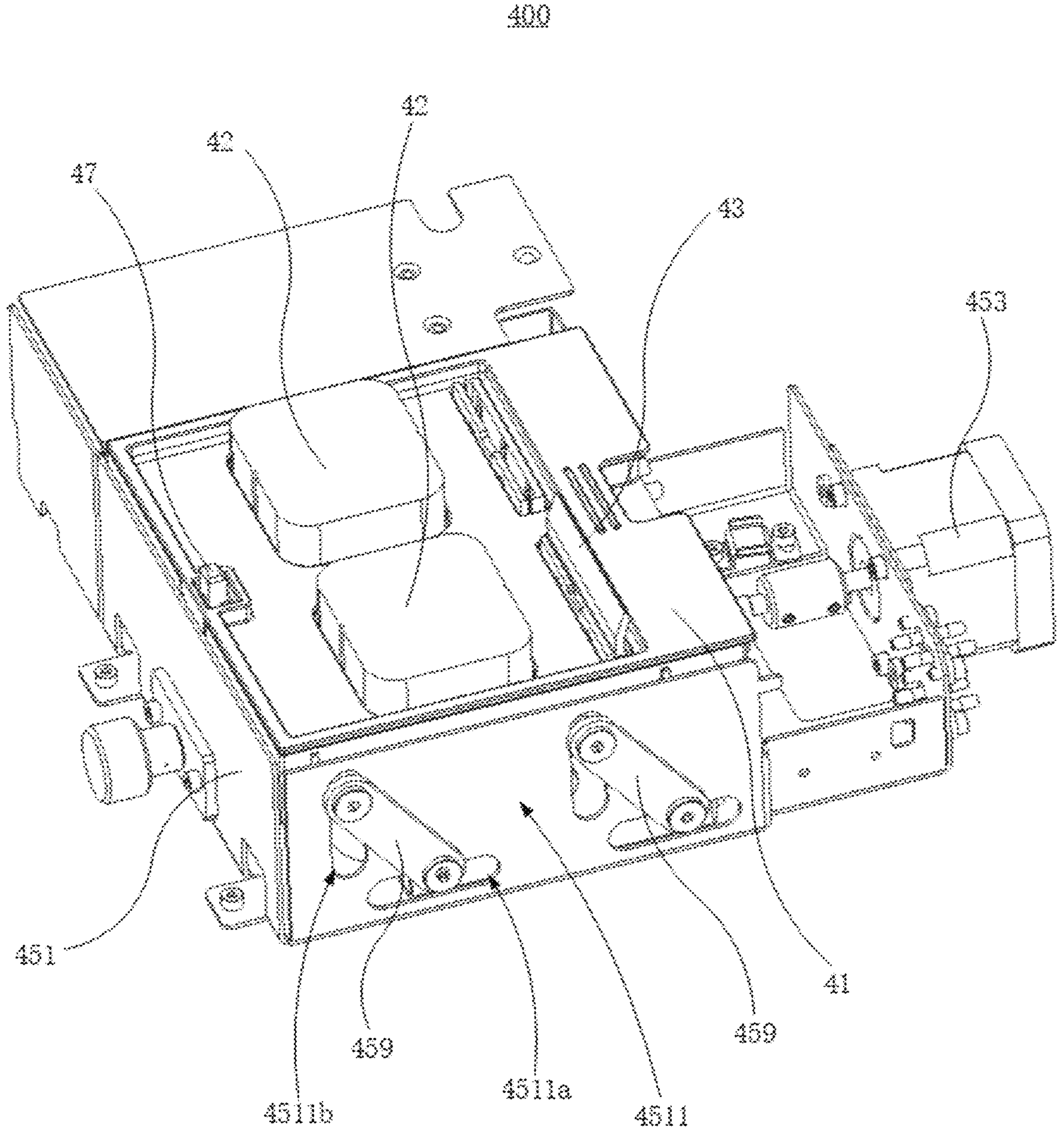
FIG. 27 is a schematic structural view of an embodiment of the ink station module of the inkjet printing device provided in the present disclosure.

Reference can be made to FIG. 4, FIG. 16, and FIG. 27. In some embodiments of the present disclosure, the inkjet printing device 1000 further includes an ink station module 400. The ink station module 400 is configured to clean and/or moisturize the printing module 13 of the printhead 100.

In this embodiment, the ink station module 400 can be used to clean and/or moisturize the printing module 13, which helps prevent the ink from coagulating and blocking at the nozzles of the printing module 13, thereby ensuring the stable operation of the printhead 100. There are various ways for the ink station module 400 to clean the printing module 13. For example, the coagulated ink on the printing module 13 can be removed by scraping, or the printing module 13 can be cleaned with a cleaning agent. Of course, a combination of multiple cleaning methods may also be used, such as scraping followed by cleaning. The present disclosure does not limit the cleaning method of the ink station module 400, as long as the ink station module 400 can clean the printing module 13.

The ink station module 400 may be disposed on one side of the printing table 200 in the first direction, so that the printhead 100 can be more conveniently translated from the printing table 200 to the ink station module 400 for cleaning or standby, which is conducive to the more compact structural design of the inkjet printing device 1000.

Figure 28:
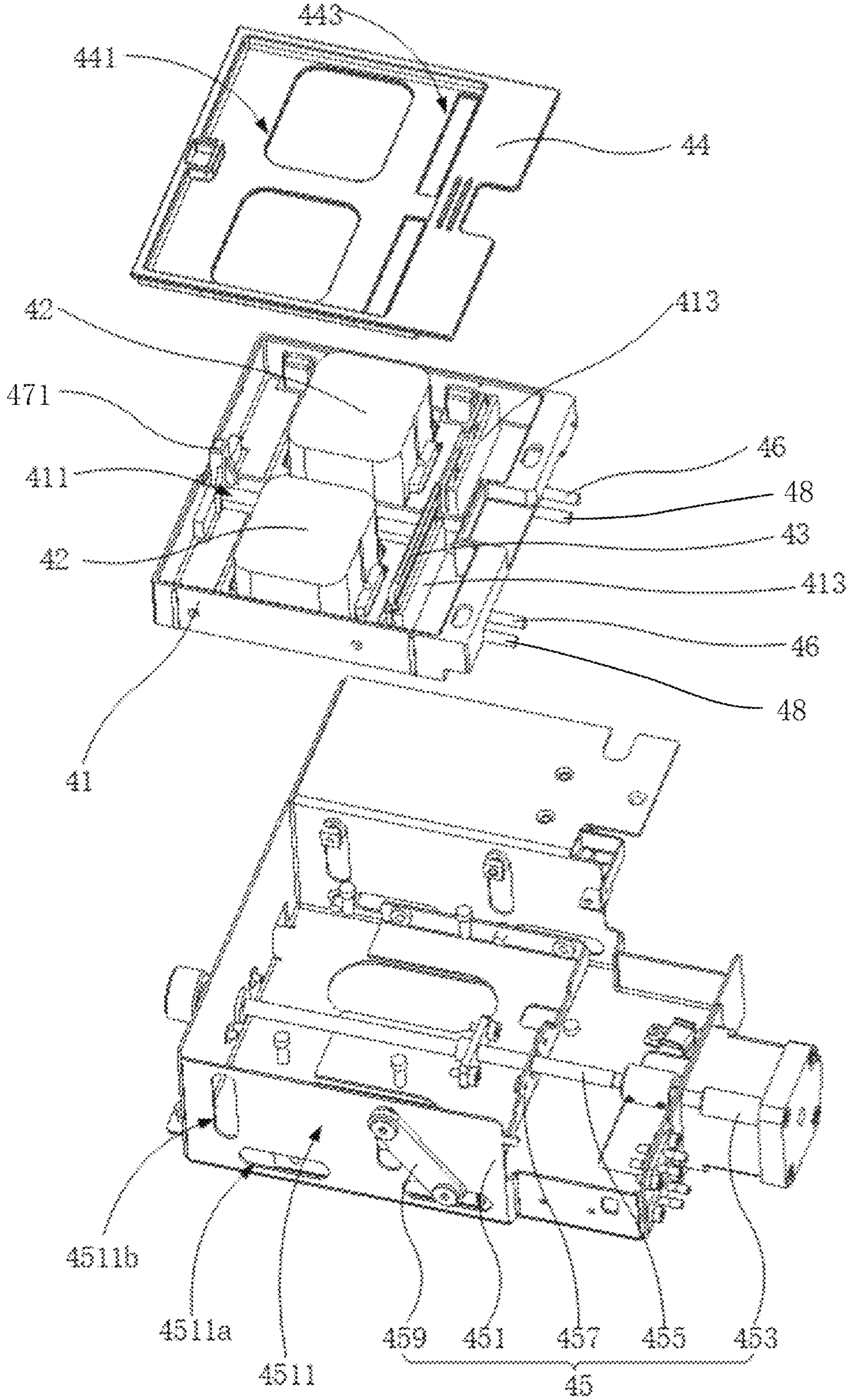
FIG. 28 is an exploded view of an embodiment of the ink station module in FIG. 27.

In some implementations, reference can be made to FIG. 27 and FIG. 28. The ink station module 400 includes a trigger structure 47. The trigger structure 47 is configured to detect and position the printhead 100.

Exemplarily, the trigger structure 47 may be a protruding structure 471. By defining a recess 135 at a corresponding position of the printing module 13, the printhead 100 can be correspondingly located on the ink station module 400. In addition, when the cleaning structure of the ink station module 400 comes into corresponding contact with the printing module 13, the protruding structure 471 is exactly inserted into the recess 135. At this time, a corresponding triggering sensor can be provided in the protruding structure 471 or the recess 135, so that the controller of the inkjet printing device 1000 can recognize that the printhead 100 is correspondingly located on the ink station module 400. At this time, the ink station module 400 can be stably started to clean the printing module 13, thereby realizing the precise alignment between the printhead 100 and the ink station module 400. When the trigger structure 47 is not triggered, a stop-operation signal may be sent to the ink station module 400, so as to avoid a certain probability of idle operation or ink leakage of the ink station module 400 caused by the printhead 100 being displaced from the ink station module 400. Of course, in other embodiments, the trigger structure 47 may also adopt a pressure-sensitive sensor, a distance-measuring sensor, etc. The present disclosure does not limit the type of the trigger structure 47, as long as the corresponding detection of the printhead 100 and the ink station module 400 can be realized.

Reference can be made to FIG. 27 and FIG. 28. In some embodiments, the ink station module 400 may include an ink station platform 41 and an ink pad 42. The ink station platform 41 defines a waste collection groove 411 on a top surface of the ink station platform 41. The ink pad 42 is disposed in the waste collection groove 411. At this time, when the printhead 100 is placed on the ink station module 400 to be cleaned, the printing module 13 may be in contact with the ink pad 42. The ink pad 42 may be a cleaning pad having a certain ink-absorbing function for solidified ink, or a cleaning pad having a certain ink-wiping function for the solidified ink, etc. The present disclosure does not limit the type of the ink pad 42, as long as the ink pad 42 can realize the cleaning function for the printing module 13. By providing the ink pad 42 in the waste collection groove 411 of the ink station platform 41, the dirt or polluted water generated during cleaning of the printing module 13 by the ink pad 42 can be collected into the waste collection groove 411, thereby preventing the dirt or polluted water from splashing inside the inkjet printing device 1000. The shape of the ink station platform 41 may be configured with a regular shape, such as square, circular, or, of course, may be configured with an irregular shape, and the present disclosure does not limit this.

In some implementations, the ink station module 400 may further include a scraper 43. The scraper 43 is disposed in the waste collection groove 411 and is arranged side by side with the ink pad 42. It can be understood that the scraper 43 and the ink pad 42 may be arranged side by side in the first direction, so that the printhead 100 contacts the scraper 43 first and then contacts the ink pad 42 during the process of moving from the printing table 200 to the ink station module 400. Therefore, the solidified ink on the printing module 13 can be better scraped off under the action of the scraper 43, and then the printing module 13 can be kept in a better state for printing operations after being cleaned by the ink pad 42. The scraper 43 may be made of materials such as silicone, rubber, etc., so that the scraper 43 can have a certain degree of softness to prevent the scraper 43 from scratching the printing module 13. Of course, the scraper 43 may also be made of other materials. The present disclosure does not limit the shape and material of the scraper 43, as long as the scraper 43 can realize the cleaning treatment of the printing module 13.

In some implementations, a scraper holder 413 is provided in the waste collection groove 411. The scraper 43 is detachably connected to the scraper holder 413. By providing the scraper 43 in a detachable configuration on the ink station platform 41, the maintenance or replacement of the scraper 4 can be better facilitated, thereby avoiding the cleaning effect of the ink station module on the printing module 13 from being affected caused by damage to the scraper 43, and further improving the practicability of the inkjet printing device 1000. The scraper 43 may be mounted on the scraper holder 413 by means of snap-in and plugging, or the scraper holder 413 and the scraper 43 may be tightly connected by bolts. There are many ways to connect the scraper holder 413 and the scraper 43, and the present disclosure does not limit this, as long as the stable connection and convenient disassembly of the scraper 43 and the scraper holder 413 can be realized.

In addition, the ink station module 400 further includes a shielding cover plate 44. The shielding cover plate 44 can open or cover an opening of the waste collection groove 411. The shielding cover plate 44 defines a first avoidance hole 441 on the shielding cover plate 44. The ink pad 42 passes through the first avoidance hole 441. By providing the shielding cover plate 44 on the opening of the waste collection groove 411, the waste collection groove 411 can be shielded by the shielding cover plate 44, thereby avoiding the dirt or polluted water in the waste collection groove 411 from being exposed and avoiding the esthetics of the inkjet printing device 1000 from being affected. Meanwhile, it is beneficial to prevent a certain probability of the dirt or polluted water in the waste collection groove 411 from splashing out caused by the shaking of the inkjet printing device 1000 during transportation or handling. There may be a certain gap between an outer periphery of the ink pad 42 and an inner wall of the first avoidance hole 441, or an overflow groove may be recessed from the inner wall of the first avoidance hole 441, so that the dirt or polluted water after the ink pad 42 is cleaned can stably flow into the waste collection groove 411 through the first avoidance hole 441, thereby reducing the accumulation of dirt or polluted water on the shielding cover plate 44.

When the ink station module 400 is provided with the scraper 43, the shielding cover plate 44 may further define a second avoidance hole 443 for the scraper 43 to pass through, thereby ensuring the stable cleaning of the printing module 13 by the ink station module 400. There may be a certain gap between an outer periphery of the scraper 43 and the inner wall of the second avoidance hole 443, or an overflow groove may be recessed from the inner wall of the second avoidance hole 443, so that the dirt or polluted water after the ink pad 42 is cleaned can stably flow into the waste collection groove 411 through the second avoidance hole 443, thereby reducing the accumulation of dirt or polluted water on the shielding cover plate 44.

Reference can be made to FIG. 27 and FIG. 28. In some embodiments of the present disclosure, the ink station module 400 further includes a fourth driving mechanism 45. The fourth driving mechanism 45 is drivingly connected to the ink station platform 41, so that the ink station platform 41 has a cleaning state close to the printing table 200 and an avoidance state away from the printing table 200. It can be understood that when the printhead 100 needs to be cleaned, the fourth driving mechanism 45 can be controlled to drive the ink station platform 41 to move, so that the ink pad 42 is in contact with the printing module 13 for cleaning. When the printhead 100 needs to leave the ink station module 400, the fourth driving mechanism 45 can be controlled to drive the ink station platform 41 to move, so that the ink station platform 41 moves away from the printhead 100, thereby avoiding the movement of the printhead 100, which is conducive to better realizing the automatic control of the ink station module 400. The fourth driving mechanism 45 may drive the ink station platform 41 to move up and down. Of course, the fourth driving mechanism 45 may also be used to drive the ink station platform 41 to perform planar rotation. The present disclosure does not limit the transmission mode of the fourth driving mechanism 45, as long as the movement switching of the ink station platform 41 between the cleaning state and the avoidance state can be realized.

Exemplarily, the fourth driving mechanism 45 may include a fourth support frame 451, a driving motor 453, a lead screw 455, a driving slider 457, and a driving linkage 459. The lead screw 455 is rotatably connected to the fourth support frame 451. The driving motor 453 is connected to the lead screw 455 and can drive the lead screw 455 to rotate. The driving slider 457 is sleeved on the lead screw 455 and is disposed inside the fourth support frame 451. The driving linkage 459 is connected to both the driving slider 457 and the ink station platform 41. By using the driving motor 453 to drive the lead screw 455 to rotate, the driving slider 457 can slide on the fourth support frame 451 under the transmission action of the lead screw 455. Then, the driving slider 457 is used to translationally push the driving linkage 459 to drive the ink station platform 41 to move up and down, thereby ensuring the stable switching of the ink station platform 41 between the cleaning state and the avoidance state. In some implementations, the fourth support frame 451 has two opposite side plates 4511. At least part of the structure of the ink station platform 41 is disposed between the two side plates 4511. The side plate 4511 defines a first elongated hole **4511*a* extending in the first direction and a second elongated hole 4511*b* extending in the third direction. One end of the driving linkage 459 passes through the first elongated hole 4511*a* to be connected to the driving slider 457, and the other end of the driving linkage 459 passes through the second elongated hole 4511*b* to be connected to the ink station platform 41. By means of the first elongated hole 4511*a* and the second elongated hole 4511*b*, the movement limit of the driving linkage 459 can be well realized, so that the driving linkage 459 can more stably push the ink station platform 41 to move up and down under the translational drive of the driving slider 457, thereby ensuring the stable transmission connection of the fourth driving mechanism 45 to the ink station platform 41. In some implementations, the fourth driving mechanism 45 may be provided with at least two driving linkages 459 on the opposite sides of the driving slider 457 respectively, so that the transmission power of the fourth driving mechanism 45 on the ink station platform 41 is more even and stable, thereby avoiding the deviation of the ink station platform 41 during the up-and-down movement, and further improving the movement stability and reliability of the ink station platform 41**.

In some embodiments of the present disclosure, the ink station module 400 further includes a water-inlet pipeline 46 and a polluted-water discharge pipeline 48. The water-inlet pipeline 46 is connected to the ink pad 42. The polluted-water discharge pipeline 48 is connected to the ink station platform 41, and is in communication with the waste collection groove 411. The ink pad 42 may define a pipeline therein, so that the ink pad 42 can realize a certain function of water ejecting and cleaning. By connecting the water-inlet pipeline 46 to the ink pad 42, a certain amount of functional liquid can be introduced into the internal pipeline of the ink pad 42 through the water-inlet pipeline 46 and flow out through a water outlet on a surface of the ink pad 42 to clean the printing module 13, thereby further improving the cleaning effect of the ink station module 400. The polluted water or dirt in the waste collection groove 411 can be stably discharged through the polluted-water discharge pipeline 48, thereby avoiding the overflow, mildew, or odor caused by excessive polluted-water accumulation in the waste collection groove 411, and further improving the reliability of the ink station module 400. The other end of the water-inlet pipeline 46 away from the ink pad 42 may be connected to a water supply equipment outside the inkjet printing device

1000. Alternatively, when the ink supply module 300 is provided with a functional-liquid tank 317 to store a certain amount of functional liquid, the water-inlet pipeline 46 can be connected to a water supply pipeline of the ink supply module 300. At this time, if the ink supply module 300 is disposed in the housing 700 of the inkjet printing device 1000, a joint connecting the water-inlet pipeline 46 and the water supply pipeline may be provided in the housing 700, so that the water-inlet pipeline 46 and the water supply pipeline are respectively connected to both ends of the joint, thereby facilitating disassembly, assembly, and maintenance of the ink station module 400 and the ink supply module 300. In some embodiments, the ink station module 400 is configured to automatically clean the printhead 100 at regular intervals and automatically replenish the ink pad 42 with a functional liquid through the water-inlet pipeline 46 at regular intervals. The functional liquid may include a moisturizing liquid and/or a cleaning liquid. Of course, the water-inlet pipeline 46 may also be supplied with water in other ways, which is not limited in the present disclosure, as long as the functional liquid can stably flow into the water-inlet pipeline 46. One end of the polluted-water discharge pipeline 48 away from the ink station platform 41 may be connected to a waste liquid collection device outside the inkjet printing device 1000. Alternatively, when a waste-liquid cartridge 500 is provided in the housing 700 of the inkjet printing device 1000, the polluted-water discharge pipeline 48 may be connected to the waste-liquid cartridge 500, thereby ensuring the stable discharge of the polluted water or dirt in the waste collection groove 411. At this time, a joint structure connecting the polluted-water discharge pipeline 48 and the waste-liquid cartridge 500 can be provided in the housing 700, so as to facilitate the disassembly, assembly, and maintenance of the ink station module 400 and the waste-liquid cartridge 500. Of course, the polluted-water discharge pipeline 48 can also be discharged in other ways, which is not limited in the present disclosure, as long as the stable discharge of the polluted-water management can be realized.

In some implementations, when the ink station module 400 uses the driving mechanism to drive the ink station platform 41, a support base of the driving mechanism has a first inner sidewall and a second inner sidewall that are connected to each other. A first pipe-clamping component is connected to the first inner sidewall, and a second pipe-clamping component is connected to the second inner sidewall. The polluted-water discharge pipeline 48 and the water-inlet pipeline 46 are fixed to the first pipe-clamping component and the second pipe-clamping component respectively, so that the polluted-water discharge pipeline 48 and the water-inlet pipeline 46 are disposed close to the first inner sidewall and the second inner sidewall respectively. Under the limiting and fixing effect of the first pipe-clamping component and the second pipe-clamping component, the polluted-water discharge pipeline 48 and the water-inlet pipeline 46 can be effectively prevented from interfering with the driving components of the driving mechanism in the support base of the driving mechanism, thereby realizing the avoidance arrangement of the pipelines, and ensuring the stable operation of the ink station module 400.

Figure 29:
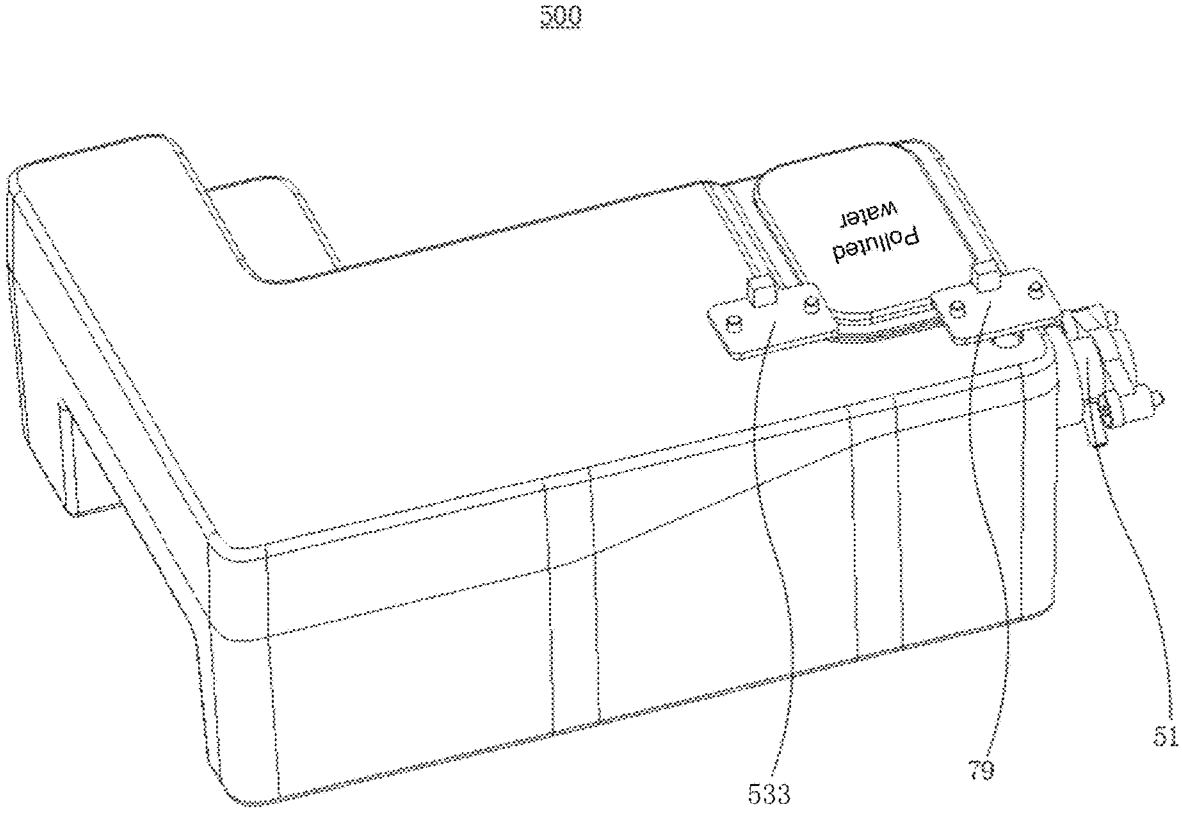
FIG. 29 is a schematic structural view of an embodiment of the waste-liquid cartridge of an inkjet printing device provided in the present disclosure.

Reference can be made to FIGS. 16 and 29. In some embodiments of the present disclosure, the inkjet printing device 1000 further includes a waste-liquid cartridge 500. The waste-liquid cartridge 500 is configured to collect the waste liquid generated by the inkjet printing device 1000. In some implementations, the waste-liquid cartridge 500 may be connected to the ink station module 400 of the inkjet printing device 1000 through a pipeline, so that the polluted water or dirt generated when the ink station module 400 uses the functional liquid to clean the printing module 13 can be conveyed to the waste-liquid cartridge 500 through the pipeline for collection. In addition, the waste-liquid cartridge 500 may also be connected to the ink supply module 300 or the printing module 13 through a pipeline, so that the ink overflowing from the ink supply module 300 or the printing module 13 can be collected into the waste-liquid cartridge 500, thereby avoiding the pollution of the inkjet printing device 1000 caused by the overflowing ink. Of course, the waste-liquid cartridge 500 may also be used for the collection of the discharged waste liquid overflowing from other components in the inkjet printing device 1000. The present disclosure does not limit the specific use of the waste-liquid cartridge 500, as long as the waste-liquid cartridge 500 can discharge the waste liquid generated by the inkjet printing device 1000.

Figure 30:
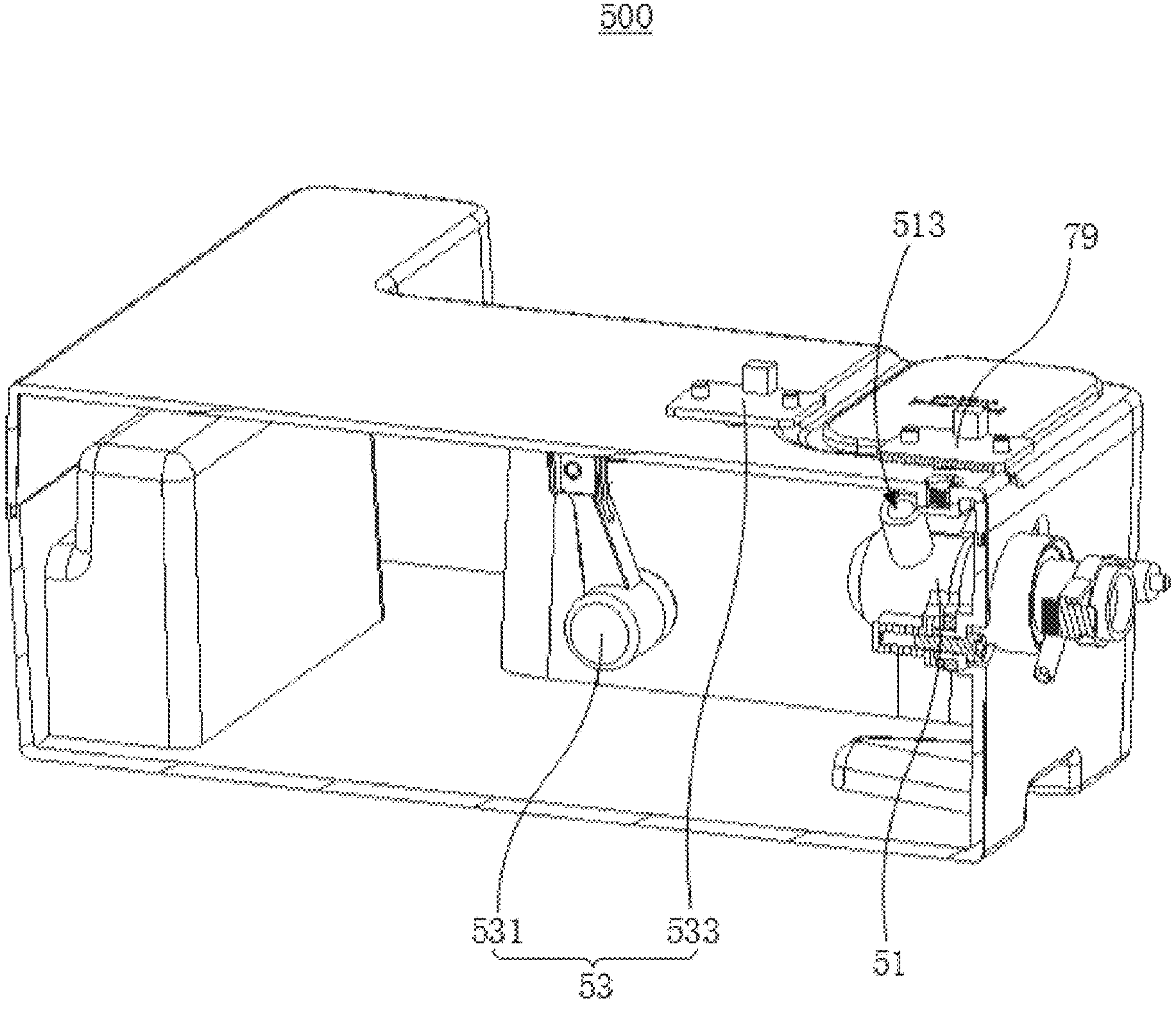
FIG. 30 is a cross-sectional view of an embodiment of the waste-liquid cartridge in FIG. 29.
Figure 31:
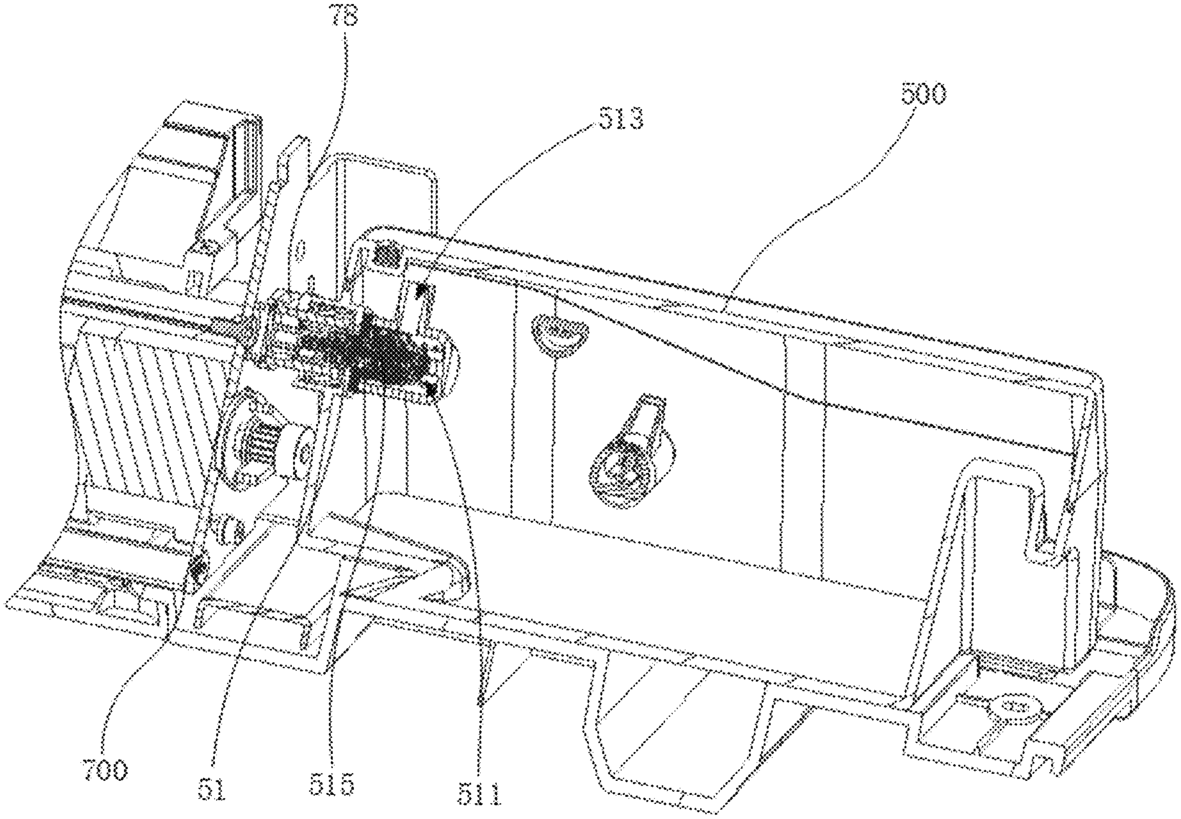
FIG. 31 is a cross-sectional view of an embodiment of the waste-liquid cartridge in FIG. 29 mounted inside a housing.

In some implementations, when the inkjet printing device 1000 is provided with a housing 700, the waste-liquid cartridge 500 may be disposed in the accommodating space defined by the housing 700, and the waste-liquid cartridge is detachably disposed in the housing 700. Reference can be made to FIG. 29 to FIG. 31. In some embodiments, a first pipe-head structure 51 is provided at a liquid inlet of the waste-liquid cartridge 500. The first pipe-head structure 51 defines a liquid inlet channel 511 therein. Part of the first pipe-head structure 51 disposed in the waste-liquid cartridge 500 defines a liquid outlet hole 513 in communication with the liquid inlet channel 511. Two one-way valves 515 are provided in sequence in the plug-in nozzle. A second pipe-head structure 78 may be provided in the housing 700. The second pipe-head structure 78 is engaged with the first pipe-head structure 51 in an insertable manner, so that part of the second pipe-head structure 78 extends into the first pipe-head structure 51 to push the one-way valve 515. The second pipe-head structure 78 is connected to the polluted-water discharge pipeline in the inkjet printing device 1000. Then, when the waste-liquid cartridge 500 is assembled into the housing 700, the insertable engagement between the first pipe-head structure 51 and the second pipe-head structure 78 can be used to establish the connection between the polluted-water discharge pipeline and the waste-liquid cartridge 500. When the waste-liquid cartridge 500 is removed from the housing 700, the second pipe-head structure 78 disengages from pushing the one-way valve 515, allowing the one-way valve 515 to elastically return and close the first pipe-head structure 51, thereby avoiding the leakage of polluted water or dirt in the waste-liquid cartridge 500 and realizing the convenient disassembly and assembly of the waste-liquid cartridge 500 on the housing 700. Of course, the present disclosure is not limited to this. In other embodiments, the waste-liquid cartridge 500 may also be connected to the polluted-water discharge pipeline in the housing 700 by other connection structures. The present disclosure does not limit the connection structure between the waste-liquid cartridge 500 and the housing 700, as long as the stable mounting of the waste-liquid cartridge 500 in the housing 700 and the pipeline communication can be realized.

In some implementations, reference can be made to FIG. 29 and FIG. 30. A position-detection mechanism 79 may be provided in the housing 700. The position-detection mechanism 79 is configured to detect whether the waste-liquid cartridge 500 is assembled in place, thereby ensuring the stable pipeline communication after the waste-liquid cartridge 500 is assembled in the housing 700, and effectively avoiding the liquid leakage at the connection position of the waste-liquid cartridge 500. The position-detection mechanism 79 may include a Hall sensor provided in the housing 700. At this time, a corresponding magnet trigger structure 47 may be provided on the waste-liquid cartridge 500, so that the magnet can cooperate with the Hall sensor to trigger when the waste-liquid cartridge 500 is mounted in place. Of course, the present disclosure is not limited to this. The position-detection mechanism 79 may also use a travel switch and other means, as long as the mounting in place of the waste-liquid cartridge 500 can be detected.

Reference can be made to FIG. 30 and FIG. 31. In some embodiments of the present disclosure, the waste-liquid cartridge 500 may be further provided with a waste-liquid detection mechanism 53. The waste-liquid detection mechanism 53 is configured to detect the liquid level in the waste-liquid cartridge 500. Exemplarily, a rotatable second detection float 531 may be provided in the waste-liquid cartridge 500. When the liquid level in the waste-liquid cartridge 500 rises and falls, the second detection float 531 may swing up and down to a certain extent according to the fluctuation of the liquid level. At this time, a second detection signaler 533 may be provided on the top of the waste-liquid cartridge 500. A second detection emitter may be provided in the second detection float 531. When the liquid level in the waste-liquid cartridge 500 rises to a certain height, the second detection float 531 can rise to a certain position. At this time, the second detection emitter and the second detection signaler 533 are positioned to trigger each other, so that the second detection signaler 533 can send a full-liquid signal of the waste-liquid cartridge 500 to the controller of the inkjet printing device 1000, thereby reminding to remove the waste-liquid cartridge 500 for discharge or replacement, and effectively avoiding the risk of waste liquid overflow caused by the full waste-liquid cartridge 500. The second detection signaler 533 may be a Hall sensor, and the second detection emitter may be a magnet. Of course, the second detection emitter and the second detection signaler 533 may also be a contact-type signal emitter and detector. The present disclosure does not limit this.

Figure 32:
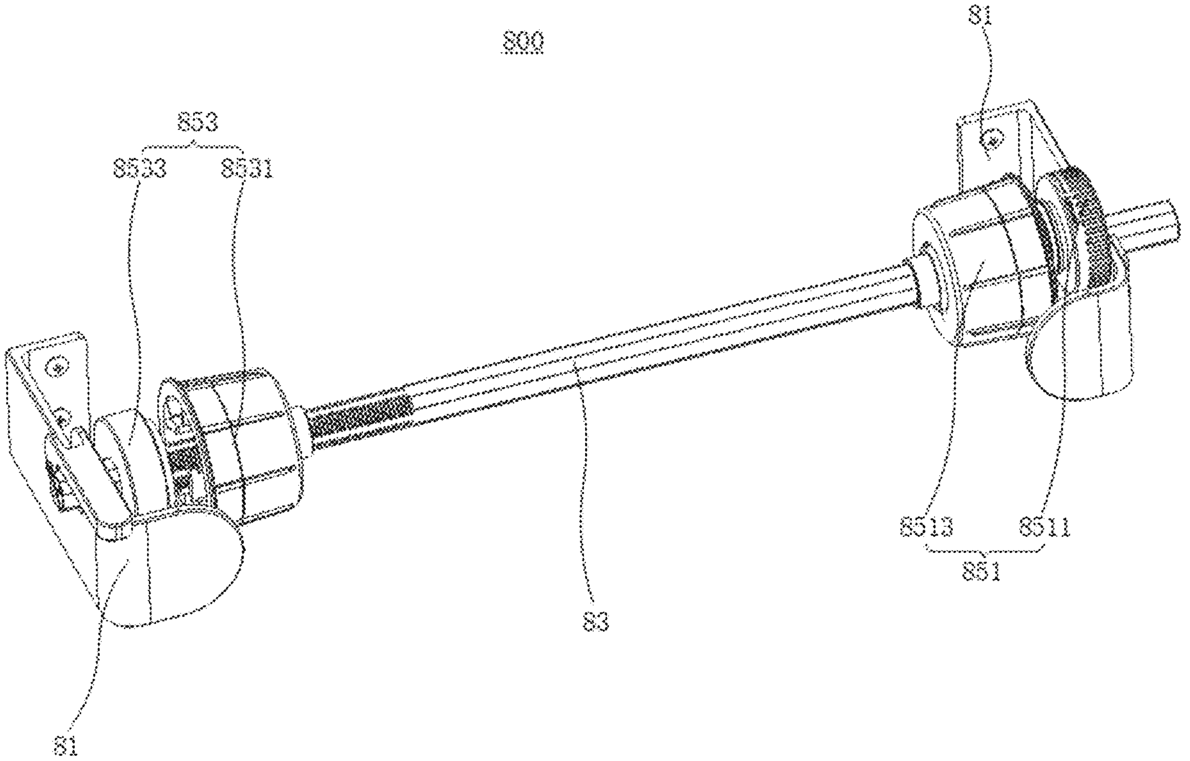
FIG. 32 is a schematic structural view of an embodiment of a material rack of an inkjet printing device provided in the present disclosure.

Reference can be made to FIG. 2, FIG. 3, and FIG. 32. In some embodiments of the present disclosure, the inkjet printing device 1000 includes a material rack 800. The material rack 800 is configured to load a material to-be-printed.

In this embodiment, by using the material rack 800 to load the material to-be-printed, the material to-be-printed may be wound around the material rack 800 in a rolling manner or stacked on the material rack 800, so that the material to-be-printed can be stably and continuously conveyed to the printing table 200 for printing processing. Of course, in other embodiments, the material to-be-printed may be loaded in other ways. The present disclosure does not limit the loading method of the material rack 800, as long as the stable carry and convey of the printing material can be realized.

When the inkjet printing device 1000 further includes a housing 700 to form the overall machine support structure, the material rack 800 and the housing 700 can be integrally formed. Alternatively, the material rack 800 may be detachably connected to the housing 700, that is, the material rack 800 and the housing 700 are in a split structure. At this time, the material rack 800 may be provided with a hook, and the material rack 800 may be disassembled and assembled by hanging the hook at the printing-material inlet 75*a* of the housing 700. Alternatively, the material rack 800 may be disassembled with, assembled with, and fixed to the housing 700, by fasteners such as bolts. Of course, the material rack 800 and the housing 700 may also be detachably connected by snap-fit or other connection manner. The present disclosure does not limit the connection manner between the material rack 800 and the housing 700.

Reference can be made to FIG. 32 to FIG. 35. In some embodiments, the material rack 800 includes a fifth support frame 81, a fixed shaft 83, and a material-roll structure 85. The fixed shaft 83 is connected to the fifth support frame 81. The material-roll structure 85 is sleeved on the fixed shaft 83, and is configured to load the material to-be-printed. For the material rack 800, the material to-be-printed may be sleeved on the material-roll structure 85, and the relative rotation between the material-roll structure 85 and the fixed shaft 83 may be used to release and convey the material to-be-printed. Alternatively, the fixed shaft 83 may be fixedly connected to the material-roll structure 85, and the fixed shaft 83 can be rotated on the fifth support frame 81 to release and convey the material to-be-printed. Alternatively, the material-roll structure 85 may be fixedly connected to the fixed shaft 83, the fixed shaft 83 may be fixedly connected to the fifth support frame 81, and the material to-be-printed can be set to rotate relative to the material-roll structure 85 to release and convey the material to-be-printed. Of course, the present disclosure does not limit the release method of the material to-be-printed on the material-roll structure 85. In other embodiments, other structures may also be adopted to release and convey the material to-be-printed.

In some embodiments, the fixed shaft 83 may be configured as a square shaft. The fixed shaft 83 is fixedly connected to the fifth support frame 81. By using the fixed shaft 83 to be fixedly mounted on the fifth support frame 81, the need for the bearing structure between the fixed shaft 83 and the fifth support frame 81 can be reduced, which is conducive to further simplifying the structure of the material rack 800 and reducing the production cost of the material rack 800.

In addition, reference can be made to FIG. 32 to FIG. 35. In some embodiments, the material-roll structure 85 may include a first sleeve-member 851 and a second sleeve-member 853. The first sleeve-member 851 and the second sleeve-member 853 and spaced apart from each other and are sleeved on the fixed shaft 83. A distance between the first sleeve-member 851 and the second sleeve-member 853 is adjustable. The first sleeve-member 851 and the second sleeve-member 853 are configured to allow the material to-be-printed to be sleeved thereon. By adjusting the distance between the first sleeve-member 851 and the second sleeve-member 853 on the fixed shaft 83, the material-roll structure 85 can better bear printing materials of various sizes, thereby improving the adaptability of the material rack 800.

Figure 33:
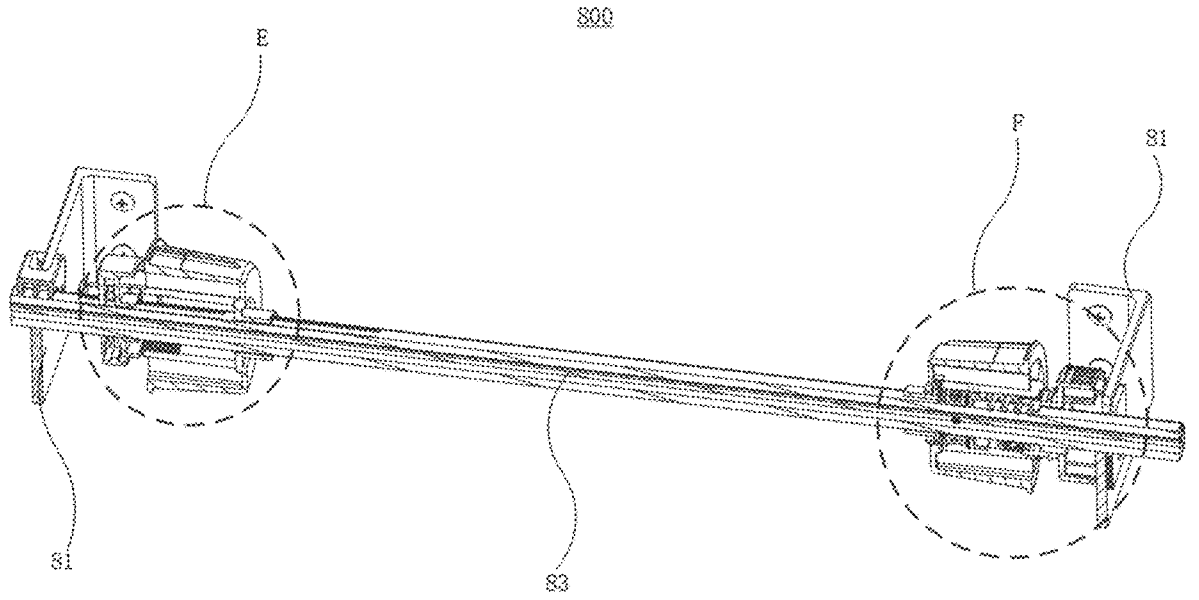
FIG. 33 is a cross-sectional view of an embodiment of the material rack in FIG. 32.
Figure 35:
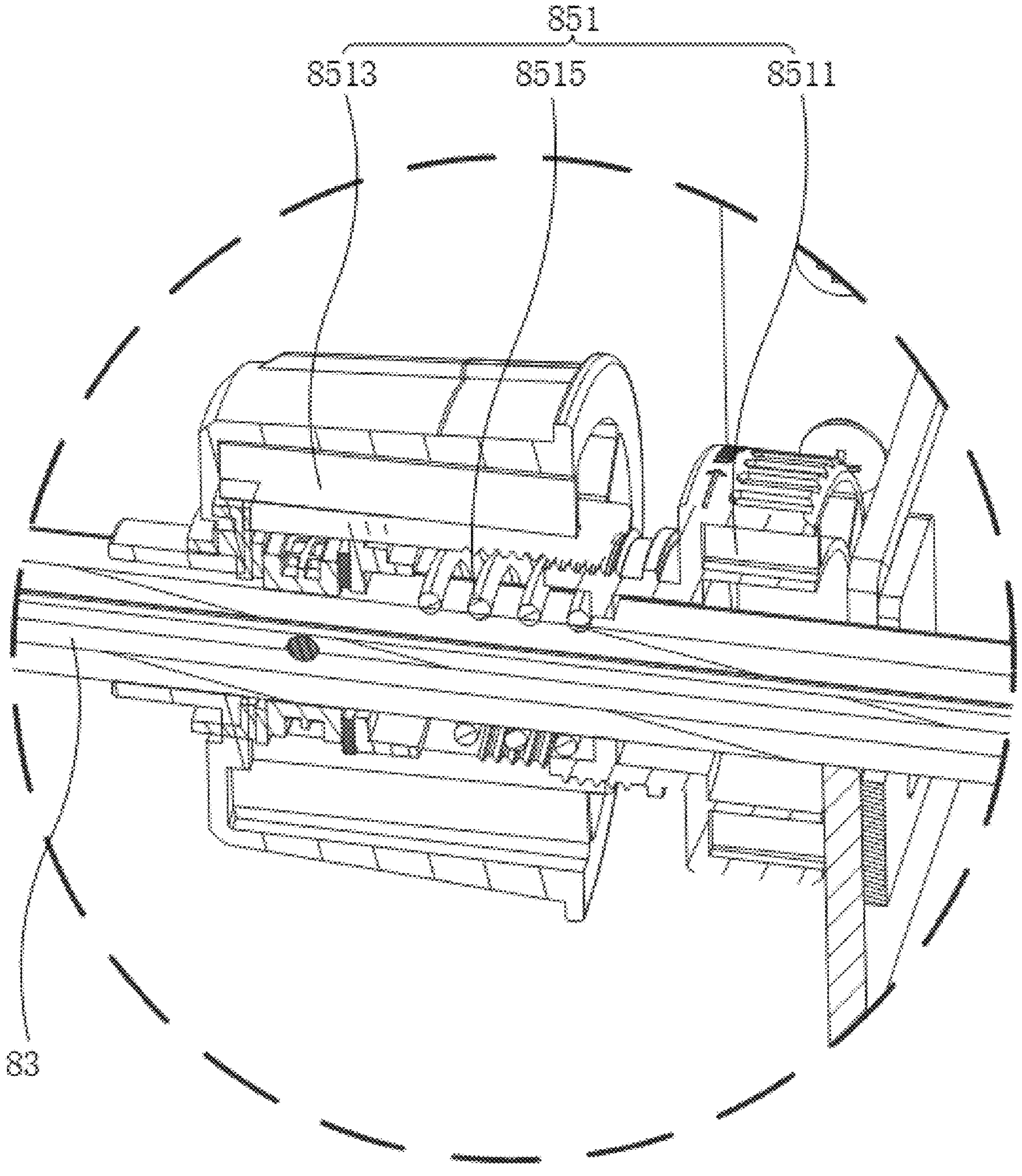
FIG. 35 is a partial enlarged view of FIG. 33 at Circle F.

Reference can be made to FIG. 33 and FIG. 35. In some embodiments, the first sleeve-member 851 includes a material clamp 8511 and a first bearing sleeve 8513. The material clamp 8511 is fixedly connected to the fixed shaft 83. The first bearing sleeve 8513 is sleeved on the fixed shaft 83 and is connected to the material clamp 8511. The material clamp 8511 is connected and fixed to the first bearing sleeve 8513, so that the first bearing sleeve 8513 may be connected to the material clamp 8511 after being loaded with the printing material, thereby ensuring the co-axiality of the first sleeve mounted on the fixed shaft 83. Exemplarily, the first bearing sleeve 8513 is provided with internal threads on an inner wall of the first bearing sleeve 8513, and the material clamp 8511 is provided with external threads on an outer periphery of the material clamp 8511. The first bearing sleeve 8513 is connected to the material clamp 8511 by threaded engagement. The threaded connection provides a more convenient mounting method for the first bearing sleeve 8513 and the material clamp 8511. In some implementations, a fourth elastic member 8515 is provided between the first bearing sleeve 8513 and the material clamp 8511. The fourth elastic member 8515 may be a spring, a rubber pad, etc. The present disclosure does not limit the structure of the fourth elastic member 8515. By providing the fourth elastic member 8515 between the first bearing sleeve 8513 and the material clamp 8511, the first bearing sleeve 8513 and the material clamp 8511 are prevented from being broken caused by excessive connection stress, thereby further improving the structural stability and reliability of the material rack 800.

Figure 34:
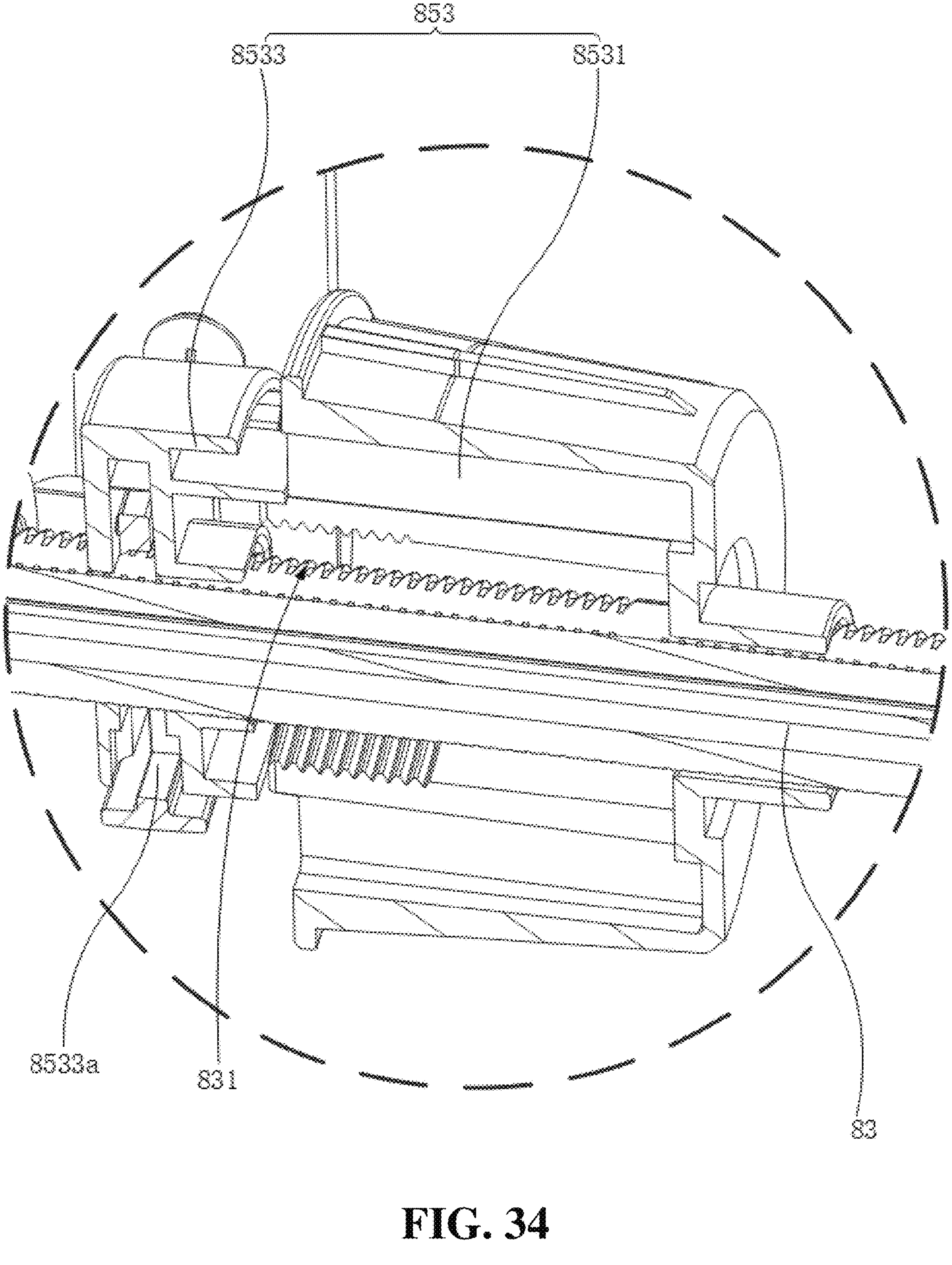
FIG. 34 is a partial enlarged view of FIG. 33 at Circle E.

In some implementations, reference can be made to FIG. 33 and FIG. 34. In some embodiments, the fixed shaft 83 may be provided with a ratchet structure 831 thereon. The second sleeve-member 853 includes a second bearing sleeve 8531 and a retaining ring 8533. The second bearing sleeve 8531 is sleeved on the fixed shaft 83. The retaining ring 8533 is connected to the second bearing sleeve 8531. The retaining ring 8533 is provided with an extendable-and-retractable snap 8533*a*. The extendable-and-retractable snap 8533*a* may be snap-fitted with the ratchet structure 831. By moving the extendable-and-retractable snap 8533*a* on the retaining ring 8533, the extendable-and-retractable snap 8533*a* can be snap-fitted with the ratchet structure 831, so that the retaining ring 8533 and the second bearing sleeve 8531 are fixedly connected to the fixed shaft 83. When it is necessary to adjust a distance between the second sleeve-member 853 and the first sleeve-member 851, the snap-fit between the extendable-and-retractable snap 8533*a* and the ratchet structure 831 can be released, so that the second bearing sleeve 8531 slides on the fixed shaft 83. When the distance between the second bearing sleeve 8531 and the first sleeve-member 851 meets the adjustment requirements, the extendable-and-retractable snap 8533*a* of the retaining ring 8533 can be operated to be fixed to the ratchet structure 831 by means of snap-in connection, so that the material rack 800 can more conveniently adjust the first sleeve-member 851 and the second sleeve-member 853 to load and convey the material to-be-printed.

Of course, in other embodiments, the first sleeve-member 851 and the second sleeve-member 853 may also be configured in other ways. The present disclosure does not limit the shape and structure of the first sleeve-member 851 and the second sleeve-member 853, as long as the stable mounting on the fixed shaft 83 and the bearing of the printing material can be realized.

Reference can be made to FIG. 1. In some embodiments of the present disclosure, the inkjet printing device 1000 includes an output tray 900. The output tray 900 is disposed on the discharging side of the printing table 200. Exemplarily, the output tray 900 can be disposed at the printing-material outlet 75*b* of the housing 700. The output tray 900 can be used to bear the processed printing material, thereby avoiding a certain probability of pollution caused by falling of the processed printing material. In addition, the output tray 900 may have a bearing surface with a certain area, so that the processed printing material can be laid flat on the bearing surface, thereby preventing folding of the printing material during output, and further improving the practicability and processing reliability of the inkjet printing device 1000.

In some embodiments, the output tray 900 is detachably connected to the housing 700, so that the output tray 900 can be detached from the housing 700 when the inkjet printing device 1000 is stored, packaged, or transported, thereby reducing the storage and packaging space occupied by the inkjet printing device 1000. The output tray 900 may be connected to the housing 700 by means of protrusion plugging, or the output tray 900 may be connected to the housing 700 by means of a mating connection structure of a slider and a sliding rail. In addition, the output tray 900 may also be designed to be fixedly connected to the housing 700. The present disclosure does not limit the connection method between the output tray 900 and the housing 700.

In some implementations, the output tray 900 may include at least two tray plates 91. The at least two tray plates 91 are extendable or stackable relative to each other. It can be understood that a paired slider-and-rail connection structure may be provided between two adjacent tray plates 91, or the two adjacent tray plates 91 may be connected through a rotatable linkage. A certain number of tray plates 91 can be unfolded as needed to increase the bearing surface area of the output tray 900, or a certain number of tray plates 91 can be stacked as needed to reduce the occupied space of the output tray 900, so that the output tray 900 can better meet the actual processing and usage requirements, thereby further improving the practicability of the inkjet printing device 1000. There are also many ways to extend and stack the tray plates 91. For example, there is no connection relationship between multiple tray plates 91, that is, the multiple tray plates 91 are provided and separable. The multiple tray plates 91 are spliced when expansion is required, and the multiple tray plates 91 are stacked when the space occupied by the output tray 900 is required to be reduced. The present disclosure does not limit the connection method of the at least two tray plates 91.

Reference can be made to FIG. 1. In some embodiments of the present disclosure, the printing device 1000 is further provided with a display module 1001, to achieve interaction with the user. The interaction methods include but are not limited to providing data during printing, providing printing options, etc. The display module 1001 may include a display screen. The display module 1001 may be disposed on the upper surface of the printing device 1000 for easy operation.

The above descriptions are only exemplary implementations of the present disclosure, and do not limit the patent scope of the present disclosure. Under the technical concept of the present disclosure, any equivalent structural transformation made by using the contents of the specification and the drawings of the present disclosure, or any direct/indirect application in other related technical fields, is included in the scope of patent protection of the present disclosure.

What is claimed is:

1. An inkjet printing device, comprising:

a printing table;

a printhead, wherein the printhead is movably disposed above the printing table and is configured to print on a printing material disposed on the printing table, the printhead comprises a shell, a color ink printing module, and a white ink printing module, the shell defines an accommodating cavity therein, and the shell defines a first through-opening on a surface of the shell facing towards the printing table; and the color ink printing module and the white ink printing module are disposed in the accommodating cavity, and the color ink printing module and the white ink printing module are disposed opposite to the first through-opening and arranged in sequence in a conveying direction of the printing material; and an ink supply module, wherein the ink supply module is connected to the printhead, and is configured to supply ink to the printhead.

2. The inkjet printing device of claim 1, wherein the printhead further comprises an anti-collision mechanism disposed on the shell, the printhead is movable in a first direction, and the anti-collision mechanism is disposed on at least two opposite sides of the printhead in the first direction.

3. The inkjet printing device of claim 1, wherein the printing module comprises an inkjet mechanism, an ink storage mechanism, and a leak-prevention mechanism, and the inkjet mechanism is disposed at the first through-opening; and the ink storage mechanism is detachably connected to the inkjet mechanism, the leak-prevention mechanism is connected between the inkjet mechanism and the ink storage mechanism, and the ink storage mechanism is connected to the ink supply module.

4. The inkjet printing device of claim 3, wherein the printhead further comprises a main board disposed in the accommodating cavity, the printing module further comprises an adapter board, the adapter board is electrically connected to the inkjet mechanism, the adapter board has an input interface connected to the main board of the printhead, and the adapter board is connected to a plurality of nozzles in the inkjet mechanism.

5. The inkjet printing device of claim 1, wherein the inkjet printing device further comprises a housing, the housing defines an accommodating space therein, and the printing table and the printhead are disposed in the accommodating space;

the ink supply module is disposed in the accommodating space;

the housing defines a first opening in communication with the accommodating space, the first opening is defined above the printing table, and the housing further comprises a first cover-plate, and the first cover-plate is configured to open or cover the first opening; and the housing defines a second opening opposite to the ink supply module, the housing comprises a second cover-plate, and the second cover-plate is configured to open or cover the second opening.

6. The inkjet printing device of claim 1, wherein the inkjet printing device further comprises a housing and an ink station module, the housing defines an accommodating space therein, the printing table and the printhead are disposed in the accommodating space, the ink station module is disposed in the accommodating space and is disposed on a moving path of the printhead, the printhead is movable to the ink station module to cooperate with the ink station module, the ink station module is configured to perform maintenance on the printhead, and the maintenance comprises cleaning and/or moisturizing.

7. The inkjet printing device of claim 6, wherein the ink station module comprises a trigger structure, and the trigger structure is configured to detect and position the printhead when the printhead cooperates with the ink station module.

8. The inkjet printing device of claim 7, wherein the trigger structure comprises a protruding structure, the printing module defines a recess thereon, a sensor is provided in the protruding structure or the recess, and when the printing module is located in the ink station module, the protruding structure is inserted into the recess to trigger the sensor.

9. The inkjet printing device of claim 6, wherein the ink station module comprises an ink station platform, an ink pad, and a scraper, the ink station platform defines a waste collection groove on a top surface of the ink station platform, the ink pad is disposed in the waste collection groove, and the scraper is disposed in the waste collection groove and is arranged side by side with the ink pad.

10. The inkjet printing device of claim 6, wherein the inkjet printing device further comprises a waste-liquid cartridge, the ink station module comprises a functional-liquid tank, an ink pad, a water-inlet pipeline, and a polluted-water discharge pipeline, the water-inlet pipeline is connected between the functional-liquid tank and the ink pad, the polluted-water discharge pipeline is connected between the ink pad and the waste-liquid cartridge, the functional-liquid tank is configured to provide a functional liquid to the ink pad through the water-inlet pipeline, the functional liquid comprises a moisturizing liquid and/or a cleaning liquid, and the waste-liquid cartridge is configured to receive a waste liquid discharged from the ink pad through the polluted-water discharge pipeline.

11. The inkjet printing device of claim 6, wherein the inkjet printing device further comprises a waste-liquid cartridge and a third cover-plate, the waste-liquid cartridge is disposed in the accommodating space, the waste-liquid cartridge is connected to the ink station module to collect a waste liquid output by the ink station module, the housing defines a third opening on one side of the housing adjacent to the waste-liquid cartridge, the third opening is in communication with the accommodating space, and the third cover-plate is configured to cover or open the third opening.

12. The inkjet printing device of claim 1, wherein the inkjet printing device further comprises a negative-pressure module, the printing table defines a suction cavity therein, the printing table defines a vacuum hole on a surface of the printing table, the vacuum hole is in communication with the suction cavity, and the negative-pressure module is disposed in the suction cavity; and/or the printing table is provided with a material detection mechanism, the printing table defines a detection slot thereon, and the material detection mechanism is disposed in the detection slot.

13. The inkjet printing device of claim 1, wherein the inkjet printing device is further provided with a limiting plate extending in a second direction, the limiting plate is disposed opposite to a surface of the printing table, and the limiting plate and the surface of the printing table are spaced apart from each other and cooperatively define a conveying slot, with an edge of the printing material located in the conveying slot.

14. The inkjet printing device of claim 1, wherein the ink supply module comprises an ink cartridge and an ink supply line, the ink supply line is connected between the ink cartridge and the printhead, the ink cartridge is provided with an ink-material detection device, the ink-material detection device comprises a first detection float inside the ink cartridge and a first detection signaler outside the ink cartridge, the first detection float is movable with a rise and fall of a liquid level in the ink cartridge, and the first detection signaler is triggered when the first detection float moves to a preset height position.

15. The inkjet printing device of claim 14, wherein the ink cartridge comprises a first ink-cartridge and a second ink-cartridge, the first ink-cartridge is configured to store white ink, the second ink-cartridge is configured to store color ink, the first ink-cartridge is provided with a stirring mechanism therein, the stirring mechanism comprises a stirring blade and a stirring motor, the stirring blade is rotatably disposed in the first ink-cartridge, the stirring motor is disposed on an outer wall of the first ink-cartridge, and a rotating shaft of the stirring motor passes through a wall surface of the first ink-cartridge and is connected to the stirring blade.

16. The inkjet printing device of claim 14, wherein the ink cartridge comprises a first ink-cartridge and a second ink-cartridge, the first ink-cartridge is configured to store white ink, the second ink-cartridge is configured to store color ink, the first ink-cartridge defines a first ink-port and a second ink-port, the ink supply line has one end connected to the first ink-port, the ink supply line is provided with an ink-return branch conduit, and the ink-return branch conduit is in communication with the second ink-port.

17. The inkjet printing device of claim 1, wherein the inkjet printing device further comprises a material rack, the material rack is configured to allow a material to-be-printed to be wound around the material rack, the material rack comprises a fifth support frame, a fixed shaft, and a material-roll structure, the fixed shaft is connected to the fifth support frame, the material-roll structure is sleeved on the fixed shaft for loading the material to-be-printed, the material-roll structure comprises a first sleeve-member and a second sleeve-member, the first sleeve-member and the second sleeve-member are spaced apart from each other and are sleeved on the fixed shaft, a distance between the first sleeve-member and the second sleeve-member is adjustable, the first sleeve-member and the second sleeve-member are configured to allow the material to-be-printed to be sleeved thereon.

* * * * *